US012455743B2

(12) United States Patent
Clarence et al.

(10) Patent No.: US 12,455,743 B2
(45) Date of Patent: Oct. 28, 2025

(54) CONFIGURABLE PIPELINES FOR TRAINING AND DEPLOYING MACHINE LEARNING PROCESSES IN DISTRIBUTED COMPUTING ENVIRONMENTS

(71) Applicant: The Toronto-Dominion Bank, Toronto (CA)

(72) Inventors: Alexander Clarence, Toronto (CA); Ding Tao Liu, Toronto (CA); Raunaq Suri, Mississauga (CA); Guangwei Yu, Toronto (CA); Maksims Volkovs, Toronto (CA); Satya Krishna Gorti, Toronto (CA); Baiju Devani, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 10 days.

(21) Appl. No.: 18/373,918

(22) Filed: Sep. 27, 2023

(65) Prior Publication Data
US 2024/0385838 A1    Nov. 21, 2024

Related U.S. Application Data

(60) Provisional application No. 63/466,925, filed on May 16, 2023.

(51) Int. Cl.
*G06F 9/30*      (2018.01)
*G06F 9/38*      (2018.01)

(52) U.S. Cl.
CPC .......... *G06F 9/3005* (2013.01); *G06F 9/3836* (2013.01)

(58) Field of Classification Search
CPC .... G06F 9/3005; G06F 9/3836; G06F 9/5038; G06N 20/00
See application file for complete search history.

(56) References Cited

U.S. PATENT DOCUMENTS

| | | | | |
|---|---|---|---|---|
| 11,343,142 | B1* | 5/2022 | Wang | H04L 67/1097 |
| 2010/0115237 | A1* | 5/2010 | Brewer | G06F 9/30036 |
| | | | | 711/170 |
| 2020/0174840 | A1* | 6/2020 | Zhao | G06F 9/5011 |

* cited by examiner

*Primary Examiner* — Farley Abad
(74) *Attorney, Agent, or Firm* — Nixon Peabody LLP

(57) ABSTRACT

The disclosed embodiments include computer-implemented processes and systems that establish configurable pipelines for training and deploying machine-learning processes in distributed computing environments. For example, an apparatus may obtain configuration data associated with a plurality of application engines, and pipelining data characterizing a sequential execution of at least a subset of the application engines. Based on the pipelining data, the apparatus may execute sequentially a subset of the application engines in accordance with the configuration data, which may cause the apparatus to perform operations that at least one of (i) train a machine-learning process or (ii) apply the trained machine-learning process to an input dataset. The apparatus may obtain artifact data generated by the executed subset of the application engines, store the artifact data within a data repository, and transmit a portion of the artifact data to a computing system that generated at least one element of the configuration data.

20 Claims, 19 Drawing Sheets

CONFIGURABLE PIPELINES FOR TRAINING AND DEPLOYING MACHINE LEARNING PROCESSES IN DISTRIBUTED COMPUTING ENVIRONMENTS

CROSS-REFERENCE TO RELATED APPLICATION

This application claims the benefit of priority under 35 U.S.C. § 119(e) to prior U.S. Application No. 63/466,925, filed May 16, 2023, the disclosure of which is incorporated by reference herein to its entirety.

TECHNICAL FIELD

The disclosed embodiments generally relate to configurable pipelines for training and deploying machine-learning or artificial-intelligence processes in distributed computing environments.

BACKGROUND

Today, machine-learning processes are widely adopted throughout many organizations. The output of these machine-learning processes may support and inform not only decisions related to a targeting marketing of products and services to customers, but also decisions related to the provisioning these products or services to customers, and to a determination of initial, or subsequent, terms or conditions imposed on these products or services. Many machine-learning processes operate, however, as "black boxes," and lack transparency regarding the importance and relative impact of certain input features, or combinations of certain input features, on the operations of these machine-learning processes and on the output generated by these machine-learning and processes. Further, many existing machine-learning processes are developed in response to, and in accordance with, specific use-cases, and are incapable of flexible deployment across multiple uses cases without significant modification and adaption by experienced developers and data scientists.

SUMMARY

In some examples, an apparatus includes a memory storing instructions, a communications interface, and at least one processor coupled to the memory and the communications interface. The at least one processor is configured to execute the instructions to obtain, from the memory, elements of configuration data associated with a plurality of application engines and pipelining data characterizing a sequential execution of at least a subset of the application engines. At least one of the elements of configuration data is generated by a computing system. The at least one processor is further configured to execute the instructions to, based on the pipelining data, execute sequentially a subset of the application engines in accordance with the elements of configuration data. The executed subset of the application engines causes the at least one processor to perform operations that at least one of (i) train a machine-learning or artificial-intelligence process or (ii) apply the trained machine-learning or artificial-intelligence process to an input dataset. The at least one processor is further configured to execute the instructions to perform operations that obtain artifact data generated by the executed subset of the application engines and that store the artifact data within a portion of the memory. The at least one processor is further configured to execute the instructions to transmit at least a portion of the artifact data to the computing system via the communications interface.

In additional examples, a computer-implemented method includes obtaining, using at least one processor, elements of configuration data associated with a plurality of application engines and pipelining data characterizing a sequential execution of at least a subset of the application engines. At least one of the elements of configuration data is generated by a computing system. The computer-implemented method includes, based on the pipelining data, and using the at least one processor, executing sequentially a subset of the application engines in accordance with the elements of configuration data. The executed subset of the application engines causes the at least one processor to perform operations that at least one of (i) train a machine-learning or artificial-intelligence process or (ii) apply the trained machine-learning or artificial-intelligence process to an input dataset. The computer-implemented method includes performing operations, using the at least one processor, that obtain artifact data generated by the executed subset of the application engines and that store the artifact data within a portion of a data repository. The computer-implemented method also includes transmitting at least a portion of the artifact data to the computing system using the at least one processor.

Further, in some examples, a tangible, non-transitory computer-readable medium storing instructions that, when executed by at least one processor, cause the at least one processor to perform a method that includes obtaining elements of configuration data associated with a plurality of application engines and pipelining data characterizing a sequential execution of at least a subset of the application engines. At least one of the elements of configuration data is generated by a computing system. The method also includes, based on the pipelining data, executing sequentially a subset of the application engines in accordance with the elements of configuration data. The executed subset of the application engines causes the at least one processor to perform operations that at least one of (i) train a machine-learning or artificial-intelligence process or (ii) apply the trained machine-learning or artificial-intelligence process to an input dataset. The method also includes performing operations that obtain artifact data generated by the executed subset of the application engines and that store the artifact data within a portion of a data repository. The method also includes transmitting at least a portion of the artifact data to the computing system.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed exemplary embodiments, as set forth in the accompanying claims.

BRIEF DESCRIPTION OF THE DRAWINGS

Like reference numbers and designations in the various drawings indicate like elements.

DETAILED DESCRIPTION

Figure 1:
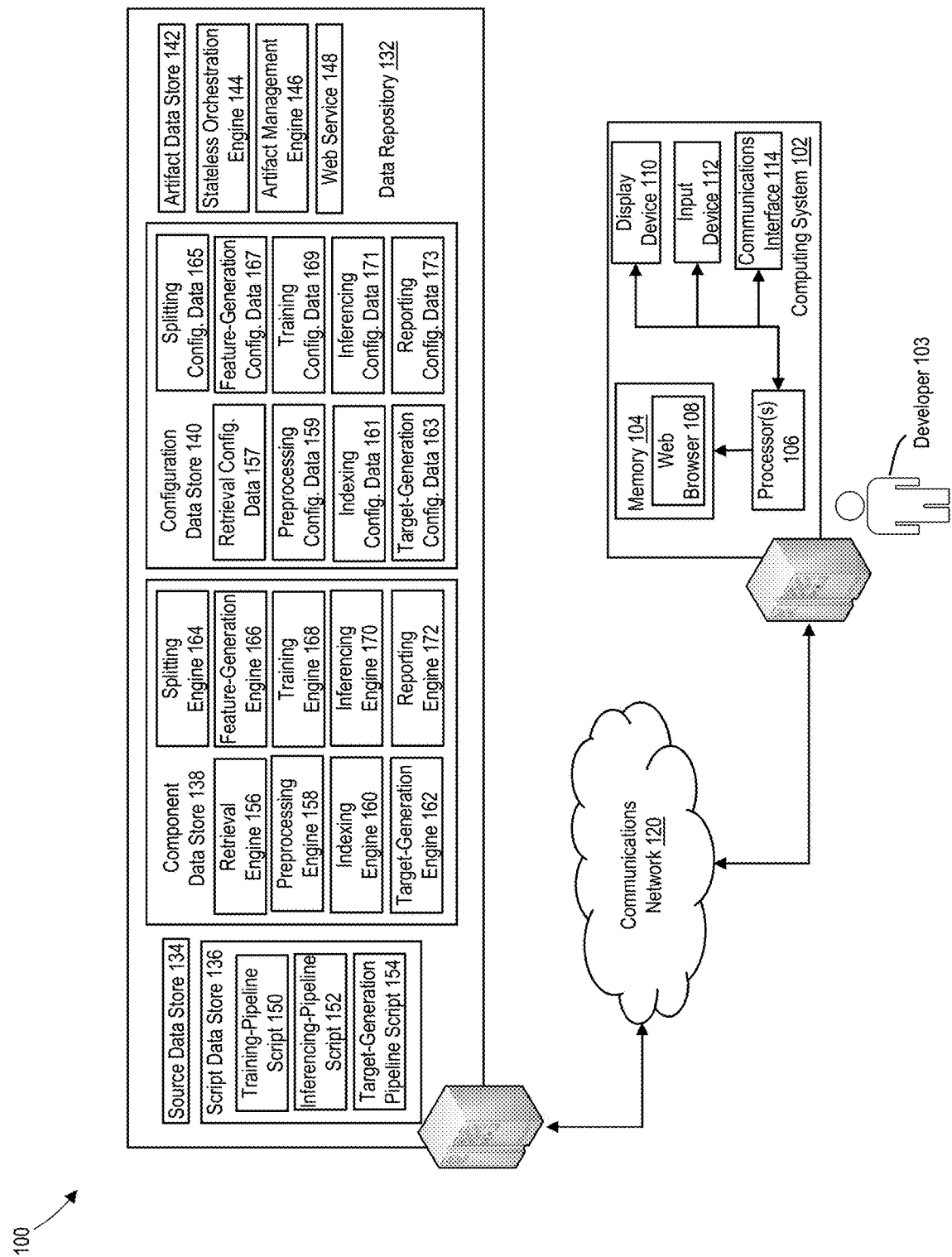
FIGS. 1, 2A, 2B, 3A-3C, 4A-4D, 5A-5C, 6A, 6B, 7A, and 7B are block diagrams illustrating portions of an exemplary computing environment, in accordance with some embodiments.

Many organizations rely on a predicted output of machine-learning processes to support and inform a variety of decisions and strategies. By way of example, a financial institution may rely on a predicted output of multiple, distinct machine-learning processes to inform and support not only customer-facing decisions, such as decisions associated with the provisioning of financial products or services to customers, decisions associated with a requested modification to a term of condition of a provisioned financial product or service, or decisions associated with a targeted marketing of products and services to customers, but also back-end decisions, such as strategies for mitigating or managing risk, decisions related to a suspiciousness of certain activities, or collection strategies involving financial products provisioned to customers.

Each of these machine-learning processes may be associated with a corresponding set of process-specific operations that, when executed sequentially by one or more computing systems associated with, or operated by, the financial institution, facilitate a generation of corresponding input datasets, an ingestion of the input datasets by the corresponding machine learning processes, and a generation customer-specific elements of predictive output. In some instances, the sequential execution of the process-specific operations by the one or more computing systems of the financial institution within a production environment may establish an inferencing pipeline for each of the machine-learning processes, which may generate the corresponding elements of predictive output in accordance with an underlying, process-specific delivery schedule (e.g., at an expected delivery time on a daily basis, a weekly basis, a bi-monthly basis, or on a monthly basis) and additionally, or alternatively, in real-time and in response to a request received from an additional device or computing system.

Further, and prior to deployment and active use within a production environment, each of the machine-learning processes may trained adaptively using corresponding, and labeled, training, validation, and testing datasets associated with one or more prior temporal intervals, e.g., within a development environment. By way of example, during the adaptive training of each of the machine-learning processes, the one or more computing systems of the financial institution may execute sequentially an additional set of process-specific operations that, among other things, retrieve and preprocess selectively source data tables, apply one or more target-generation and feature-generation operations to the source data tables, and train adaptively the corresponding machine-learning process based on customer-specific input datasets that include feature vectors and target, ground-truth labels. In some instances, the sequential execution of the additional sets of process-specific operations by the one or more computing systems of the financial institution within a development environment may establish a corresponding training pipeline for each of the machine-learning processes.

The sequential execution of the process-specific operations associated within the training pipeline, and additionally, or alternatively, the sequential execution of the process-specific operations associated within the inferencing pipeline, may output, for each of the machine-learning process, elements of process-specific explainability data that characterizes a predictive capability and an accuracy of the corresponding machine-learning process, which facilitates not an evaluation of the performance of the corresponding machine-learning process during an initial training phase within the development environment, but also an ongoing evaluation and monitoring of that performance during inferencing within the production environment. These initial, and ongoing, evaluation and monitoring processes may establish a conformity of each machine-learning process with one or more constraints imposed by an external governmental or regulatory entity, or internally by the financial institution, and may enable the one or more computing systems of the financial institution to perform additional processes to mediate or mitigate an established non-conformity of one, or more, of a machine-learning process with the imposed constraints.

Today, many organizations, including financial executions, rely on the predictive output of dozens, if not hundreds, of discrete, machine-learning processes, and corresponding training and inferencing to inform customer-facing decisions and strategies on a daily, monthly, or quarterly basis. Each of these discrete, machine-learning processes may be associated with a corresponding training, inferencing, and in some instances, monitoring pipelines of sequentially executed operations subject to concurrent execution in accordance with process-, and output-specific, schedules. Despite similarities or commonalities in process types, process configurations, data sources, or targeted events across the discrete, machine-learning processes, the training, inferencing, and monitoring pipelines associated with many machine-learning processes are characterized by fixed execution flows of sequential operations established by static, process- and pipeline-specific executable scripts, and by discrete, executable application modules or engines that are generated by data scientists in conformity within the particular use case within a corresponding pipeline and that perform static and inflexible process-specific operations.

The reliance on fixed execution flows, status executable scripts, and hand-coded, use-case-specific executable application modules or engines to perform static, and inflexible, process-specific operations within corresponding pipelines may, in some instances, discourage wide option of machine-learning technologies within many organizations. For example, the generation of hand-coded scripts or executable application modules or engines for each use-case of a machine-learning process within a corresponding training, inferencing or monitoring pipeline may result in duplicative and redundant effort by data scientists, e.g., as the multiple uses cases may be associated one or more common hard-coded scripts or executable application engines. Further, the time delay associated with the generation of these hand-coded scripts or executable application modules or engines, and with the post-training and pre-deployment validation of each of the machine-learning processes trained via the execution of corresponding ones of the hand-coded scripts or executable application modules or engines, may reduce a relevance of the predictive output to the decisioning processes of these organizations and render impractical real-time experimentation in feature-generation or feature selection processes. Additionally, in some examples, a development of, and experimentation with, adaptive training and inference processes that rely on these hard-coded scripts or executable application engines may be impractical for all but experienced developers, data scientists, and engineers, who possess the skills required to generate and deploy the hard-coded scripts or executable application engines within the distributed computing environment.

In some examples, described herein, one or more processors of a distributed or cloud-based computing system may implement a modular and configurable computational framework that facilitates an end-to-end training, validation, and deployment of a machine-learning process based on a sequential execution of application engines in accordance with established, and in some instances, configurable, pipeline-specific scripts. In some instances, the modular and configurable, computational framework described herein may be implemented within corresponding ones of an established training pipeline, inferencing pipeline, and/or target-generation pipeline of sequentially executed application engines, and may address flexibly multiple, distinct various use-cases and facilitate interaction with developers and data scientists, of varied skill levels while maintaining a standardized, artifact-based approach to process monitoring, versioning, and explainability across the established training, inferencing, and/or target-generation pipelines. Certain of these exemplary processes, as described herein, may be implemented in addition to, or as an alternate to, processes that rely on hand-coded scripts and a sequential execution of hard-coded application engines to train adaptively a machine-learning process, and to generate elements of process-specific predictive output based on an application of the trained machine-process to corresponding input datasets, on a use-case by use-case basis.

Further, and as described herein, one or more engine- and pipeline-specific operational constraints imposed on each of the sequentially executed application engines within corresponding ones of the training, target-generation, and inferencing pipelines may facilitate a facilitate compliance with one or more process-validation operations or requirements, and additionally, or alternatively, with one or more governmental or regulatory requirements, at each step within the training, target-generation, and inferencing pipelines. Certain of these exemplary processes, which may facilitate a validation a compliance of the sequentially executed application engines with the one or more process-validation operations or requirements, governmental requirements, and/or regulatory requirements at a pipeline level across multiple potential use-cases, may also be implemented in addition to, or as an alternate to, processes that rely on hand-coded executable scripts and a sequential execution of hard-coded application engines associated with each of the multiple use-cases, which are often validated for compliance with the one or more process-validation operations or requirements, governmental requirements, and/or regulatory requirements on a use-case by use-case basis.

A. Exemplary Computing Environments

FIG. 1 illustrates components of an exemplary computing environment 100, in accordance with some exemplary embodiments. For example, as illustrated in FIG. 1, environment 100 may include one or more computing systems associated with, or operated by, a financial institution, such as a developer computing system 102 and financial institution (FI) computing system 130. In some instances, developer computing system 102 and FI computing system 130 may be interconnected through one or more communications networks, such as communications network 120. Examples of communications network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

Developer computing system 102 may include a computing system or device having one or more tangible, non-transitory memories, such as memory 104, that store data and/or software instructions, and one or more processors, such as, processor(s) 106, configured to execute the software instructions. Memory 104 may store one or more software applications, application engines, and other elements of code executable by one or more processor(s) 106, such as, but not limited to, an executable web browser 108 (e.g., Google Chrome™, Apple Safari™, etc.) capable of interacting with one or more web servers established programmatically by FI computing system 130. By way of example, and upon execution by processor(s) 106, web browser 108 may interact programmatically with the one or more web servers of FI computing system 130 via a web-based interactive computational environment, such as a Juypter™ notebook or a Databricks™ notebook. Developer computing system 102 may also include a display device 110 configured to present interface elements to a corresponding user, such as developer 103, and an input device 112 configured to receive input from developer 103, e.g., in response to the interface elements presented through display device 110.

By way of example, display device 110 may include, but is not limited to, an LCD display device or other appropriate type of display device, and input device 112 may include, but is not limited to, a keypad, keyboard, touchscreen, voice activated control technologies, or appropriate type of input device. Further, in additional aspects (not illustrated in FIG. 1), the functionalities of display device 110 and input device 112 may be combined into a single device, such as, a pressure-sensitive touchscreen display device that presents interface elements and receives input from the user of developer computing system 102, such as developer 103. Developer computing system 102 may also include a communications interface 114, such as a wireless transceiver device, coupled to processor(s) 106 and configured by processor(s) 106 to establish and maintain communications with communications network 120 via one or more communication protocols, such as WiFi®, Bluetooth®, NFC, a cellular communications protocol (e.g., LTE®, CDMA®, GSM®, etc.), or any other suitable communications protocol.

Examples of developer computing system 102 may include, but not limited to, a personal computer, a laptop computer, a tablet computer, a notebook computer, a handheld computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations, and/or display information on an interface device or unit, such as display device 110. Further, a user, such as a developer 103, may operate developer computing system 102 and may do so to cause developer computing system 102 to perform one or more exemplary processes described herein.

In some examples, each of developer computing system 102 and FI computing system 130 may represent a computing system that includes one or more servers and tangible, non-transitory memories storing executable code and application engines. Further, the one or more servers may each include one or more processors, which may be configured to execute portions of the stored code or application engines to perform operations consistent with the disclosed embodiments. For example, the one or more processors may include a central processing unit (CPU) capable of processing a single operation (e.g., a scalar operation) in a single clock cycle. Further, FI computing system 130 may also include a communications interface, such as one or more wireless transceivers, coupled to the one or more processors for accommodating wired or wireless internet communication with other computing systems and devices operating within environment 100 in accordance with any of the exemplary communications protocols described herein.

Further, in some instances, each of developer computing system 102 and FI computing system 130 may be incorporated into a respective, discrete computing system. In additional, or alternate, instances, one or more of developer computing system 102 and FI computing system 130 may correspond to a distributed computing system having a plurality of interconnected, computing components distributed across an appropriate computing network, such as communications network 120 of FIG. 1. For example, FI computing system 130 may correspond to a distributed or cloud-based computing cluster associated with, and maintained by, the financial institution, although in other examples, FI computing system 130 may correspond to a publicly accessible, distributed or cloud-based computing cluster, such as a computing cluster maintained by Microsoft Azure™, Amazon Web Services™, Google Cloud™, or another third-party provider.

In some instances, FI computing system 130 may include a plurality of interconnected, distributed computing components, such as those described herein (not illustrated in FIG. 1), which may be configured to implement one or more parallelized, fault-tolerant distributed computing and analytical processes (e.g., an Apache Spark™ distributed, cluster-computing framework, a Databricks™ analytical platform, etc.). Further, and in addition to the CPUs described herein, the distributed computing components of FI computing system 130 may also include one or more graphics processing units (GPUs) capable of processing thousands of operations (e.g., vector operations) in a single clock cycle, and additionally, or alternatively, one or more tensor processing units (TPUs) capable of processing hundreds of thousands of operations (e.g., matrix operations) in a single clock cycle. Through an implementation of the parallelized, fault-tolerant distributed computing and analytical protocols described herein, the distributed or cloud-based computing components of FI computing system 130 may perform any of the exemplary processes described herein to implement a generalized and modular computational framework that facilitates an end-to-end training, validation, and deployment of a machine-learning or artificial-intelligence process based on a sequential execution of application engines in accordance with established, and in some instances, configurable, pipeline-specific scripts.

The executable, and configurable, pipeline-specific scripts may include, but are not limited to, executable scripts that establish a training pipeline of a sequentially executed first subset of the application engines (e.g., a training pipeline script), an inferencing pipeline of a sequentially executed second subset of the application engines (e.g., an inferencing pipeline script), and a target-generation pipeline of a sequentially executed third subset of the application engines (e.g., a target-generation pipeline script). By way of example, the one or more processors of FI computing system 130 may execute an application program, such as an orchestration engine, that establishes the training pipeline and trigger a sequential execution of each of the first subset of the application engines in accordance with the training pipeline script, which may cause the distributed computing components of FI computing system 130 to perform any of the exemplary processes described herein to adaptively train a machine-learning or artificial-intelligence process.

The executed orchestration engine may also establish the inferencing pipeline and trigger a sequential execution of each of the second subset of the application engines in accordance with inferencing-pipeline script, which may cause the one or more processors of FI computing system 130 to apply a trained machine-learning or artificial-intelligence process to an input dataset consistent with one or more customized feature-engineering operations, and to generate elements of post-processed, predictive output customized to reflect a particular user-case of interest to developer 103. The executed stateless orchestration engine may also perform operations that establish the target-generation pipeline and trigger a sequential execution of each of the third subset of the application engines in accordance with the target-generation pipeline script, which may cause the one or more processors of FI computing system 130 to perform any of the exemplary processes described herein to generate a value of a target, ground-truth label for each element of an indexed dataframe, such as, but not limited to, datasets or dataframes associated with prior inferencing operations involving forward-in-time machine-learning or artificial-intelligence processes.

To facilitate a performance of one or more of these exemplary processes, FI computing system 130 may maintain, within the one or more tangible, non-transitory memories, a data repository 132 that includes a source data store 134, a script data store 136, a component data store 138, a configuration data store 140, and an artifact data store 142. Further, and to facilitate a performance of one or more of these exemplary processes, FI computing system 130 may also maintain, within data repository 132, an orchestration engine 144, an artifact management engine 146, and a programmatic web service 148, each of which may be executed by the one or more processors of FI computing system 130 (e.g., by the distributed computing components of FI computing system 130).

By way of example, source data store 134 may include one or more elements of confidential data identifying and characterizing customers of the financial institution, and interactions of these customers with the financial institution, with one or more products or services provisioned to these customers by the financial institution, and additionally, or alternatively, with other, unrelated financial institution across one or more temporal intervals. The elements of confidential customer data may be maintained within customer data store in one or more tabular data structures (e.g., as one or more source data tables), and each of the tabular data structures may be associated with a corresponding, and unique identifier (e.g., an alphanumeric table identifier, a file path within the one or more tangible, non-transitory memories of FI computing system 130, etc.), a corresponding primary key (or a corresponding composite primary key) and in some instances, a corresponding index. In some instances, distributed computing components of FI computing system 130 may perform operations (not illustrated in FIG. 1) that programmatically obtain (e.g., "ingest") one or more of the elements of confidential data from corresponding data repositories maintained at computing systems associated with or operated by the financial institution, or by one or more unrelated entities (e.g., a governmental or reporting entity, such as a credit bureau) in accordance with a predetermined or dynamically determined schedule.

Examples of the elements of confidential data maintained within corresponding ones of the source data tables of source data store 134 include, but are not limited to, elements of customer profile data that identify and characterize corresponding ones of the customers, elements of account data that identify and characterize one or more financial products issued by the financial institution to corresponding ones of the customers, elements of transaction data that identify and characterize initiated, settled, or cleared transactions involving respective ones of the customers and corresponding ones of the issued financial products, and/or elements of credit bureau data associated with corresponding ones of the customers. Further, examples of the primary keys associated with each of the source data tables may include, but are not limited to, a unique, alphanumeric identifier assigned to each customer by the financial institution, a unique alphanumeric login credential of the financial institution, and time stamp or other temporal data associated with the source data table, e.g., an ingestion date of the source data table or an event date associated with the elements of data within the source data table (e.g., a transaction date, etc.).

In some instances, script data store 136 may include a plurality of configurable, pipeline-specific scripts that, upon execution by the one or more processors of FI computing system 130, facilitate the end-to-end training, validation, and deployment of a machine-learning or artificial-intelligence process based on a sequential execution of one, or more, subsets of the discrete executable application engines maintained within component data store 138 in accordance with corresponding ones of the elements of configuration data maintained within configuration data store 140. Each of the executable, pipeline-specific scripts, including training pipeline script 150, inferencing pipeline script 152, and target-generation pipeline script 154, may be maintained in Python™ format and in a portion of a data repository accessible to the one or more computing systems of the financial institution, e.g., within a partition of a Hadoop™ distributed file system (e.g., a HDFS) accessible to developer computing system 102. Further, each of the elements of engine-specific configuration data maintained within configuration data store 140 may be structured and formatted in a human-readable data-serialization language, such as, but not limited to, a YAML™ data-serialization language or an extensible markup language (XML). In some instances, and through a performance of any of the exemplary processes described herein, computing system 102 may modify, update, or "customize" one or more of training pipeline script 150, inferencing pipeline script 152, and target-generation pipeline script 154, and additionally, or alternatively, one or more of the elements of engine-specific configuration data, to reflect a particular use-case of instance to developer 103.

Component data store 138 may include a plurality of discrete application engines associated with the end-to-end training, validation, and deployment of one or more machine-learning or artificial-intelligence processes, and each of the discrete application engines may also be associated with corresponding elements of configuration data, which may be maintained within configuration data store 140. For examples, the executable application engines maintained within component data store 138 may include, among other things, a retrieval engine 156, a preprocessing engine 158, an indexing engine 160, a target-generation engine 162, a splitting engine 164, a feature-generation engine 166, a training engine 168, an inferencing engine 170, and a reporting engine 172. As described herein, each of these application engines may be associated with a corresponding element of configuration data maintained within configuration data store 140, and with a corresponding programmatic interface which may invoked (or called) within respective ones of the training pipeline script 150, inferencing pipeline script 152, and target-generation pipeline script 154.

As described herein, each of the application engines maintained within component data store 138 may be associated with, and perform operations consistent with, a corresponding elements of engine-specific configuration data maintained within configuration data store 140. By way of example, as illustrated in FIG. 1, configuration data store 140 may include elements of retrieval configuration data 157 (e.g., associated with retrieval engine 156), elements of preprocessing configuration data 159 (e.g., associated with preprocessing engine 158), elements of indexing configuration data 161 (e.g., associated with indexing engine 160), elements of target-generation configuration data 163 (e.g., associated with target-generation engine 162), elements of feature-generation configuration data 167 (e.g., associated with feature-generation engine 166), elements of training configuration data 169 (e.g., associated with training engine 168), elements of inferencing configuration data 171 (e.g., associated with inferencing engine 170), and elements of reporting configuration data 173 (e.g., associated with reporting engine 172).

When executed by the one or more processors of FI computing system 130 within a corresponding training, inferencing, or target-generation pipeline (e.g., in accordance with training pipeline script 150, inferencing pipeline script 152, or target-generation pipeline script), each of the application engines maintained within component data store 138 may ingest corresponding elements of engine-specific configuration data and one or more additional elements of input data (e.g., engine-specific "input artifacts"), perform one or more operations consistent with the corresponding elements of engine-specific configuration data, and generate one or more elements of output data (e.g., engine-specific "output artifacts"). In some instances, the engine-specific configuration data may specify, for the corresponding one of the application engines, an identity, structure, or composition of the input artifacts, the one or more operations (e.g., as helper scripts executable in the namespace of the corresponding one of the application engines), a value of one or more parameters of the operations, and an identity, structure, or composition of the output artifacts.

In some instances, and prior to the performance of the operations consistent with the corresponding elements of engine-specific configuration data, each, or a subset, of the executed application engines may perform additional operations that enforce one or more engine- or pipeline-specific constraints imposed on the executed application engines by the external governmental or regulatory entity or entities, or internally by the financial institution. By way example, to support an enforcement of these imposed engine- or pipeline-specific constraints at each sequential step of the training, inferencing, and target-generation pipelines described herein, the programmatic interface associated with each of the executed application engines may parse the ingested engine-specific input artifacts (e.g., including the elements of engine-specific configuration data) and establish a consistency of the engine-specific input artifacts with the engine- and pipeline-specific operational constraints imposed on the executed application engine.

If the programmatic interface of the executed application engine were to establish an inconsistency between the imposed, engine- and pipeline-specific operational constraints and at least one of the engine-specific input artifacts, the executed application engine may generate an output artifact characterizing the established inconsistency and further, a failure in an execution of the corresponding training, inferencing, or target-generation pipelines, which the corresponding executed application engine may provision to artifact management engine 146 executed by the one or more processors of FI computing system 130. Executed artifact management engine 146 may store the output artifact and a unique component identifier of corresponding executed application engine within a data record of artifact data store 142 associated with the corresponding training, inferencing, or target-generation pipeline, and the one or more processors of FI computing system 130 may cease the execution of the corresponding training, inferencing, or target-generation pipeline. Alternatively, if the programmatic interface of the corresponding executed application engine were to deem the engine-specific input artifacts consistent with the imposed, engine- and pipeline-specific operational constraints, the of the corresponding executed application engine may perform the one or more operations consistent with the corresponding elements of engine-specific configuration data, and generate the one or more engine-specific output artifacts.

Further, when executed by the one or more processors of FI computing system 130, each of the configurable, pipeline-specific scripts maintained within script data store 136 may establish a "default" pipeline of a sequentially executed subset of the application engines maintained within component data store 138, and each of the default pipelines may be associated with a default execution flow, which specifies an order in which the one or more processors of FI computing system 130 execute sequentially the corresponding subset of the application engines. By way of example, when executed by the one or more processors of FI computing system 130, training pipeline script 150 may establish a default training pipeline of a sequentially ordered subset of the application engines that includes, but is not limited to, retrieval engine 156, preprocessing engine 158, indexing engine 160, target-generation engine 162, splitting engine 164, feature-generation engine 166, training engine 168, and reporting engine 172. In some instances, when executed by the one or more processors of FI computing system 130, inferencing pipeline script 152 may establish a default inferencing pipeline of a sequentially ordered subset of the application engines that includes, but is not limited to, retrieval engine 156, preprocessing engine 158, indexing engine 160, feature-generation engine 166, inferencing engine 170, and reporting engine 172.

Additionally, when executed by the one or more processors of FI computing system 130, target-generation pipeline script 154 may establish a default target-generation pipeline of a sequentially ordered subset of the application engines that includes, but is not limited to, retrieval engine 156, preprocessing engine 158, target-generation engine 162, and reporting engine 172. In some instances, and through a performance of any of the exemplary processes described herein, computing system 102 may modify, update, or "customize" one or more of a composition of the sequentially ordered subset of the application engines associated with corresponding ones of the default training pipeline, the default inferencing pipeline, and the default target-generation pipeline, and additionally, or alternatively, the execution flow of sequentially executed application engines within corresponding ones of the default training pipeline, the default inferencing pipeline, and the default target-generation pipeline, to reflect a particular use-case of instance to developer 103.

Training pipeline script 150 may specify the execution flow of the default training pipeline (e.g., an order of sequential execution of each of the application engines within the default training pipeline) and may include, for each of the sequentially executed application engines, data identifying corresponding elements of engine-specific configuration data, one or more input artifacts ingested by the sequentially executed application engine, and additionally, or alternatively, one or more output artifacts generated by the sequentially executed application engine. By way of example, and as described herein, the default training pipeline may include retrieval engine 156, preprocessing engine 158, indexing engine 160, target-generation engine 162, splitting engine 164, feature-generation engine 166, training engine 168, and reporting engine 172, which may be executed sequentially by the one or more processors in accordance with the execution flow specified by executed training pipeline script 150.

By way of example, upon execution by the one or more processors of FI computing system 130, executed orchestration engine 144 may access script data store 136, and perform operations that trigger an execution of a corresponding one of training pipeline script 150, inferencing pipeline script 152, and target-generation pipeline script 154, and an establishment or initiation of a current implementation, or "run" of corresponding one of the default training pipeline, the default inferencing pipeline, and the default target-generation pipeline. In some instances, executed orchestration engine 144 may assign a unique, alphanumeric identifier to the current run of the corresponding one of the default training pipeline, the default inferencing pipeline, and the default target-generation pipeline (e.g., a run identifier) and may establish a temporal identifier characterizing an initiation date of the current run of the corresponding one of the default training pipeline, the default inferencing pipeline, and the default target-generation pipeline. Further, and based on programmatic communications with artifact management engine 146 (e.g., executed by the one or more processors of FI computing system 130), executed orchestration engine 144 may perform operations, described herein, that maintain the run and temporal identifiers within a data record of artifact data store associated with the current run of the corresponding one of the default training pipeline, the default inferencing pipeline, and the default target-generation pipeline, e.g., a run- and pipeline-specific data records.

During the sequential execution of the application engines within the current run of the corresponding one of the default training pipeline, the default inferencing pipeline, and the default target-generation pipeline, executed orchestration engine 144 may perform any of the exemplary processes described herein to provision the one or more input artifacts (including the elements of engine-specific configuration data) to each of the sequentially executed application engines, and to obtain the output artifacts generated each of the sequentially executed application engines. In some instances, based on programmatic communications with executed artifact management engine 146, executed orchestration engine 144 may perform any of the exemplary processes described herein, in conjunction with executed artifact management engine 146 to maintain the engine-specific output artifacts (and in some instances, the engine-specific input artifacts) in the corresponding one of the run- and pipeline-specific data records of artifact data store 142, along with unique identifiers of the corresponding, sequentially executed application engines. The association, within the run- and pipeline-specific data records of artifact data store 142, or engine-specific input and/or output artifacts within corresponding run identifiers, corresponding component identifiers, and corresponding temporal identifiers may establish an artifact lineage that facilitates an audit of a provenance, of each artifact ingested by the corresponding one of the executed application engines during the current, or prior, runs of the default training, inferencing, and target-generation pipelines, and a recursive tracking of the generation or ingestion of that artifact across the current, or prior, runs of the default training, inferencing, and target-generation pipelines.

Figure 2A:
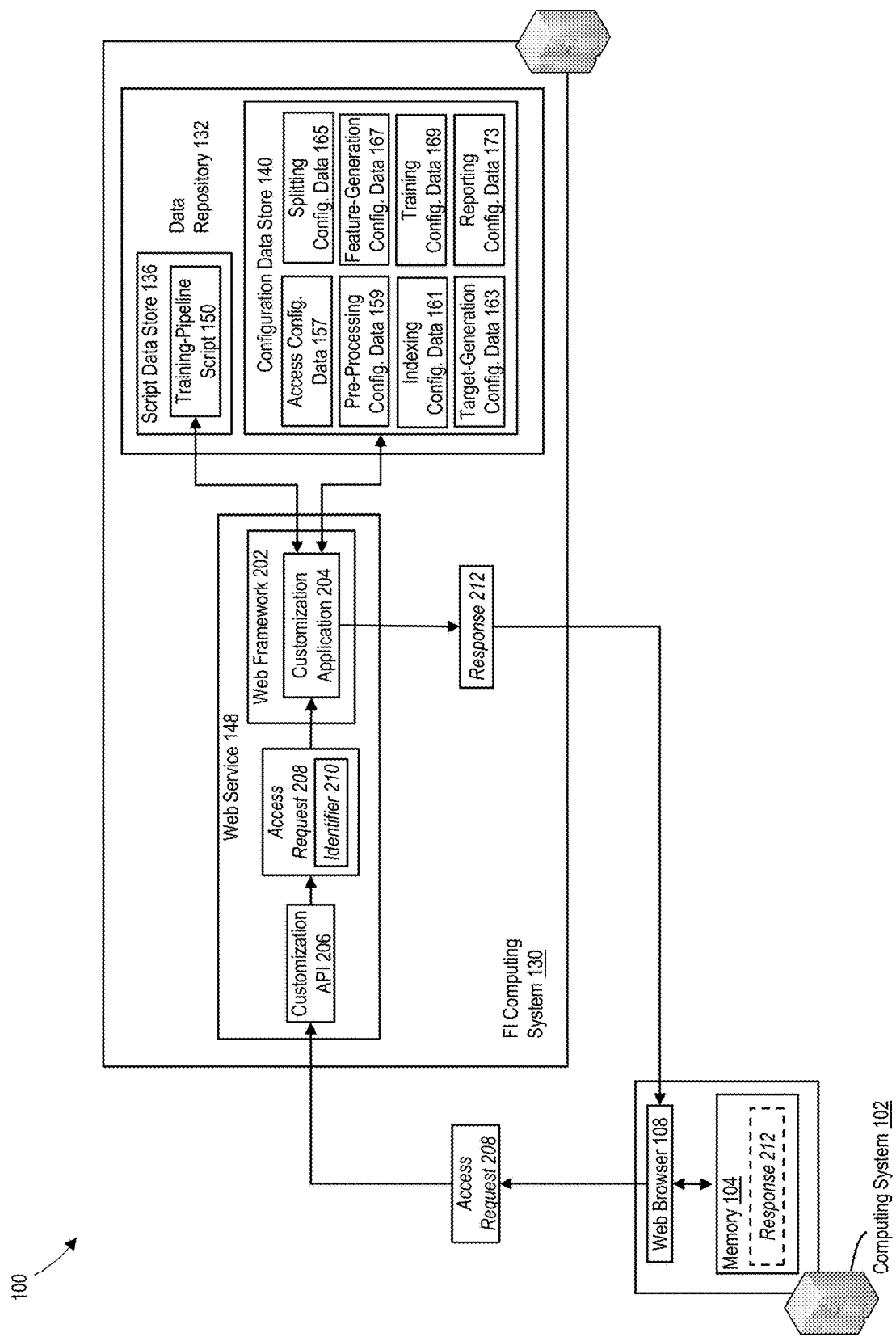

B. Configurable Pipelines for Training and Deploying Machine-Learning Processes in Distributed Computing Environments Referring to FIG. 2A, developer computing system 102 may perform operations that establish a secure, programmatic channel of communications across communications network 120 with one or more of the distributed computing components of FI computing system 130. For example, developer computing system 102 may execute web browser 108, which cause developer computing system 102 to exchange data with a web service executed by the one or more processors of FI computing system 130, such executed programmatic web service 148, and to establish the secure, programmatic channel of communications with executed programmatic web service 148 in accordance with one, or more, appropriate communications protocols, such as, but not limited to, a hypertext transfer protocol (HTTP), a transmission control protocol (TCP), or an internet protocol (IP). As described herein, executed programmatic web service 148 may perform operations that establish a corresponding web framework 202, which may orchestrate an execution of one or more application programs, such as, but not limited to, a customization application 204, and may establish and maintain programmatic interface associated with customization application 204, such as, but not limited to, a customization application programming interface (API) 206.

In some instances, and responsive to a request received from developer computing system 102 (or from other computing systems associated with corresponding business units of the financial institution), customization API 206 and executed customization application 204 may perform operations, described herein, that enable developer computing system 102, via executed web browser 108, to access to one or more of the elements of configuration data associated with corresponding ones of the configuration application engines executed sequentially within one, or more, of the default target-generation, training, and inferencing pipelines (e.g., as maintained within configuration data store 140), and to and to update, modify, or "customize" the one or more of the accessed elements of configuration data to reflect one or more data preprocessing, indexing and splitting, target-generation, feature-engineering, training, inferencing, and/ or post-processing preferences associated with a particular use-case of interest to developer 103. As described herein, the modification of the accessed elements of configuration data by developer computing system 102 may enable developer computing system 102 to customize the sequential execution of the application engines within a corresponding one of the default training, inferencing, and target-generation pipelines to reflect the particular use-case without modification to the underlying code of the application engines or to corresponding ones of the pipeline-specific scripts executed by the distributed computing components of FI computing system 130, and while maintaining compliance with the one or more process-validation operations or requirements and with the one or more governmental or regulatory requirements.

By way of example, consistent with the particular use-case, developer 103 may elect to train a machine-learning or artificial-intelligence process, such as gradient-boosted, decision-tree process (e.g., an XGBoost process), to predict a likelihood of an occurrence, or a non-occurrence, of a targeted event involving one or more customers of the financial institution during a future temporal interval, which may be separated from a temporal prediction point by a corresponding buffer temporal interval. The targeted event may include, but is not limited to, an application for a financial product or service available for provisioning by the financial institution, a request by a customer to modify a term or condition of a financial product or service provisioned to the customer by the financial institution, or an occurrence of an account- or usage-specific event involving the customer or the provisioned financial product or service, such as a delinquency event involving a secured credit product (e.g., a home mortgage, etc.) or unsecured credit product (e.g., a credit-card account) issued to the customers of the financial institution. In some instances, a predicted output of the trained machine-learning or artificial-intelligence process (e.g., the predicted likelihood of the occurrence, or non-occurrence of the targeted event during the future temporal interval), may support, or inform, one or more customer-facing or back-end decisioning operations involving the one or more customers.

To facilitate a customization of the sequential execution of the application engines within the established training pipeline in accordance with the particular use-case, executed web browser 108 may perform operations that generate one or more elements of a request 208 to access the elements of configuration data associated with corresponding ones of the application engines sequentially executed within the established training pipeline. By way of example, and as described herein, the default training pipeline may be established by the sequential execution of retrieval engine 156, preprocessing engine 158, indexing engine 160, target-generation engine 162, splitting engine 164, feature-generation engine 166, training engine 168, and reporting engine 172, in accordance with training pipeline script 150, and each of these sequentially executed application engines may be associated with a corresponding one of retrieval configuration data 157, preprocessing configuration data 159, indexing configuration data 161, target-generation configuration data 163, splitting configuration data 165, feature-generation configuration data 167, training configuration data 169, inferencing configuration data 171, and reporting configuration data 173, which may be maintained within configuration data store 140.

For example, access request 208 may include, among other things, one or more identifiers of developer computing system 102 or executed web browser 108, such as, but not limited to, an IP address of developer computing system 102, a media access control (MAC) address assigned to developer computing system 102, or a digital token or application cryptogram identifying executed web browser 108 (e.g., a digital token or application cryptogram generated or received while establishing the secure, programmatic channel of communications with executed programmatic web service 148). Access request 208 may also include data that identifies the default training pipeline relevant to the particular use case, e.g., a unique, alphanumeric identifier 210 of the training pipeline. Executed web browser 108 may perform operations that cause developer computing system 102 to transmit access request 208 across communications network 120 to FI computing system, 130, e.g., via the established, secure, programmatic channel of communications using one or more appropriate communications protocols.

In some instances, customization API 206 of executed customization application 204 may receive access request 208, and perform operations that determine whether FI computing system 130 permits a source of access request 208, e.g., developer computing system 102 or executed web browser 108, to access the elements of configuration data maintained within configuration data store 140. For example, customization API 206 may obtain, from access request 208, the one or more identifiers of developer computing system 102 or executed web browser 108, such as, but not limited to, the IP or MAC address of developer computing system 102 or the digital token or application cryptogram identifying executed web browser 108. Customization API 206 may also perform operations that determine, based on the one or more identifiers of developer computing system 102 or executed web browser 108, whether FI computing system 130 grants developer computing system 102 or executed web browser 108 permission to access the elements of configuration data maintained within configuration data store 140 (e.g., based on a comparison of the one or more identifiers against a compiled list of blocked computing devices, computing systems, or application programs). If customization API 206 were to establish that FI computing system 130 fails to grant developer computing system 102, or executed web browser 108, permission to access the elements of module-specific configuration data maintained within configuration data store 140, customization API 206 may discard access request 208 and FI computing system 130 may transmit an error message to developer computing system 102.

Alternatively, if customization API 206 were to establish that FI computing system 130 grants developer computing system 102 and/or executed web browser 108, permission to access the elements of configuration data maintained within configuration data store 140, customization API 206 may route access request 208 to executed customization application 204. In some instances, executed customization application 204 may obtain an identifier 210 of the training pipeline from access request 208, and based on identifier 210, customization application 204 may access script data store 136 and obtain training pipeline script 150, which upon execution by the one or more processors of FI computing system 130, triggers the sequential execution of retrieval engine 156, preprocessing engine 158, indexing engine 160, target-generation engine 162, splitting engine 164, feature-generation engine 166, training engine 168, and reporting engine 172 within the default training pipeline.

As described herein, training pipeline script 150 may call, or invoke, a programmatic interface associated with each of the sequentially executed application engines within the training pipeline, and the programmatic interfaces may ingest, among other things, input artifacts that include elements of configuration data associated with corresponding ones of the sequentially executed application engines and in some instances, output artifacts generated by one or more previously executed application engines within the default training pipeline. Executed customization application 204 may obtain, from training pipeline script 150, identifiers of the elements of configuration data associated with corresponding ones of retrieval engine 156, preprocessing engine 158, indexing engine 160, target-generation engine 162, splitting engine 164, feature-generation engine 166, training engine 168, and reporting engine 172. Based on the obtained identifiers, executed customization application 204 may access configuration data store 140 maintained within data repository 132, obtain one or more of the elements of retrieval configuration data 157, preprocessing configuration data 159, indexing configuration data 161, target-generation configuration data 163, splitting configuration data 165, feature-generation configuration data 167, training configuration data 169, inferencing configuration data 171, and reporting configuration data 173, and package these obtained elements into response 212 to access request 208.

Executed customization application 204 may perform operations that cause FI computing system 130 to transmit response 212, including the requested elements of engine-specific configuration data, across communications network 120 to developer computing system 102. In some instances, executed web browser 108 may receive response 212 and store response 212 within a corresponding portion of a tangible, non-transitory memory, such as within a portion of memory 104.

Figure 2B:
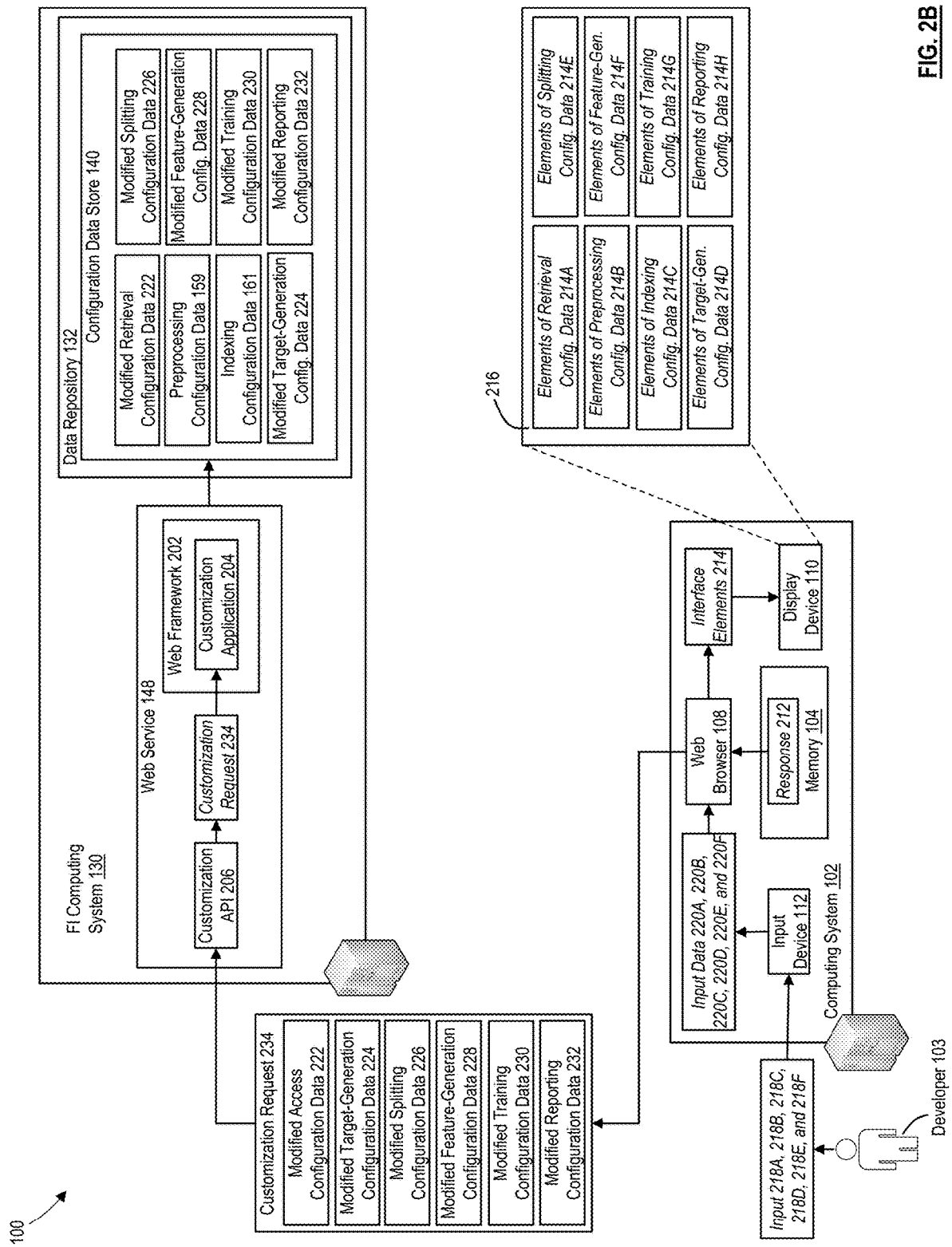

Referring to FIG. 2B, executed web browser 108 may access response 212 within memory 104, and may obtain the one or more requested elements of retrieval configuration data 157, preprocessing configuration data 159, indexing configuration data 161, target-generation configuration data 163, splitting configuration data 165, feature-generation configuration data 167, training configuration data 169, and reporting configuration data 173 from response 212. In some instances, executed web browser 108 may perform operations that process these requested elements of configuration data and generate corresponding interface elements 214, which executed web browser 108 may route to display device 110 of developer computing system 102.

Display device 110 may, for example, receive interface elements 214, which provide a graphical representation of the requested elements of configuration data associated with the default training pipeline, as described herein, and may render all, or a selected portion, of interface elements 214 for presentation within one or more display screens of digital interface 216. As illustrated in FIG. 2B, the one or more display screens of digital interface 216 may present interface elements 214A, which provide a graphical, and editable, representation of the requested elements of retrieval configuration data 157, interface elements 214B, which provide a graphical, and editable, representation of the requested elements of preprocessing configuration data 159, interface elements 214C, which provide a graphical, and editable, representation of the requested elements of indexing configuration data 161, and interface elements 214D, which provide a graphical, and editable, representation of the requested elements of target-generation configuration data 163. Further, the one or more display screens of digital interface 216 may present interface elements 214E, which provide a graphical, and editable, representation of the requested elements of splitting configuration data 165, interface elements 214F, which provide a graphical, and editable, representation of the requested elements of feature-generation configuration data 167, interface elements 214G, which provide a graphical, and editable, representation of the requested elements of training configuration data 169, and interface elements 214H, which provide a graphical, and editable, representation of the requested elements of reporting configuration data 173.

As described herein, the elements of retrieval configuration data 157, preprocessing configuration data 159, indexing configuration data 161, target-generation configuration data 163, splitting configuration data 165, feature-generation configuration data 167, training configuration data 169, and reporting configuration data 173 may specify one or more default or standardized operations performed by corresponding ones of the sequentially executed application engines within the default training pipeline, along with corresponding default values of one or more parameters for these default or standardized operations. In some instances, and based on input perceived from developer 103 via input device 112, developer computing system 102 may perform operations that update, modify, or customize corresponding portions of the elements of retrieval configuration data 157, preprocessing configuration data 159, indexing configuration data 161, target-generation configuration data 163, splitting configuration data 165, feature-generation configuration data 167, training configuration data 169, and reporting configuration data 173 to reflect, the particular use-case of interest to developer 103, e.g., the training of the gradient-boosted, decision-tree process (e.g., the XGBoost process) to predict the likelihood of the occurrence, or the non-occurrence, of the targeted event involving the one or more customers during the future temporal interval.

In some instances, to facilitate the modification and customization of the elements of retrieval configuration data 157 to reflect the particular use-case, developer 103 may review interface elements 214A and may provide, to input device 112, elements of developer input 218A that, among other things, specify a unique identifier of each source data table that supports the adaptive training of the gradient-boosted, decision-tree process in accordance with the particular use-case, as described herein, a primary key or composite primary key of each of the source data tables, and a network address of an accessible data repository that maintains each of the source data tables, e.g., a file path or an IP address of source data store 134, etc. Input device 112 may, for example, may receive developer input 218A, and may route corresponding elements of input data 220A to executed web browser 108, which may modify the elements of retrieval configuration data 157 to reflect input data 220A and generate corresponding elements of modified retrieval configuration data 222.

Further, upon review interface elements 214B and 214C of digital interface 216, developer 103 may not elect to modify any of the elements of preprocessing configuration data 159 or indexing configuration data 161. Instead, developer 103 may elect to rely on the default preprocessing and data-indexing operations performed by corresponding ones of preprocessing engine 158 and indexing engine 160 within the default training pipeline, and on the default values for the one or more parameters of these application engines specified within corresponding ones of the elements of preprocessing engine 158, indexing engine 160.

Upon review of interface elements 214D and interface elements 214E of digital interface 216, developer 103 may elect to modify and customize one or more of the elements of target-generation configuration data 163 and splitting configuration data 165 to reflect the particular use-case of interest to developer 103. For example, to customize the elements of target-generation configuration data 163, developer 103 may provide, to input device 112, elements of developer input 218B that, among other things, specify a duration of the buffer temporal interval and the future temporal interval for the particular use-case (e.g., six months and three months, respectively, etc.), along with logic that defines the target event for the particular use-case and facilitates a detection of the target event when applied to elements of the preprocessed source data tables, such as, but not limited to, one or more helper scripts executable in the namespace of executed target-generation engine 162 within the training pipeline, etc. In some instances, input device 112 may receive developer input 218B, and may route corresponding elements of input data 220B to executed web browser 108, which may modify the elements of target-generation configuration data 163 to reflect input data 220B and generate corresponding elements of modified target-generation configuration data 224.

Further, to customize the elements of splitting configuration data 165, developer 103 may also provide, to input device 112, elements of developer input 218C that, among other things, specify one of a plurality of default data-partitioning or data-splitting processes of interest to developer 103 and of relevance the particular use case (e.g., via helper scripts callable within the namespace of splitting engine 164), along with corresponding values of one or more parameters of the specified data-partitioning or data-splitting process. As described herein, examples of these default data-partitioning or data-splitting processes may include, but are not limited to, time-series splitting process, a random splitting process, a targeted, stratified splitting process.

By way of example, and for the particular use-case of interest, developer 103 may elect to partition the labelled, indexed, and preprocessed dataframes through an implementation of a time-series splitting process by splitting engine 164, and developer 103 may provide, to input device 112, corresponding elements of developer input 218C that identify and specify the selected time-series splitting process (e.g., via helper scripts callable within the namespace of splitting engine 164, etc.). Further, within corresponding elements of developer input 218C, developer 103 may also specify parameter values for the time-series splitting process that include, but are not limited to, a temporal splitting point (e.g., Jan. 1, 2023, etc.) and data specifying populations of in-sample and out-partitions of a particular dataset or dataframe (e.g., a first percentage of the rows of a temporally partitioned dataframe represent "in-sample" rows, and a second percentage of the rows of the temporally partitioned dataframe represent "out-of-sample" rows, etc.). In some instances, input device 112 may receive developer input 218C, and may route corresponding elements of input data 220C to executed web browser 108, which may modify the elements of splitting configuration data 165 to reflect input data 220C and generate elements of modified splitting configuration data 226.

Upon review of interface elements 214F of digital interface 216, developer 103 may elect to modify and customize one or more of the elements of feature-generation configuration data 167 to reflect the particular use-case. By way of example, and as described herein, feature-generation configuration data 167 may specify one or more default preprocessing operations, such as, but not limited to, one or more temporal filtration operations, one or more customer-, account-, or transaction-specific filtration operations, one or more join operations (e.g., an inner- or outer-join operations, etc.), operations that establish a presence or absence of columns associated with each of the primary keys within the source data tables (e.g., the primary keys within the labelled PKI dataframe), and operations that partition the preprocessed source data tables into corresponding partitioned source data tables appropriate train, validate, and test a machine-learning or artificial-intelligence process (e.g., the corresponding training, validation, and testing feature data tables described herein). The elements of feature-generation configuration data 167 may also maintain default values for one, or more, of these exemplary default preprocessing operations.

Further, and as described herein, the elements of feature-generation configuration data 167 may also specify one or more sequentially ordered feature values of a feature vector (e.g., values of "default" features), and in some instances, one or more operations that, when applied to the rows of one or more data tables, facilitate a generation, by executed feature-generation engine 166 within the training pipeline, of a corresponding feature vector of discrete feature values. The elements of feature-generation configuration data 167 may specify each, or a subset of, the operations as helper scripts callable in a namespace of executed feature-generation engine 166.

In some instances, developer 103 may provide, to input device 112, additional elements of developer input 218D that modify (or delete) one or more of the specified default feature values and corresponding ones of the helper scripts in accordance with the particular use-case and additionally, or alternatively, may provide further elements of developer input 218D that, consistent with a format or structure of feature-generation configuration data 167, specify one or more additional feature values of relevance to the particular use-case and corresponding helper scripts that, when called or involved in the namespace of feature-generation engine 166, determine the corresponding, additional feature value based on the training feature table. Input device 112 may, for example, receive developer input 218D, and may route corresponding elements of input data 220D to executed web browser 108, which modify the elements of feature-generation configuration data 167 to reflect input data 220D and generate corresponding elements of modified feature-generation configuration data 228.

Further, upon review of interface elements 214G and interface elements 214H of digital interface 216, developer 103 may elect to modify and customize one or more of the elements of training configuration data 169 and reporting configuration data 173 to reflect the particular use-case. By way of example, developer 103 may provide, to input device 112, elements of developer input 218E that, among other things, specify one of a plurality of default machine-learning or artificial-intelligence processes available for training by executed training engine 168 within the training pipeline, which may be interest to developer 103 and of relevance the particular use case. Further, developer 103 may also provide additional elements of developer input 218E to input device 112 that establish or modify a value of one or more default parameters of the specified machine-learning or artificial-intelligence processes (or alternatively, an identifier and location of an ingestible artifact specifying the one or more default parameter values).

In some instances, the elements of developer input 218E provisioned by developer 103 to developer computing system 102 (e.g., via input device 112) may include data that identifies the gradient-boosted, decision-tree process (e.g., via a corresponding default script callable within the namespace of training engine 168, via a corresponding file system path, etc.), and a value of one or more default parameters of the gradient-boosted, decision-tree process, which may facilitate an instantiation of the gradient-boosted, decision-tree process during an initial phase within the training pipeline (e.g., by executed training engine 168).

Examples of these default parameter values for the specified gradient-boosted, decision-tree process may include, but are not limited to, a learning rate, a number of discrete decision trees (e.g., the "n_estimator" for the trained, gradient-boosted, decision-tree process), a tree depth characterizing a depth of each of the discrete decision trees, a minimum number of observations in terminal nodes of the decision trees, and/or values of one or more hyperparameters that reduce potential model overfitting. Further, in some instances, the elements of developer input 218E may also specify a structure of format of the elements of predictive output, and a structure of format of the generated inferencing logs (e.g., as an output file having a corresponding file format accessible at developer computing system 102, such as a PDF or a DOCX file). Input device 112 may, for example, receive developer input 218E, and may route corresponding elements of input data 220E to executed web browser 108, which may modify the elements of training configuration data 169 to reflect input data 220E and generate corresponding elements of modified training configuration data 230.

Further, as described herein, the elements of reporting configuration data 173 may specify a default composition and structure of the elements of pipeline monitoring data (e.g., that characterize a successful, or failed application, of each of the application engines within the default training pipeline) and the elements of pipeline validation data (e.g., that that characterize the adaptive training, validation, and machine-learning or artificial-intelligence process within the default training pipeline) generated by reporting engine 172 upon execution within the default training pipeline. In some instances, upon review interface elements 214H of digital interface 216, developer 103 may elect not to modify the default composition of either of the pipeline monitoring data or the pipeline explainability data, but may also provide, to input device 112, elements of developer input 218F that, among other things, specifying that reporting engine 172 generate the pipeline monitoring data and pipeline validation data in DOCX format. Input device 112 may receive developer input 218F, and may route corresponding elements of input data 220F to executed web browser 108, which may perform operations that modify the elements of training configuration data 169 to reflect input data 220F and generate elements of modified reporting configuration data 232.

Executed web browser 108 may package the elements of modified retrieval configuration data 222, modified target-generation configuration data 224, modified splitting configuration data 226, modified feature-generation configuration data 228, modified training configuration data 230, and modified reporting configuration data 232 into corresponding portions of a customization request 234. In some instances, executed web browser 108 may also package, into an additional portion of customization request 234, identifier 210 of the default training pipeline, the one or more identifiers of developer computing system 102 or executed web browser 108, such as, but not limited to, the IP or MAC address of developer computing system 102, or the digital token or application cryptogram identifying executed web browser 108. Executed web browser 108 may also perform operations that cause developer computing system 102 to transmit customization request 234 across communications network 120 to FI computing system 130.

In some instances, customization API 206 of executed customization application 204 may receive customization request 234, and perform any of the exemplary processes described herein to determine whether FI computing system 130 permits a source of customization request 234, e.g., developer computing system 102 or executed web browser 108, to modify or customize the elements of configuration data maintained within configuration data store 140. If, for example customization API 206 were to establish that FI computing system 130 fails to grant developer computing system 102, or executed web browser 108, permission to modify or customize the elements of configuration data maintained within configuration data store 140, customization API 206 may discard customization request 234 and FI computing system 130 may transmit a corresponding error message to developer computing system 102. Alternatively, if customization API 206 were to establish that FI computing system 130 grants developer computing system 102 and/or executed web browser 108, permission to modify or customize the elements of configuration data maintained within configuration data store 140, customization API 206 may route customization request 234 to executed customization application 204.

Executed customization application 204 may obtain, from customization request 234, identifier 210 and the elements of modified retrieval configuration data 222, modified target-generation configuration data 224, modified splitting configuration data 226, modified feature-generation configuration data 228, modified training configuration data 230, and modified reporting configuration data 232, which reflect a customization of the default elements of engine-specific configuration data associated with the default training pipeline. Based on identifier 210, executed customization application 204 may access the elements of engine-specific configuration data maintained within configuration data store 140, and perform operations that replace, or modify, the elements of engine-specific configuration data based on corresponding ones of the elements of modified retrieval configuration data 222, modified target-generation configuration data 224, modified splitting configuration data 226, modified feature-generation configuration data 228, modified training configuration data 230, and modified reporting configuration data 232.

Through a modification of one or more of the elements of engine-specific configuration data in accordance with the particular use-case of interest to developer 103, the exemplary processes described herein may enable developer computing system 102 to customize the sequential, pipelined execution of the application engines within the default training pipeline to reflect the particular use-case without any modification, by developer computing system 102, to training pipeline script 150, or to the underlying code of any of the application engines executed sequentially within the default training pipeline by the distributed computing components of FI computing system 130. Further, the one or more processors of FI computing system 130 (e.g., the distributed computing components of FI computing system 130) may perform operations, described herein, that establish the default training pipeline, and sequentially execute the application engines within the default training pipeline in accordance with the elements of engine-specific configuration data, which may be customized to reflect the particular use-case of interest to developer 103 using any of the exemplary processes described herein. In some instances, through a sequential execution of the application engines in accordance with the customized elements of engine-specific configuration data within the default training pipeline, one or more of the exemplary processes described herein may facilitate an adaptive training of the machine-learning or artificial-intelligence process of relevance to the particular use-case without requiring modification to any underlying code of the application engines or modification to an execution flow of the default training pipeline.

Figure 3A:
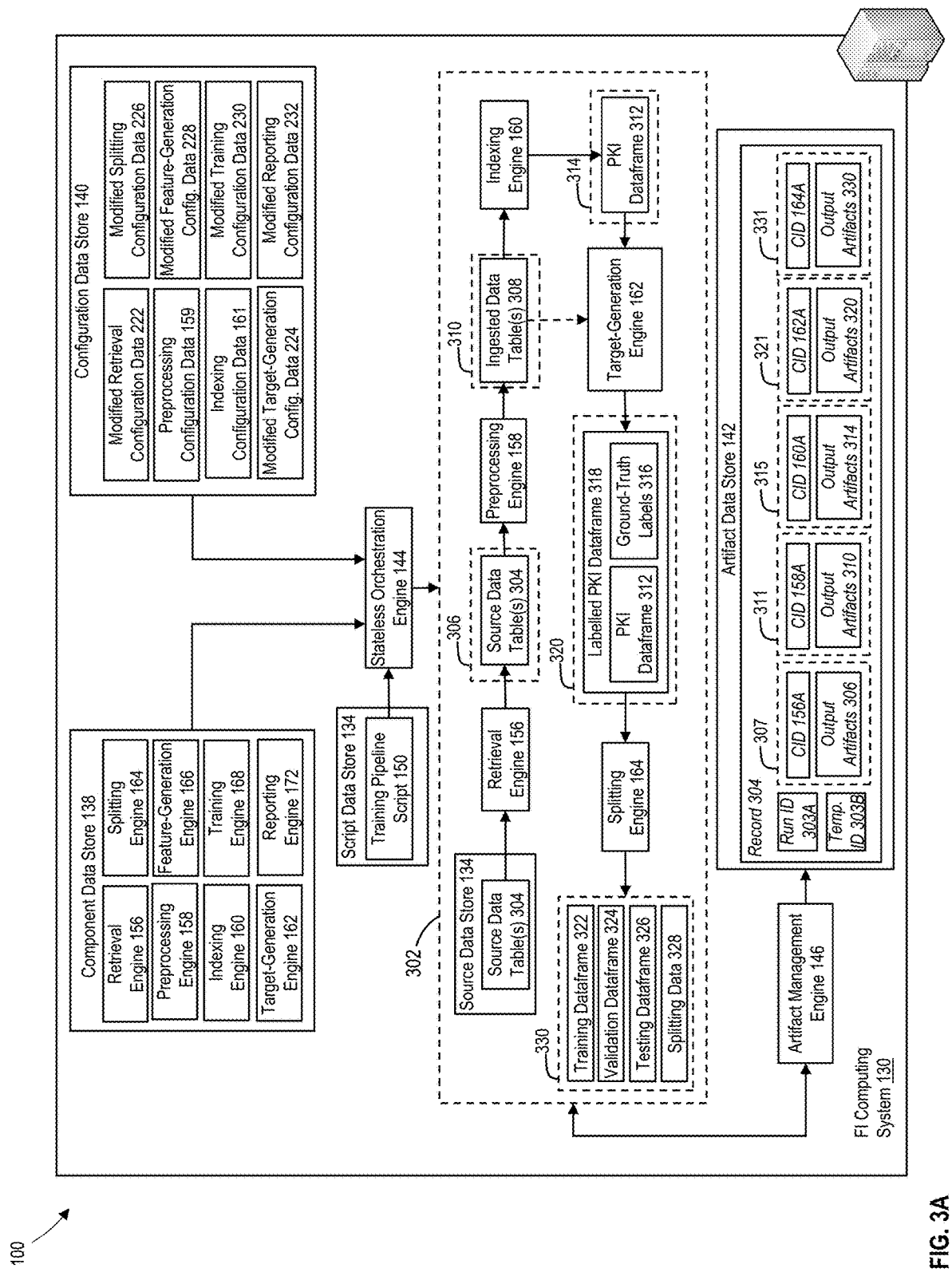

Referring to FIG. 3A, the one or more processors of FI computing system 130 may execute orchestration engine 144, which may access script data store 136 and obtain training pipeline script 150. Training pipeline script 150 may specify the execution flow of the default training pipeline (e.g., an order of sequential execution of each of the application engines within the default training pipeline) and may include, for each of the sequentially executed application engines, data identifying corresponding elements of engine-specific configuration data, one or more input artifacts ingested by the sequentially executed application engine, and additionally, or alternatively, one or more output artifacts generated by the sequentially executed application engine. By way of example, and as described herein, the default training pipeline may include retrieval engine 156, preprocessing engine 158, indexing engine 160, target-generation engine 162, splitting engine 164, feature-generation engine 166, training engine 168, and reporting engine 172, which may be executed sequentially by the one or more processors in accordance with the execution flow specified by executed training pipeline script 150.

In some instances, executed orchestration engine 144 may trigger an execution of training pipeline script 150 by the one or more processors of FI computing system 130, which may establish the default training pipeline, e.g., default training pipeline 302. Upon execution of training pipeline script 150, and establishment of default training pipeline 302, executed orchestration engine 144 may generate a unique, alphanumeric identifier, e.g., run identifier 303A, for a current implementation, or "run," of default training pipeline 302, and executed orchestration engine 144 may provision run identifier 303A to artifact management engine 146, e.g., via a corresponding programmatic interface, such as an artifact application programming interface (API). Upon execution by the one or more processors of FI computing system 130, artifact management engine 146 may perform operations that, based on run identifier 303A, associate a data record 304 of artifact data store 142 with the current run of default training pipeline 302, and that store run identifier 303A within data record 304 along with a temporal identifier 303B indicative of a date om which executed orchestration engine 144 established default training pipeline 303 (e.g., on Oct. 1, 2023)

As described herein, upon execution by the one or more processors of FI computing system 130, each of retrieval engine 156, preprocessing engine 158, indexing engine 160, target-generation engine 162, splitting engine 164, feature-generation engine 166, training engine 168, and reporting engine 172 may ingest one or more input artifacts and corresponding elements of configuration data specified within executed training pipeline script 150, and may generate one or more output artifacts. In some instances, executed artifact management engine 146 may obtain the output artifacts generated by corresponding ones of executed retrieval engine 156, preprocessing engine 158, indexing engine 160, target-generation engine 162, splitting engine 164, feature-generation engine 166, training engine 168, and reporting engine 172, and store the obtained output artifacts within portions of data record 304, e.g., in conjunction within a unique, alphanumeric component identifier of a corresponding one of the executed application engines.

Further, in some instances, executed artifact management engine 146 may also maintain, in conjunction with the component identifier and corresponding output artifacts within data record 304, data characterizing input artifacts ingested by one, or more, of executed retrieval engine 156, preprocessing engine 158, indexing engine 160, target-generation engine 162, splitting engine 164, feature-generation engine 166, training engine 168, and reporting engine 172. In some instances, the inclusion of the data characterizing the input artifacts ingested by a corresponding one of these executed application engines within default training pipeline 302, and the association of the data characterizing the ingested input artifacts with the corresponding component identifier and run identifier 303A, may establish an artifact lineage that facilitates an audit of a provenance of an artifact ingested by the corresponding one of the executed application engines during the current implementation of run of default training pipeline 302 (e.g., associated with run identifier 303A), and recursive tracking of the generation or ingestion of that artifact across the current run of default training pipeline 302 (e.g., associated with run identifier 303A) and one or more prior runs of default training pipeline 302 (or of the default inferencing and target-generation pipelines described herein).

Referring back to FIG. 3A, executed training pipeline script 150 may trigger an execution of retrieval engine 156 by the one or more one or more processors of FI computing system 130, and orchestration engine 144 may provision one or more the elements of modified retrieval configuration data 222 to a programmatic interface associated with executed retrieval engine 156 (e.g., as input artifacts). In some instances, the programmatic interface may perform any of the exemplary processes described herein to establish a consistency of the ingested input artifacts with the engine- and pipeline-specific operational constraints imposed on executed retrieval engine 156. Based on an established consistency of the input artifacts with the imposed engine- and pipeline-specific operational constraints, executed retrieval engine 156 may obtain, from the elements of modified retrieval configuration data 222, the unique identifier of each of the one or more source data tables, the primary key or composite primary key of each of the source data tables, and the network address of an accessible data repository that maintains each of the source data tables. Based on the obtained identifiers of the source data tables, and on the network address of an accessible data repository (e.g., source data store 134), executed retrieval engine 156 may access source data store 134 and obtain one or more of source data table(s) 304 associated with the particular usecase.

In some instances, executed retrieval engine 156 may perform operations that provision source data table(s) 304 to executed artifact management engine 146, e.g., as output artifacts 306 of executed retrieval engine 156. In some instances, executed artifact management engine 146 may receive each of output artifacts 306 via the artifact API, and may perform operations that package each of output artifacts 306 into a corresponding portion of retrieval artifact data 307, along with a unique, alphanumeric component identifier 156A of executed retrieval engine 156, and that store retrieval artifact data 307 within a corresponding portion of artifact data store 142, e.g., within data record 304 associated with default training pipeline 302 and run identifier 303A. Further, although not illustrated in FIG. 3A, executed artifact management engine 146 may also package, into a corresponding portion of retrieval artifact data 307, additional data identifying and characterizing one or more of the input artifacts ingested by executed retrieval engine 156, such as, but not limited to, the elements of modified retrieval configuration data 222.

Further, and in accordance with default training pipeline 302, executed retrieval engine 156 may provide output artifacts 306, including source data table(s) 304, as inputs to preprocessing engine 158 executed by the one or more processors of FI computing system 130, and executed orchestration engine 144 may provision one or more of the elements of preprocessing configuration data 159 maintained within configuration data store 140 to executed preprocessing engine 158, e.g., in accordance with executed training pipeline script 150. A programmatic interface associated with executed preprocessing engine 158 may, for example, ingest each of source data table(s) 304 and the elements of preprocessing configuration data 159 (e.g., as corresponding input artifacts), and may perform any of the exemplary processes described herein to establish a consistency of the corresponding input artifacts with the engine- and pipeline-specific operational constraints imposed on executed preprocessing engine 158.

Based on an established consistency of the input artifacts with the imposed engine- and pipeline-specific operational constraints, executed preprocessing engine 158 may perform operations that apply each of the default preprocessing operations to corresponding ones of source data table(s) 304 in accordance with the elements of preprocessing configuration data 159 (e.g., through an execution or invocation of each of the helper scripts within the namespace of executed preprocessing engine 158, etc.). Examples of these default preprocessing operations may include, but are not limited to, a default temporal or customer-specific filtration operation, a default table flattening or de-normalizing operation, and a default table joining operation (e.g., an inner- or outer-join operations, etc.). Further, and based on the application of each of the default preprocessing operations to source data table(s) 304, executed preprocessing engine 158 may also generate ingested data table(s) 308 having identifiers, and structures or formats, consistent with the default identifier, and default structures or formats, specified within the elements of preprocessing configuration data 159.

Executed preprocessing engine 158 may perform operations that provision ingested data table(s) 308 to executed artifact management engine 146, e.g., as output artifacts 310 of executed preprocessing engine 158. In some instances, executed artifact management engine 146 may receive each of output artifacts 310 via the artifact API, and may perform operations that package each of output artifacts 310 into a corresponding portion of preprocessing artifact data 311, along with a unique, alphanumeric, component identifier 158A of executed preprocessing engine 158, and that store preprocessing artifact data 311 within a corresponding portion of artifact data store 142, e.g., within data record 304 associated with default training pipeline 302 and run identifier 303A. Further, although not illustrated in FIG. 3A, executed artifact management engine 146 may also package, into a corresponding portion of preprocessing artifact data 311, additional data identifying and characterizing the input artifacts ingested by executed preprocessing engine 158, such as, but not limited to, the elements of preprocessing configuration data 159 and source data table(s) 304.

Further, and in accordance with default training pipeline 302, executed preprocessing engine 158 may provide output artifacts 310, including ingested data table(s) 310, as inputs to indexing engine 160 executed by the one or more processors of FI computing system 130, and executed orchestration engine 144 may provision one or more elements of indexing configuration data 161 maintained within configuration data store 140 to executed indexing engine 160. As described herein, the elements of indexing configuration data 161 may include, among other things, an identifier of each of the ingested data table(s) 308, the primary key or composite primary key of each of each of the ingested data table(s) 308, data characterizing a structure, format, or storage location of an element of output artifact data generated by executed indexing engine 160, such as the PKI dataframe described herein, and one or more constraints imposed on the element of output artifact data, such as, but not limited to, the uniqueness constraints imposed on the generated PKI dataframe.

In some instances, a programmatic interface associated with executed indexing engine 160 may receive ingested data table(s) 310 and the elements of indexing configuration data 161 (e.g., as corresponding input artifacts), and may perform any of the exemplary processes described herein to establish a consistency of the corresponding input artifacts with the engine- and pipeline-specific operational constraints imposed on executed indexing engine 160. Based on an established consistency of the input artifacts with the imposed engine- and pipeline-specific operational constraints, executed indexing engine 160 may perform operations, consistent with the elements of indexing configuration data 161, that access each of ingested data table(s) 308, select one or more columns from each of the each of ingested data table(s) 308 that are consistent with the corresponding primary key (or composite primary key), and generate a dataframe, e.g., PKI dataframe 312, that includes the entries of each of the selected columns.

PKI dataframe 312 may, for example, include a plurality of discrete rows populated with corresponding ones of the entries of each of the selected columns, e.g., the values of corresponding ones of the primary keys (or composite primary keys) obtained from each of ingested data table(s) 308. Examples of these primary keys (or composite primary keys) may include, but are not limited to, a unique, alpha-numeric identifier assigned to corresponding customers by the financial institution, and temporal data, such as a timestamp, associated with a corresponding one of ingested data table(s) 308. In some instances, the entries maintained within PKI dataframe 312 may represent a base population for one or of the exemplary target-generation, feature-generation, and adaptive training processes performed by the one or more processors of FI computing system 130 within default training pipeline 302 (e.g., in accordance with executed training pipeline script 150) and further, the entries maintained within PKI dataframe 312 may establish an index set for ingested data table(s) 308 subject to one, or more, column-specific uniqueness constraints, such as, but not limited to, a SQL UNIQUE constraint.

Executed indexing engine 160 may perform operations that provision PKI dataframe 312 to executed artifact management engine 146, e.g., as an output artifact 314 of executed indexing engine 160. In some instances, executed artifact management engine 146 may receive output artifact 314 via the artifact API, and may package output artifacts 314 into a corresponding portion of indexing artifact data 315, along with a unique component identifier 160A of executed indexing engine 160, and that store indexing artifact data 315 within a corresponding portion of artifact data store 142, e.g., within data record 304 associated with default training pipeline 302 and run identifier 303A. Further, although not illustrated in FIG. 3A, executed artifact management engine 146 may also package, into a corresponding portion of retrieval artifact data 307, additional data identifying and characterizing one or more of the input artifacts ingested by executed indexing engine 160, such as, but not limited to, ingested data table(s) 308 and the elements of indexing configuration data 161.

Further, and in accordance with default training pipeline 302, executed indexing engine 160 may provide output artifact 314, including PKI dataframe 312 as inputs to target-generation engine 162 executed by the one or more processors of FI computing system 130, and executed orchestration engine 144 may provision the elements of modified target-generation configuration data 224 maintained within configuration data store 140 to target-generation engine 162. Further, and based on programmatic communications within executed artifact management engine 146, executed orchestration engine 144 may also provision output artifacts 310, including ingested data table(s) 308, as further inputs to target-generation engine 162. As described herein, the elements of modified target-generation configuration data 224 may include, among other things, data specifying a logic and a value of one or more corresponding parameters for constructing the ground-truth label for each row of PKI dataframe 312, which may customized to reflect the particular use-case of interest to developer 103 using any of the exemplary processes described herein.

By way of example, the ground-truth labels may support an adaptive training of a forward-in-time machine-learning or artificial-intelligence process (such as, but not limited to, a gradient-boosted, decision-tree process, e.g., an XGBoost process), which may facilitate a prediction, at a temporal prediction point, of a likelihood of an occurrence, or a non-occurrence, of a target event during a future temporal interval, which may be separated from the temporal prediction point by a corresponding buffer interval. To facilitate the generation of the ground-truth labels by executed target-generation engine 162, the elements of modified target-generation configuration data 224 may include values specifying a duration of the future temporal interval and a duration of the buffer interval, along with logic that defines the corresponding target event and facilitates the detection of the corresponding target event when applied to elements of the preprocessed source data table or tables, and the specified logic and the specified values may each be customized to reflect the particular use-case of interest to developer 103 using any of the exemplary processes described herein In some instances, a programmatic interface associated with executed target-generation engine 162 may receive each of ingested data table(s) 308, PKI dataframe 312, and the elements of modified target-generation configuration data 224 (e.g., as corresponding input artifacts), and may perform any of the exemplary processes described herein to establish a consistency of the corresponding input artifacts with the engine- and pipeline-specific operational constraints imposed on executed target-generation engine 162. Based on an established consistency of the input artifacts with the imposed engine- and pipeline-specific operational constraints, executed target-generation engine 162 may perform operations that, consistent with the elements of modified target-generation configuration data 224, generate a corresponding one of ground-truth labels 316 for each row of PKI dataframe 312. By way of example, each row of PKI dataframe 312 may be associated with, among other things, a corresponding customer of the financial institution (e.g., via a customer identifier, etc.) and corresponding temporal data (e.g., a timestamp, etc.), which may establish a temporal prediction point for the generation of the corresponding one of ground-truth labels 316.

In some instances, executed target-generation engine 162 may perform operations that, for each row of PKI dataframe 312, access portions of ingested data table(s) 308 associated with the corresponding customer, and apply the logic maintained within the elements of modified target-generation configuration data 224 to the accessed portions of ingested data table(s) 308 in accordance with the specified parameter values. Based on the application of the logic to the accessed portions of ingested data table(s) 308, executed target-generation engine 162 may determine the occurrence, or non-occurrence, of the corresponding target event during the future temporal interval, which may be disposed subsequent to the temporal prediction point and which may be separated from the corresponding temporal prediction point by the specified buffer interval, and may generate, for each row of PKI dataframe 312, the corresponding one of ground-truth labels 316 indicative of a determined occurrence of the corresponding target event during the specified future temporal interval (e.g., a "positive" target associated with a ground-truth label of unity) or alternatively, a determined non-occurrence of the corresponding target event during the specified future temporal interval (e.g., a "negative" target associated with a ground-truth label of zero).

Executed target-generation engine 162 may also append each of generated ground-truth labels 316 to the corresponding row of PKI dataframe 312, and generate elements of a labelled PKI dataframe 318 that include each row of PKI dataframe 312 and the appended one of ground-truth labels 316. In some instances, executed target-generation engine 162 may perform operations that provision labelled PKI dataframe 318 to executed artifact management engine 146, e.g., as output artifacts 320 of executed target-generation engine 162 retrieval engine 156. In some instances, executed artifact management engine 146 may receive each of output artifacts 320 via the artifact API, and may perform operations that package each of output artifacts 320 into a corresponding portion of target-generation artifact data 321, along with a unique component identifier 162A of executed target-generation engine 162, and that store target-generation artifact data 321 within a corresponding portion of artifact data store 142, e.g., within data record 304 associated with default training pipeline 302 and run identifier 303A. Further, although not illustrated in FIG. 3A, executed artifact management engine 146 may also package, into a corresponding portion of target-generation artifact data 321, additional data identifying and characterizing one or more of the input artifacts ingested by executed target-generation engine 162, such as, but not limited to, ingested data table(s) 308, PKI dataframe 312, and the elements of modified target-generation configuration data 224.

Executed target-generation engine 162 may provide output artifacts 320, including labelled PKI dataframe 318 (e.g., maintaining each the rows of PKI dataframe 312 and the appended ones of ground-truth labels 316) as inputs to splitting engine 164 executed by the one or more processors of FI computing system 130. Additionally, in some instances, executed orchestration engine 144 may provision one or more elements of modified splitting configuration data 226 maintained within configuration data store 140 to executed splitting engine 164 in accordance with default training pipeline 302.

The elements of modified splitting configuration data 226 may include, among other things, data specifying a selected one of a plurality of default data-partitioning or data-splitting processes associated with the particular use-case of interest to developer 103, along with a value of one or more parameters of the selected one of the default data-partitioning or data-splitting processes, and in some instances, data specifying a structure, format, or composition of the partitioned dataframes generated by executed splitting engine 164. As described herein, the data specifying the selected one of the default data-partitioning or data-splitting processes may include, but is not limited to, helper scripts callable within the namespace of splitting engine 164, and the data specifying the selected one of the default data-partitioning or data-splitting processes, and the values of the process-specific parameters, may each be customized to reflect the particular use-case of interest to developer 103 using any of the exemplary processes described herein.

By way of example, developer 103 may elect to partition labelled PKI dataframe 318 through an implementation of a default time-series splitting process by executed splitting engine 164, and the elements of modified splitting configuration data 226 may include a helper script, executable within the namespace of executed splitting engine 164, that causes the one or more processors of FI computing system 130 to apply the default time-series splitting process to labelled PKI dataframe 318 in accordance with the specified parameter values. For example, the specific parameter values may include, but are not limited to, a temporal splitting point for the default time-series splitting process (e.g., Jan. 1, 2023, etc.) and data specifying populations of in-sample and out-partitions for the default time-series splitting process (e.g., a first percentage of the rows of a temporally partitioned dataframe that represent "in-sample" rows, and a second percentage of the rows of the temporally partitioned dataframe that represent "out-of-sample" rows, etc.).

A programmatic interface associated with executed splitting engine 164 may receive labelled PKI dataframe 318 and the elements of modified splitting configuration data 226 (e.g., as corresponding input artifacts), and may perform any of the exemplary processes described herein to establish a consistency of the corresponding input artifacts with the engine- and pipeline-specific operational constraints imposed on executed splitting engine 164. Based on an established consistency of the input artifacts with the imposed engine- and pipeline-specific operational constraints, executed splitting engine 164 may perform operations that, consistent with the elements of modified splitting configuration data 226, partition labelled PKI dataframe 318 into a plurality of partitioned dataframes suitable for training, validating, and testing a machine-learning or artificial process within default training pipeline 302. As described herein, each of the partitioned dataframes may include a partition-specific subset of the rows of labelled PKI dataframe 318, each of which include a corresponding row of PKI dataframe 312 and the appended one of ground-truth labels 316.

By way of example, and based the elements of modified splitting configuration data 226, executed splitting engine 164 may apply the default time-series splitting process to labelled PKI dataframe 318, and based on the application of the default time-series splitting process to the rows of labelled PKI dataframe 318, executed splitting engine 164 may partition the rows of labelled PKI dataframe 318 into a distinct training dataframe 322, a distinct validation dataframe 324, and a distinct testing dataframe 326 appropriate to train, validate, and subsequently test the machine-learning or artificial-intelligence process (e.g., the gradient-boosted, decision-tree process, such as the XGBoost process) using any of the exemplary processes described herein. Each of the rows of labelled PKI dataframe 318 may include, among other things, a unique, alphanumeric customer identifier and an element of temporal data, such as a corresponding timestamp. In some instances, and based on a comparison between the corresponding timestamp and the temporal splitting point maintained within the elements of modified splitting configuration data 226, executed splitting engine 164 may assign each of the rows of labelled PKI dataframe 318 to an intermediate, in-time partitioned dataframe (e.g., based on a determination that the corresponding timestamp is disposed prior to, or concurrent with, the temporal splitting point of Jan. 1, 2023) or to an intermediate, out-of-time partitioned dataframe (e.g., based on a determination that the corresponding timestamp is disposed subsequent to the temporal splitting point of Jan. 1, 2023).

Executed splitting engine 164 may also perform operations, consistent with the elements of modified splitting configuration data 226, that further partition the intermediate, in-time partitioned dataframe into corresponding ones of an in-time, and in-sample, partitioned dataframe and an in-time, and out-of-sample, partitioned dataframe. For instance, and as described herein, the elements of modified splitting configuration data 226 may include sampling data characterizing populations of the in-sample and out-partitions for the default time-series splitting process (e.g., a first percentage of the rows of a temporally partitioned dataframe represent "in-sample" rows, and a second percentage of the rows of the temporally partitioned dataframe represent "out-of-sample" rows, etc.). Examples of the first predetermined percentage include, include, but are not limited to, 50%, 75%, or 80%, and corresponding examples of the second predetermined percentage include, but are not limited to, 50%, 25%, or 20% (e.g., a difference between 100% and the corresponding first predetermined percentage).

Based on the elements of sampling data, executed splitting engine 164 may allocate, to the in-time, and in-sample, partitioned dataframe, the first predetermined percentage of the rows of labelled PKI dataframe 318 assigned to the intermediate, in-time partitioned dataframe, and may allocate, in-time, and out-of-sample, partitioned dataframe, the second predetermined percentage of the rows of labelled PKI dataframe 318 assigned to the intermediate, in-time partitioned dataframe. In some instances, the rows of labelled PKI dataframe 318 allocated to the in-time, and in-sample, partitioned dataframe may establish training dataframe 322, the rows of labelled PKI dataframe 318 allocated to the in-time, and out-of-sample, partitioned dataframe may establish validation dataframe 324, and the rows of labelled PKI dataframe 318 assigned to the intermediate, out-of-time partitioned dataframe (e.g., including both in-sample and out-of-sample row) may establish testing dataframe 326.

In some instances, executed splitting engine 164 may perform operations that provision training dataframe 322, validation dataframe 324, and testing dataframe 326, and elements of splitting data 328 that characterize the temporal splitting point and the in-sample and out-of-sample populations of the default time-series splitting process to executed artifact management engine 146, e.g., as output artifacts 330 of executed splitting engine 164. In some instances, executed artifact management engine 146 may receive each of output artifacts 330 via the artifact API, and may perform operations that package each of output artifacts 330 into a corresponding portion of splitting artifact data 331, along with a unique component identifier 164A of executed splitting engine 164, and that store splitting artifact data 331 within a corresponding portion of artifact data store 142, e.g., within data record 304 associated with default training pipeline 302 and run identifier 303A. Further, although not illustrated in FIG. 3A, executed artifact management engine 146 may also package, into a corresponding portion of splitting artifact data 331, additional data identifying and characterizing one or more of the input artifacts ingested by executed splitting engine 164, such as, but not limited to, labelled PKI dataframe 318 the elements of modified splitting configuration data 226.

In accordance with default training pipeline 302, executed splitting engine 164 may provide output artifacts 330, including training dataframe 322, validation dataframe 324, and testing dataframe 326, and the elements of splitting data 328, as inputs to feature-generation engine 166 executed by the one or more processors of FI computing system 130. Further, within the default training pipeline 302, executed orchestration engine 144 may provision the elements of modified feature-generation configuration data 228 maintained within configuration data store 140 to executed feature-generation engine 166, and based on programmatic communications with executed artifact management engine 146, may provision ingested data table(s) 308 maintained within data record 304 of artifact data store 142 to executed feature-generation engine 166.

In some instances, a programmatic interface of executed feature-generation engine 166 may receive training dataframe 322, validation dataframe 324, testing dataframe 326, and the elements of splitting data 328, each of ingested data table(s) 308, and the elements of modified feature-generation configuration data 228 (e.g., as corresponding input artifacts), and may perform any of the exemplary processes described herein to establish a consistency of the corresponding input artifacts with the engine- and pipeline-specific operational constraints imposed on executed feature-generation engine 166. Based on an established consistency of the input artifacts with the imposed engine- and pipeline-specific operational constraints, executed feature-generation engine 166 may perform one or more of the exemplary processes described herein that, consistent with the elements of modified feature-generation configuration data 228, generate an feature vector of corresponding feature values for each row of training dataframe 322, validation dataframe 324, and testing dataframe 326 based on, among other things, a sequential application of pipelined, and developer-customized, estimation and transformation operations to a corresponding, partitions of the source data table(s) 304 associated with corresponding ones of training dataframe 322, validation dataframe 324, and testing dataframe 326. The feature vectors associated with the rows of training dataframe 322, validation dataframe 324, and testing dataframe 326 may, in some instances, be ingested by one or more additional executable application engines within default training pipeline 302 (e.g., training engine 168), and may facilitate an adaptive training of the machine-learning or artificial-intelligence process (e.g., the gradient-boosted, decision-tree process described herein, such as the XGBoost process).

By way of example, and within default training pipeline 302, a preprocessing module 332 of executed feature-generation engine 166 may obtain each of ingested data table(s) 308, and may apply sequentially one or more of the preprocessing operations to selected ones of ingested data table(s) 308 in accordance with the elements of modified feature-generation configuration data 228. Examples of the specified preprocessing operations may include, but are not limited to, one or more temporal filtration operations, one or more customer-, account-, or transaction-specific filtration operations, and a join operation (e.g., an inner- or outer-join operations, etc.) applied to a subset of ingested data table(s) 308. Further, in applying the join operation to the subset of the subset of ingested data table(s) 308, executed feature-generation engine 166 may perform operations, described herein, that establish a presence or absence, within each of subset of ingested data table(s) 308, of columns associated with each of the primary keys within labelled PKI dataframe 318 (e.g., the customer identifier and timestamp described herein, etc.). In some instances, and based on an established absence of a column associated with one of the primary keys within at least one of ingested data table(s) 308 subject to the join operation, executed preprocessing module 332 may perform operations that augment the at least one of ingested data table(s) 308 to include an additional column associated with the absent primary key, e.g., based on an application of a "fuzzy join" operation based on fuzzy string matching.

Based on an application of the one or more preprocessing operations to corresponding ones of ingested data table(s) 308 in accordance with the modified elements of feature-generation configuration data 228, executed preprocessing module 332 may generate one or more preprocessed data tables, and may perform operations, consistent with the splitting data 328 and with the elements of feature-generation configuration data 228, that partition each of the pre-processed source data tables into a corresponding partition associated with training dataframe 322 (e.g., a corresponding one of training data table(s) 334), a corresponding partition associated with validation dataframe 324 (e.g., a corresponding one of validation data table(s) 336), and a corresponding partition associated with testing dataframe 326 (e.g., a corresponding one of testing data table(s) 338). As described herein, each row of training dataframe 322, validation dataframe 324, and testing dataframe 326 may include values of one or more primary keys of PKI dataframe 312 (e.g., customer identifier, timestamp, etc.) and a corresponding one of ground-truth labels 316, and in some instances, each row of training dataframe 322, validation dataframe 324, and testing dataframe 326 may be associated with a corresponding customer and a corresponding temporal interval.

Based on the values of the one or more primary keys, executed feature-generation engine 166 may perform operations, consistent with the elements of modified feature-generation configuration data 228, that map subsets of the rows of each of the preprocessed source tables to corresponding ones of the training, validation, and testing partitions, and assign the mapped subsets of the rows to corresponding ones of training data table(s) 334, validation data table(s) 336, and testing data table(s) 338. In some examples, the rows of the preprocessed data tables assigned to training data table(s) 334, validation data table(s) 336, and testing data table(s) 338 may facilitate a generation, using any of the exemplary processes described herein, of a feature vector of specified, or adaptively determined, feature values for each row of a corresponding one of training dataframe 322, validation dataframe 324, and testing dataframe 326. Further, in some instances, each, or a subset of the operations that facilitate mapping of the subsets of the rows of each of the preprocessed source tables to corresponding ones of the training partition, the validation partition, and the testing partition, and the assignment of the mapped subsets of the rows to corresponding ones of training data table(s) 334, validation data table(s) 336, and testing data table(s) 338, may be specified within the elements of modified feature-generation configuration data 167 (e.g., in scripts callable in a namespace of executed feature-generation engine 166), which may customized to reflect the particular use-case of interest to developer 103 using any of the exemplary processes described herein.

The elements of modified feature-generation configuration data 228 may also include data identifying and characterizing a plurality of features selected (e.g., by developer 103 using any of the exemplary processes described herein) for inclusion within a feature vector of corresponding feature values for each row within training dataframe 322, validation dataframe 324, and testing dataframe 326. In some instances, the data identifying and characterizing each of the selected features may include, but is not limited to, a unique feature identifier, aggregation data specifying one or more aggregation operations associated with the feature value and one or more temporal intervals associated with the aggregation operations, post-processing data specifying one or more post-processing operations associated with the aggregation operations, and identifiers of one or more columns of training data table(s) 334, validation data table(s) 336, and testing data table(s) 324 subject to the one or more aggregation or post-processing operations. As described herein, for each of the selected features, corresponding ones of the aggregation and/or post-processing operations may be specified within the elements of modified feature-generation data as helper scripts capable of invocation within the namespace of executed feature-generation engine 166 and arguments or configuration parameters that facilitate the invocation of corresponding ones of the helper scripts.

Referring back to FIG. 3B, a pipeline fitting module 340 of executed feature-generation engine 166 may process the elements of modified feature-generation configuration data 228, and obtain, for each of the selected features from elements of modified feature-generation configuration data 228, the corresponding feature identifier, the aggregation data specifying the one or more aggregation operations associated with the feature value and one or more temporal intervals associated with the aggregation operations, the post-processing data specifying one or more post-processing operations associated with the aggregation operations, and identifiers of one or more columns of training data table(s) 334, validation data table(s) 336, and testing data table(s) 324 subject to the one or more aggregation or post-processing operations. In some instances, and executed pipeline fitting module 340 may process the feature identifiers, the aggregation data (e.g., the helper classes or scripts identifying the aggregation operations, identifiers of the temporal intervals associated with the aggregation operations, etc.), the post-processing data (e.g., the helper scripts identifying the post-processing operations associated with corresponding ones of aggregation operations, etc.), and the associated table and/or column identifiers, and may perform operations establish a "featurizer pipeline" of stateless transformation operations and stateless estimation operations that, when applied sequentially to one or more of the rows of training data table(s) 334, validation data table(s) 336, and testing data table(s) 324, generate a feature vector of the selected feature values for each row within corresponding ones of training dataframe 322, validation dataframe 324, and testing dataframe 326.

By way of example, executed pipeline fitting module 340 may access a transformation and estimation library 342, which may maintain and characterize one or more default (or previously customized) stateless transformation or estimation operations, and which may associate each of the default (or previously customized) stateless transformation or estimation operations with corresponding input arguments and output data, and in some instances, with a value of one or more configuration parameters. Examples of the stateless transformation operations includes one or more historical (e.g., backward) aggregation operations or one or more vector transformation operations applicable to corresponding ones of training data table(s) 334, validation data table(s) 336, and testing data table(s) 324, and/or with columns within corresponding ones of training data table(s) 334, validation data table(s) 336, and testing data table(s) 324, and examples of the stateless estimation operations may include one or more one-hot-encoding operations, label-encoding operations, scaling operations (e.g., based on minimum, maximum, or mean values, etc.), or other statistical processes application to training data table(s) 334, validation data table(s) 336, and testing data table(s) 338.

Based on the aggregation data, the post-processing data, and the corresponding table and/or column identifiers associated with the selected features (e.g., within the elements of modified feature-generation configuration data 228), executed pipeline fitting module 340 may perform operations that map the aggregation and post-processing operations associated with each of the selected feature to a corresponding ones (or corresponding ones) of the default stateless transformation and the default estimation operations maintained within transformation and estimation library 342. Executed pipeline fitting module 340 may also generate elements of feature-specific executable code that, upon execution by the one or more processors of FI computing system 130, apply the mapped default stateless transformations and the default estimation operations to corresponding ones of training data table(s) 334, validation data table(s) 336, and testing data table(s) 338, and generate, for each of the selected features, a feature value associated with a row of a corresponding one of training dataframe 322, validation dataframe 324, and testing dataframe 326.

Executed pipeline fitting module 340 may also perform operations that combine, or concentrate, programmatically each of the elements of feature-specific executable code associated with corresponding ones of the selected features, and generate a corresponding script, e.g., featurizer pipeline script 344 executable by the one or more processors of FI computing system 130. By way of example, when executed by the one or more processors of FI computing system 130, executed featurizer pipeline script 344 may establish a "featurizer pipeline" of sequentially executed ones of the mapped, default stateless transformation and the mapped, default estimation operations, which, upon application to the rows of corresponding ones of training data table(s) 334, validation data table(s) 336, and testing data table(s) 338 (e.g., upon "ingestion" of these tables by the established featurizer pipelined), generate a feature vector of sequentially order feature values for corresponding ones of the rows of training dataframe 322, validation dataframe 324, and testing dataframe 326. In some instances, FI computing system 130 may maintain featurizer pipeline script 344 in Python™ format, and in some instances, executed pipeline fitting module 340 may apply one or more Python™-compatible optimization or profiling processes to the elements of executable code maintained within featurizer pipeline script 344, which may reduce inefficiencies within the executed elements of code, and improve or optimize a speed at which the one or more processors of FI computing system 130 executed featurizer pipeline script 344 and/or a use of available memory by featurizer pipeline script 344.

Referring back to FIG. 3B, a featurizer module 346 of executed feature generation engine 166 may obtain featurizer pipeline script 344 and each of training data table(s) 334, validation data table(s) 336, and testing data table(s) 338, and executed featurizer module 346 may trigger an execution of featurizer pipeline script 344 by the one or more processors of FI computing system 130. As described herein, the execution of featurizer pipeline script 344 may establish the featurizer pipeline of the sequentially executed ones of the mapped, default stateless transformation and the mapped, default estimation operations, which may ingest, as inputs, each of training data table(s) 334, validation data table(s) 336, and testing data table(s) 324. Further, within the established featurizer pipeline, executed featurizer module 346 may apply sequentially each of the mapped, default stateless transformation and the mapped, default estimation operations to each row of training data table(s) 334, validation data table(s) 336, and testing data table(s) 324, and generate a corresponding feature vector of sequentially ordered feature values for each of the rows of training dataframe 322, validation dataframe 324, and testing dataframe 326, e.g., corresponding ones of feature vectors 348, feature vectors 350, and feature vectors 352. As described herein, each of feature vectors 348, feature vectors 350, and feature vectors 352 may include feature values associated with a corresponding set of features, and a composition of the features, and a sequential order of the corresponding feature values within feature vectors 348, feature vectors 350, and feature vectors 352, may be consistent with the composition and sequential ordering specified within the elements of modified feature-generation configuration data 228.

Figure 3B:
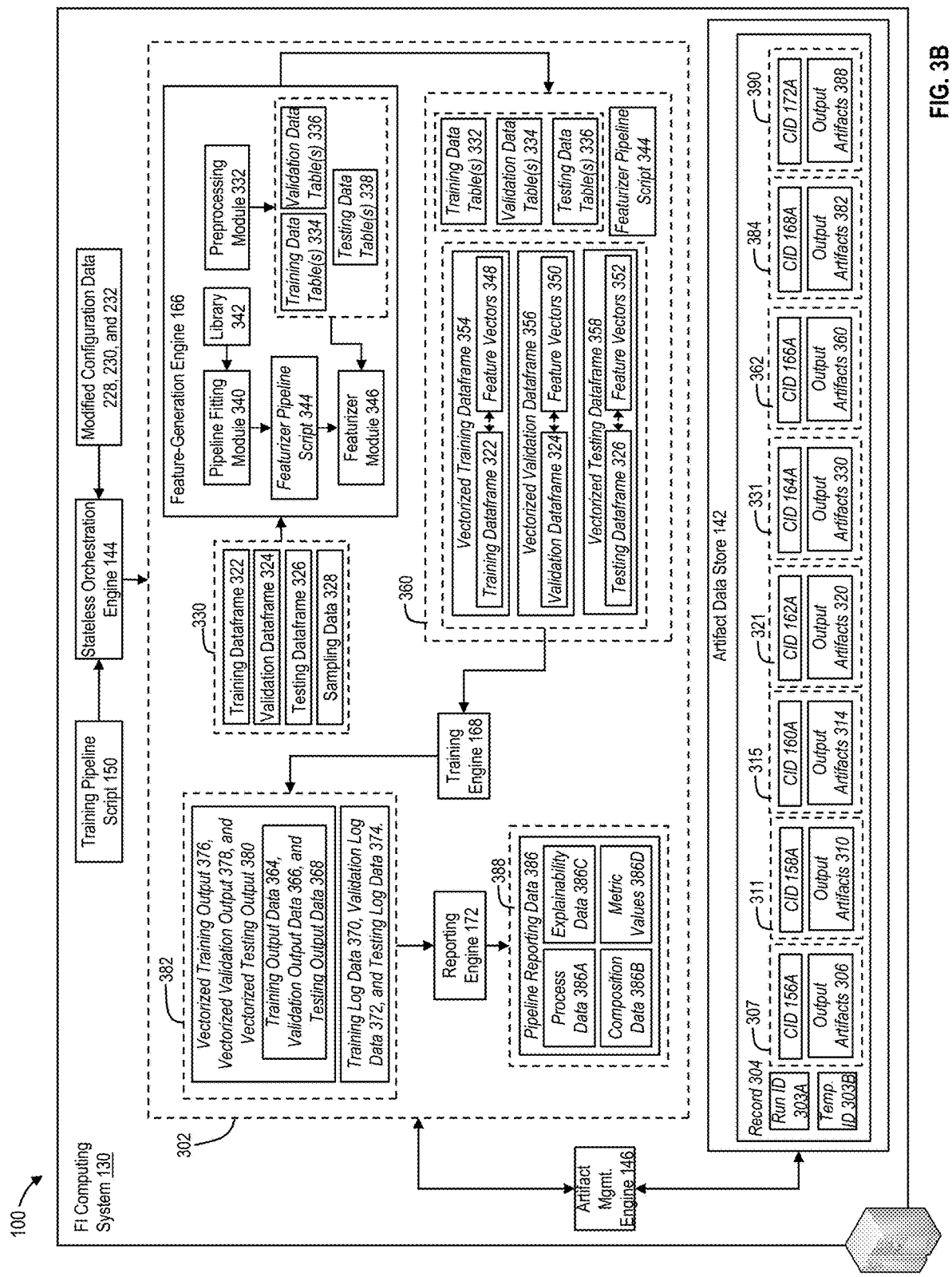
Figure 3C:
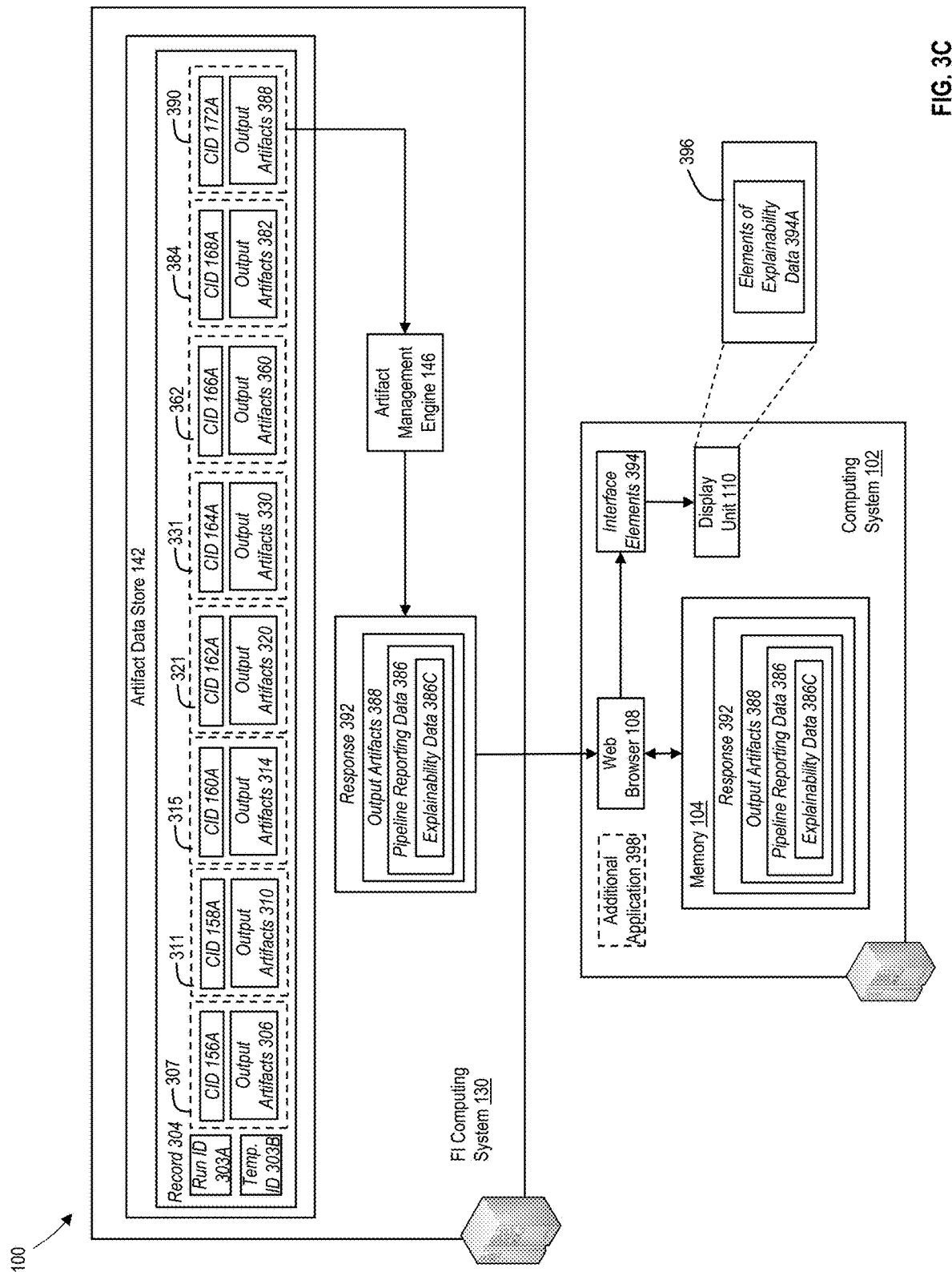

In some instances, executed featurizer module 346 may perform operations that append each of feature vectors 348 to a corresponding row of training dataframe 322, which includes a row of labelled PKI dataframe 318 (e.g., a corresponding row of PKI dataframe 312 and the appended one of ground-truth labels 316). Executed featurizer module 346 may also perform operations that append each of feature vectors 350 to a corresponding row of validation dataframe 324, which includes an additional row of labelled PKI dataframe 318 (e.g., an additional row of PKI dataframe 312 and the appended one of ground-truth labels 316), and that append each of feature vectors 352 to a corresponding row of testing dataframe 326, which includes a further row of labelled PKI dataframe 318. As illustrated in FIG. 3B, executed featurizer module 346 may generate elements of a vectorized training dataframe 354 that include the rows of training dataframe 322 and the appended ones of feature vectors 348, elements of a vectorized validation dataframe 356 that include the rows of validation dataframe 324 and the appended ones of feature vectors 350, and elements of a vectorized testing dataframe 358 that include rows of testing dataframe 326 and the appended ones of feature vectors 352.

Further, executed featurizer module 346 may perform operations that provision training data table(s) 334, validation data table(s) 336, and testing data table(s) 324, featurizer pipeline script 344, and vectorized training dataframe 354, vectorized validation dataframe 356, and vectorized testing dataframe 358 to executed artifact management engine 146, e.g., as output artifacts 360 of executed featurizer module 346 within default training pipeline 302. In some instances, executed artifact management engine 146 may receive each of output artifacts 360, and may perform operations that package each of output artifacts 360 into a corresponding portion of feature-generation artifact data 362, along with a unique component identifier 166A of executed feature-generation engine 166, and that store feature-generation artifact data 362 within a corresponding portion of artifact data store 142, e.g., within data record 304 associated with default training pipeline 302 and run identifier 303A. Further, although not illustrated in FIG. 3B, executed artifact management engine 146 may also package, into a corresponding portion of feature-generation artifact data 360, additional data identifying and characterizing one or more of the input artifacts ingested by executed feature-generation engine 166, such as, but not limited to, training dataframe 322, validation dataframe 324, testing dataframe 326, and splitting data 328.

In some instances, and in accordance with default training pipeline 302, executed feature-generation engine 166 may provide vectorized training dataframe 354, vectorized validation dataframe 356, and vectorized testing dataframe 358 as inputs to training engine 168 executed by the one or more processors of FI computing system 130 within default training pipeline 302, e.g., in accordance with executed training pipeline script 150. Further, executed orchestration engine 144 may also provision, to executed training engine 168, the elements of modified training configuration data 230, and a programmatic interface associated with executed training engine 168 may receive, as corresponding input artifacts, the elements of modified training configuration data 230, and vectorized training dataframe 354, vectorized validation dataframe 356, and vectorized testing dataframe 358, and the programmatic interface of executed training engine 168 may perform operations any of the exemplary processes described herein that establish a consistency of these input artifacts with the engine- and pipeline-specific operational constraints imposed on executed training engine 168.

Based on an established consistency of the input artifacts with the imposed engine- and pipeline-specific operational constraints, executed training engine 168 may cause the one or more processors of FI computing system 130 to perform, through an implementation of one or more parallelized, fault-tolerant distributed computing and analytical processes described herein, operations that instantiate the machine-learning or artificial-intelligence process in accordance with the value of the one or more parameters of the machine-learning or artificial-intelligence process, e.g., as specified within the elements of modified training configuration data 230. Further, and through the implementation of one or more parallelized, fault-tolerant distributed computing and analytical processes described herein, the one or more processors of FI computing system 130 may perform further operations that apply the instantiated machine-learning or artificial-intelligence process to: (i) each row of vectorized training dataframe 354 (e.g., the corresponding row of PKI dataframe 312, the appended one of ground-truth labels 316, and the appended one of feature vectors 348); (ii) each row of vectorized validation dataframe 356 (e.g., the additional row of PKI dataframe 312, the appended one of ground-truth labels 316, and the appended one of feature vectors 350); and (iii) each row of vectorized testing dataframe 358 (e.g., the further row of PKI dataframe 312, the appended one of ground-truth labels 316, and the appended one of feature vectors 352).

By way of example, and as described herein, developer 103 may elect to train a gradient-boosted, decision-tree process (e.g., an XGBoost process), to predict a likelihood of an occurrence, or a non-occurrence, of a targeted event involving one or more customers of the financial institution during a future temporal interval separated from a temporal prediction point by a corresponding buffer interval. In some instances, the elements of modified training configuration data 230 may include data that identifies the gradient-boosted, decision-tree process (e.g., a helper class or script associated with the XGBoost process and capable of invocation within the namespace of executed training engine 168) and a value of one or more default parameters of the gradient-boosted, decision-tree process. In some instances, executed training engine 168 may cause the one or more processors of FI computing system 130 to instantiate the gradient-boosted, decision-tree process (e.g., the XGBoost process) in accordance with the default parameter values within the elements of modified training configuration data 230, and to apply the instantiated, gradient-boosted, decision-tree process to each row of vectorized training dataframe 354, each row of vectorized validation dataframe 356, to each row of vectorized testing dataframe 358. By way of example, executed training engine 168 may cause the one or more processors of FI computing system 130 may perform operations that establish a plurality of nodes and a plurality of decision trees for the gradient-boosted, decision-tree process, each of which receive, as inputs, corresponding rows of vectorized training dataframe 354 (e.g., the corresponding row of PKI dataframe 312, the appended one of ground-truth labels 316, and the appended one of feature vectors 348); corresponding rows of vectorized validation dataframe 356 (e.g., the additional row of PKI dataframe 312, the appended one of ground-truth labels 316, and the appended one of feature vectors 350); and corresponding rows of vectorized testing dataframe 358 (e.g., the further row of PKI dataframe 312, the appended one of ground-truth labels 316, and the appended one of feature vectors 352).

Based on the application of the instantiated machine-learning or artificial-intelligence process (e.g., the gradient-boosted, decision-tree process described herein, etc.) to the each row of vectorized training dataframe 354, executed training engine 168 may generate a corresponding elements of training output data 364 and one or more elements of training log data 370 that characterize the application of the instantiated machine-learning or artificial-intelligence process to the each row of vectorized training dataframe 354. Executed training engine 168 may append each of the generated elements of training output data 364 to the corresponding row of vectorized training dataframe 354, and generate elements of vectorized training output 376 that include each row of vectorized training dataframe 354 and the appended element of training output data 364.

Further, based on the application of the instantiated machine-learning or artificial-intelligence process (e.g., the gradient-boosted, decision-tree process described herein) to the each row of vectorized validation dataframe 356, and to each row of vectorized testing dataframe 358, executed training engine 168 may generate corresponding elements of validation output data 366 and testing output data 368, and one or more elements of validation log data 372 and testing log data 374 that characterize the application of the instantiated machine-learning or artificial-intelligence process to the each row of a respective one of vectorized validation dataframe 356 and vectorized testing dataframe 358. Executed training engine 168 may append each of the generated elements of validation output data 366 to the corresponding row of vectorized validation dataframe 356, and append each of the generated elements of testing output data 368 to the corresponding row of vectorized testing dataframe 358. Executed training engine 168 may also generate elements of vectorized validation output 378 that include each row of vectorized validation dataframe 356 and the appended element of validation output data 366, and generate elements of vectorized testing output 380 that include each row of vectorized testing dataframe 358 and the appended element of testing output data 368.

In some instances, the elements of training output 364, validation output data 366, and testing output data 368 may each indicate, for the values of the primary keys within each of respective ones of vectorized training dataframe 354, vectorized validation dataframe 356, and vectorized testing dataframe 358 (e.g., the alphanumeric, customer identifier and the timestamp, as described herein), the predicted likelihood of the occurrence, or non-occurrence, of the targeted, developer-specified event within the future temporal interval, e.g., subsequent to the corresponding, row-specific timestamp and separated from the that timestamp by the buffer interval. By way of example, the elements of training log data 370, validation log data 372, and testing log data 374, may characterize the application of the instantiated machine-learning or artificial-intelligence process to the rows of corresponding ones of vectorized training dataframe 354, vectorized validation dataframe 356, and vectorized testing dataframe 358, such as, but not limited to, performance data (e.g., execution times, memory or processor usage, etc.) and the values of the processes parameters associated with the instantiated machine-learning or artificial-intelligence process, as described herein.

Further, the elements of training log data 370, validation log data 372, and testing log data 374, may also include elements of explainability data characterizing the predictive performance and accuracy of the machine-learning or artificial-intelligence process during application to corresponding ones of vectorized training dataframe 354, vectorized validation dataframe 356, and vectorized testing dataframe 358. By way of example, the elements of explainability data may include, but are not limited to, one or more Shapley feature values that a relative of importance of each of the discrete features within respective ones of vectorized training dataframe 354, vectorized validation dataframe 356, and vectorized testing dataframe 358 and/or values of one or more deterministic or probabilistic metrics that characterize the relative importance of discrete ones of the features, such as, but not limited to, data establishing individual conditional expectation (ICE) curves or partial dependency plots, computed precision values, computed recall values, computed areas under curve (AUCs) for receiver operating characteristic (ROC) curves or precision-recall (PR) curves, and/or computed multiclass, one-versus-all areas under curve (MAUCs) for ROC curves. The disclosed embodiments are, however, not limited to, these exemplary elements of training log data 370, validation log data 372, and testing log data 374, and in other examples, training log data 370, validation log data 372, and testing log data 374 may include any additional, or alternate, elements of data characterizing the application of the instantiated machine-learning or artificial-intelligence process to the rows of corresponding ones of vectorized training dataframe 354, vectorized validation dataframe 356, and vectorized testing dataframe 358 within default training pipeline 302.

Executed training engine 168 may perform operations that provision vectorized training output 376 (e.g., including the rows of vectorized training dataframe 354 and the appended elements of training output 364), vectorized validation output 378 (e.g., including the rows of vectorized validation dataframe 356 and the appended elements of validation output data 366), and vectorized testing output 380 (e.g., including the rows of vectorized testing dataframe 358 and the appended elements of testing output data 368), and the elements of training log data 370, validation log data 372, and testing log data 374, to executed artifact management engine 146, e.g., as output artifacts 382 of executed training engine 168 within default training pipeline 302. In some instances, executed artifact management engine 146 may receive each of output artifacts 382, and may perform operations that package each of output artifacts 382 into a corresponding portion of training artifact data 384, along with a unique, alphanumeric identifier 168A of executed training engine 168, and that store training artifact data 384 within a corresponding portion of artifact data store 142, e.g., within data record 304 associated with default training pipeline 302 and run identifier 303A. Further, although not illustrated in FIG. 3B, executed artifact management engine 146 may also package, into a corresponding portion of training artifact data 384, additional data identifying and characterizing one or more of the input artifacts ingested by executed training engine 168, such as, but not limited to, vectorized training dataframe 354, vectorized validation dataframe 356, and vectorized testing dataframe 358.

Further, and in accordance with default training pipeline 302, executed training engine 168 may provide output artifacts 382, including vectorized training output 376, vectorized validation output 378, and vectorized testing output 380, and the elements of training log data 370, validation log data 372, and testing log data 374, as inputs to reporting engine 172 executed by the one or more processors of FI computing system 130 within default training pipeline 302, e.g., in accordance with executed training pipeline script 150. Further, executed orchestration engine 144 may also provision, to executed reporting engine 172, output artifacts generated by respective ones of retrieval engine 156, pre-processing engine 158, indexing engine 160, target-generation engine 162, splitting engine 164, feature-generation engine 166, and training engine 168, such as, but not limited to, output artifacts 306, 310, 314, 320, 330, and 360 maintained within artifact data store 142 (e.g., based on a request provisioned to executed artifact management engine 146, etc.). Executed orchestration engine 144 may also provision elements of modified reporting configuration data 232 to executed reporting engine 172, In some instances, a programmatic interface of executed reporting engine 172 may perform any of the exemplary processes described herein to establish a consistency of each of the input artifacts with the engine- and pipeline-specific operational constraints imposed on executed reporting engine 172. Based on an established consistency of the input artifacts with the imposed engine- and pipeline-specific operational constraints, executed reporting engine 172 may perform operations, consistent with the elements of reporting configuration data 232, that generate elements of pipeline reporting data 386 characterizing an operation and a performance of the discrete, modular components executed by the one or more processors of FI computing system 130 within default training pipeline 302, and characterizing the predictive performance and accuracy of the machine-learning or artificial-intelligence process during application to corresponding ones of vectorized training dataframe 354, vectorized validation dataframe 356, and vectorized testing dataframe 358. As described herein, the elements of modified reporting configuration data 232 may specify a default composition of pipeline reporting data 386 and a customized format of pipeline reporting data 386, e.g., DOCX format.

By way of example, and based on corresponding ones of output artifacts 306, 310, 314, 320, 330, 360, and 382 executed reporting engine 172 may perform operations that establish a successful, or failed, execution of corresponding ones of application engines executed sequentially within default training pipeline 302, e.g., by confirming that each of the generated elements of artifact data are consistent, or inconsistent, with corresponding ones of the operational constraints imposed on corresponding ones of executed application engines. In some instances, executed reporting engine 172 may generate one or more elements of pipeline reporting data 386 indicative of the successful execution of the application engines within default training pipeline 302 (and a successful execution of default training pipeline 302) or alternatively, an established failure in an execution of one, or more, of the application engines within default training pipeline 302 (e.g., and a corresponding failure of default training pipeline 302).

In some instances, based on output artifacts 382 generated by executed training engine 168 (e.g., within default training pipeline 302), executed reporting engine 172 may package, into portions of pipeline reporting data 386, elements of process data 386A that include the values of one or more process parameters associated with the instantiated machine-learning or artificial-intelligence process (e.g., as specified within the elements of modified training configuration data 230) and elements of composition data 386B that specify a composition of, and sequential ordering of the feature values within, corresponding ones of feature vectors 348, 350, and 352 (e.g., as specified within the elements of modified feature-generation configuration data 228). Further, and based on output artifacts 382 generated by executed training engine 168 within default training pipeline 302), executed reporting engine 172 may also package, into corresponding portions of pipeline reporting data 386, additional elements of explainability data 386C characterizing the predictive performance and accuracy of the machine-learning or artificial-intelligence process (e.g., the gradient-boosted, decision-tree process described herein, such as the XGBoost process) during application to corresponding ones of vectorized training dataframe 354, vectorized validation dataframe 356, and vectorized testing dataframe 358.

By way of example, the additional elements of explainability data 386C may include, but are not limited to, one or more Shapley feature values that a relative of importance of each of the discrete features within respective ones of vectorized training dataframe 354, vectorized validation dataframe 356, and vectorized testing dataframe 358 and/or values of one or more deterministic or probabilistic metrics that characterize the relative importance of discrete ones of the features. Further, examples of the deterministic or probabilistic metrics may include, among other things, elements of data correlating relationships between distinct pairs of the features and/or data establishing individual conditional expectation (ICE) curves or partial dependency plots, computed precision values, computed recall values, computed areas under curve (AUCs) for receiver operating characteristic (ROC) curves or precision-recall (PR) curves, and/or computed multiclass, one-versus-all areas under curve (MAUCs) for ROC curves.

Additionally, and based on one or more of output artifacts 306, 310, 314, 320, 330, 360, and 382, executed reporting engine 172 may perform operations that generate values 386D of metrics characterizing a bias or a fairness of the machine-learning or artificial-intelligence process and additionally, or alternatively, at a bias or a fairness associated with the calculations performed at all, or a selected subset, of the discrete steps of the execution flow established by default training pipeline 302, e.g., the sequential execution of retrieval engine 156, preprocessing engine 158, indexing engine 160, target-generation engine 162, splitting engine 164, feature-generation engine 166, and training engine 168 within default training pipeline 302. In some instances, the metrics characterizing the bias or fairness may be imposed internally by the financial institution, or may be associated with one or more governmental or regulatory entities, and executed reporting engine may package the generated metric values with an additional portion of pipeline reporting data 386.

Executed reporting engine 172 may structure the pipeline reporting data 386 in accordance with the elements of modified reporting configuration data 232, such as, but not limited to, DOCX format, and executed reporting engine 172 may provide pipeline reporting data 386 to executed artifact management engine 146, e.g., as output artifacts 388 of executed reporting engine 172 within default training pipeline 302. In some instances, executed artifact management engine 146 may receive each of output artifacts 388, and may perform operations that package each of output artifacts 388 into a corresponding portion of reporting artifact data 390, along with a unique, alphanumeric identifier 172A of executed reporting engine 172, and that store reporting artifact data 390 within a corresponding portion of artifact data store 142, e.g., within data record 304 associated with default training pipeline 302 and run identifier 303A. Further, although not illustrated in FIG. 3B, executed artifact management engine 146 may also package, into a corresponding portion of reporting artifact data 390, additional data identifying and characterizing the input artifacts ingested by executed reporting engine 172.

Through a performance of one or more of the exemplary processes described herein, the one or more processors of FI computing system 130 may facilitate a customization of a plurality of sequentially executed, default application engines within default training pipeline 302 to reflect a particular use-case of interest to developer 103 without requiring any modification to the elements of executable code of these default application engines, any modification to the executable scripts (e.g., executed training pipeline script 150) that establish default training pipeline 302, or to any execution flow of the default application engines within default training pipeline 302. Certain of these exemplary processes, which leverage engine-specific elements of configuration data formatted and structured in a human-readable data-serialization language (e.g., a YAML™ data-serialization language, etc.) and accessible, and modifiable, using a browser-based interface, may enable analysts, data scientists, developers, and other representatives of the financial institution characterized by various familiarities with machine-learning or artificial-intelligence processes, and various skill levels in coding and scripting, to incorporate machine-learning or artificial-intelligence processes into various, customer-facing or back-end decisioning operations, and to train adaptively, and subsequently deploy and monitor, machine-learning or artificial-intelligence processes through default pipelines customized to reflect these decisioning processes.

By way of example, the elements of engine-specific artifact data maintained within data record 304 of artifact data store 142 may be associated with the current run of default training pipeline 302 initiated on Oct. 1, 2023, in accordance with the engine-specific elements of configuration data, which may be customized by developer 103 may customize in accordance with the particular use-case using any of the exemplary processes described herein. In some instances, data record 304 may associate the elements of engine-specific artifact data with the current implementation, or run, of default training pipeline 302 (e.g., via run identifier 303A) and with the Oct. 1, 2023, initiation of default training pipeline 302 (e.g., via temporal identifier 303B). Further, and as described herein, each of the elements of engine-specific artifact data maintained within data record 304 may associate one or more output artifacts within a corresponding one of the component identifiers of the application engines sequentially executed within default training pipeline 302.

In some instances, the current implementation of default training pipeline 302, which executed orchestration engine 144 initiated on Oct. 1, 2023, may represent an initial (or an intermediate) one of plurality of sequential runs of default training pipeline 302 that train adaptively, and iteratively, a machine-learning or artificial-intelligence process to generate predictive output of relevance to the particular use-case based on elements of engine-specific configuration data customized and modified by developer 103 using any of the exemplary processes described herein. For example, upon successful completion of the current run of default training pipeline 302, the one or more processors of FI computing system 130 may perform operations that provision each, or a selected subset, of the elements of engine-specific artifact data generated during the October $1^{st}$ run of default training pipeline 302, which may be maintained within data record 304 of artifact data repository, to developer computing system 102.

Referring to FIG. 3D, executed orchestration engine 144 may obtain portions of reporting artifact data 390, which include identifier 172A and output artifacts 388 generated by executed reporting engine 172, from data record 304 of artifact data store 142, and may transmit a response 392 to customization request 234 that includes the obtained portions of reporting artifact data 390 across network 120 to computing system 130, e.g., via the secure, programmatic channel of communications established between executed programmatic web service 148 of FI computing system 130 and executed web browser 108 of developer computing system 102. As described herein, portions of reporting artifact data 390 may include, but is not limited to, the additional elements of explainability data 386C that characterize the predictive performance and accuracy of the machine-learning or artificial-intelligence process (e.g., the gradient-boosted, decision-tree process described herein, such as the XGBoost process) during the application to corresponding ones of vectorized training dataframe 354, vectorized validation dataframe 356, and vectorized testing dataframe 358. In some instances, developer computing system 102 may receive response 392 (e.g., the portions of reporting artifact data 390) from FI computing system 130, and executed web browser 108 may store response 392 within a portion of memory 104 and may generate interface elements 394 representative of the portions of reporting artifact data 390 for presentation within an additional digital interface 396, e.g., via display device 110.

The additional elements of explainability data 386C, may include, but are not limited to, or more Shapley feature values that characterize a relative of importance of a value of each of the discrete features within corresponding ones of vectorized training dataframe 354, vectorized validation dataframe 356, and vectorized testing dataframe 358. The additional elements of explainability data 386C may also include values of one or more metrics that characterize a predictive capability, and an accuracy, of the machine-learning or artificial-intelligence process, such as, but not limited to, one or more recall-based values for the adaptively machine-learning or artificial-intelligence process (e.g., "recall@5," "recall@10," "recall@20," etc.), and additionally, or alternatively, one or more precision-based values for the machine-learning or artificial-intelligence process. Further, in some examples, the metric values may include a computed value of an area under curve (AUC) for a precision-recall (PR) curve associated with the machine-learning or artificial-intelligence process, a computed value of an AUC for a receiver operating characteristic (ROC) curve associated with the machine-learning or artificial-intelligence process, and additionally, or alternatively, a computed value of multiclass, one-versus-all area under curve (MAUC) for a ROC.

In some instances, interface elements 394A within additional digital interface 396 may be representative of the additional elements of explainability data 386C, and based on a review of interface elements 394A across one or more display screens of additional digital interface 396, developer 103 may determine that the predictive capability, and an accuracy, of the machine-learning or artificial-intelligence process after the current run of default training pipeline 302 fails to satisfy one or more threshold conditions for a deployment within an production environment and application to confidential elements of customer data. The one or more threshold conditions may, for example, include a predetermined threshold value for the recall-based values, a predetermined threshold value for the computed precision-based values, and/or a predetermined threshold value for the computed AUC values and/or MAUC values, and in some instances, developer 103 (or an additional application program 398 executed by the processor(s) 106 of developer computing system 102) may establish that one or more of the computed recall-based values, the computed precision-based values, or the computed AUC or MAUC values are inconsistent with a corresponding one of the predetermined threshold values (e.g., exceed, or alternatively, fall below the corresponding one of the predetermined threshold values), and as such, that the machine-learning or artificial-intelligence process is unsuitable for deployment within the production environment absent further adaptive training, testing, and validation.

Based on the determination that the machine-learning or artificial-intelligence process is unsuitable for deployment within the production environment, developer 103 may access one or more of the Shapley values that characterize the relative importance of corresponding ones of the feature values within the feature vectors, and one or more of the computed metric values that characterize the predictive capability and accuracy of the machine-learning or artificial-intelligence process during current run of default training pipeline 302 (e.g., presented within interface elements 394A of additional digital interface 396). Based on the Shapley values and/or the computed metric values, developer 103 (or additional application program 398 executed by the processor(s) 106 of computing system 130) may add one or more new features to the feature vectors 348, 350, and 352, may delete one or more previously specified features from feature vectors 348, 350, and 352 (e.g., non-contributing features associated with Shapley values that fail to exceed a threshold Shapley value) and additionally, or alternatively, may combine together previously specified features from feature vectors 348, 350, and 352 (e.g., to derive a composite feature, etc.). Further, in some instances, and based on the one or more Shapley values and/or the computed metric values, developer 103 (or additional application program 398 executed by the processor(s) 106 of computing system 130) may also modify one or more of the parameter values of the machine-learning or artificial-intelligence process instantiated during the current run of default training pipeline 302.

In some instances, to facilitate a modification to the composition of the feature vectors ingested by the machine-learning or artificial-intelligence process, or a modification to the parameter values of the machine-learning or artificial-intelligence process instantiated during an additional, and subsequent, training run of default training pipeline 302, developer 103 may provide further input to developer computing system 102 (e.g., via input device 112) that causes executed web browser 108 to perform any of the exemplary processes described herein to request access to, and to receive from FI computing system 130, one or more elements of modified feature-generation configuration data 228 and one or more elements of modified training configuration data 230 associated with default training pipeline 302 (e.g., as maintained within configuration data store 140). Using any of the exemplary processes described herein, developer 103 may provide input to computing system 102 (e.g., via input device 112) that modifies further the elements of modified feature-generation configuration data 228 to specify one or more additional, new features within the elements of modified feature-generation configuration data 228, or to subtract or combine one or more of the features previously specified within the elements of modified feature-generation configuration data 228. Additionally, or alternatively, developer 103 may provide input to computing system 102 (e.g., via input device 112) that modifies the elements of modified training configuration data 232 to reflect the further modification to the one or more parameter values of the machine-learning or artificial-intelligence process.

Executed web browser 108 may package input data characterizing the additional modifications to the elements of modified feature-generation configuration data 228 and/or to the elements of modified training configuration data 232 into corresponding portions of an additional customization request (e.g., along with identifier 210, the one or more identifiers of developer computing system 102 or executed web browser 108, such as, but not limited to, the IP or MAC address of developer computing system 102, or the digital token or application cryptogram identifying executed web browser 108), and executed web browser 108 may cause developer computing system 102 to transmit customization request 234 across communications network 120 to FI computing system 130. In some instances, customization API 206 of executed customization application 204 at FI computing system 130 may receive the additional customization request, and based on an established permission of developer computing system 102 to modify or customize the elements of configuration data maintained within configuration data store 140, executed customization application 204 may obtain the further modifications to the elements of modified future-configuration data 228 and/or the elements of modified training configuration data 230, and perform operations that store the further modifications to the elements of modified future-configuration data 228 and/or the elements of modified training configuration data 230 within configuration data store 140, e.g., to replace or update the previous modifications to these engine-specific elements of configuration data.

Executed orchestration engine 144 may also perform any of the exemplary processes described herein to access and execute training pipeline script 150, which may re-establish default training pipeline 302, and may cause the one or more processors of FI computing system 130 to execute sequentially, during a subsequent training run of default training pipeline 302, each retrieval engine 156, preprocessing engine 158, indexing engine 160, target-generation engine 162, splitting engine 164, feature-generation engine 166, training engine 168, and reporting engine 172 in accordance with corresponding, engine-specific elements of configuration data, including but not limited to, the further medications to the elements of modified feature-generation configuration 228 and/or modified training configuration data 230 described herein. In some instances, each of sequentially executed retrieval engine 156, preprocessing engine 158, indexing engine 160, target-generation engine 162, splitting engine 164, feature-generation engine 166, training engine 168, and reporting engine 172 may generate one or more output artifacts, which executed artifact management engine 146 may maintain within one or more additional data records of artifact data store 142, e.g., in associated with a unique alphanumeric identifier of the subsequent training run of default training pipeline 302 and a temporal identifier characterizing an initiation date of the subsequent training run.

As described herein, and upon completion of the subsequent training run of default training pipeline 302, the one or more processors of FI computing system 130 may perform any of the exemplary processes described herein to provision one or more of the generated output artifacts, including but not limited to output artifacts generated by executed training engine 168 (e.g., additional elements of explainability data that characterize the predictive performance and accuracy of the machine-learning or artificial-intelligence process during the subsequent training run of default training pipeline 302), across network 120 to developer computing system 102, which may generate interface elements representative of the portions of reporting artifact data 390 for presentation within additional digital interface 396, e.g., via display device 110. Further, based on the additional explainability data presented within additional digital interface 396, developer 103, and additionally, or alternatively, additional application program 398 executed by the processor(s) 106, may determine whether the predictive capability, and an accuracy, of the machine-learning or artificial-intelligence process after the subsequent training run of default training pipeline 302 fails to satisfy one or more threshold conditions for a deployment within an production environment and application to confidential elements of customer data.

Further, and based on a determination that the predictive capability and accuracy of the machine-learning or artificial-intelligence process after the subsequent training run of default training pipeline 302 fail to satisfy one or more threshold conditions for deployment, developer computing system 102 and FI computing system 130 may perform any of the exemplary processes described herein, consistent with additional input from developer 103, to modify further a composition of the feature vectors ingested by the machine-learning or artificial-intelligence process and/or one or more process parameter values of the machine-learning or artificial-intelligence process, instantiated during the subsequent training run of default training pipeline 302, and to re-establish default training pipeline 302 and cause the one or more processors of FI computing system 130 to execute sequentially, during another training run of default training pipeline 302, each of retrieval engine 156, preprocessing engine 158, indexing engine 160, target-generation engine 162, splitting engine 164, feature-generation engine 166, training engine 168, and reporting engine 172 in accordance with corresponding, engine-specific elements of configuration data, including but not limited to, the further modifications to the elements of modified feature-generation configuration 228 and/or modified training configuration data 230 described herein. In some instances, one or more of these exemplary processes, which modify the composition of the feature vectors ingested by the machine-learning or artificial-intelligence process, and/or the process parameter values of the machine-learning or artificial-intelligence process, instantiated during a prior training run of default training pipeline 302, and which re-establish default training pipeline 302 during a further training run, may be repeated iteratively until the predictive capability and accuracy of the machine-learning or artificial-intelligence satisfy each of the threshold conditions for deployment.

By way of example, and after one-hundred iterations, the elements of explainability data generated as output artifacts by reporting engine 173 executed sequentially within a final training run of default training pipeline 302 may indicate that the predictive capability and accuracy of the machine-learning or artificial-intelligence process satisfy each of the threshold deployment conditions, and the machine-learning or artificial-intelligence process may be deemed sufficiently trained for deployment within an production environment and application to confidential elements of customer data. In some instances, and upon completion of the final training run of default training pipeline 302, executed artifact management engine 146 may perform operations, described herein that maintain, within one or more additional data records of artifact data store 142, an archive of engine-specific elements of artifact data that include the output artifacts generated by each of sequentially executed application engines within the final training run of default training pipeline 302 (e.g., in association with a unique run identifier and a temporal identifier characterizing an initiation date of the final training run).

Further, as described herein, the output artifacts generated during the final training run of default training pipeline 302 may include a final featurizer pipeline script that establishes a final, featurizer pipeline of sequentially executed, default stateless transformations and default estimation operations that, upon execution, generates feature vectors suitable for ingestion by the trained machine-learning or artificial-intelligence process (e.g., as generated by executed feature-generation engine 166 within the final training run of default training pipeline 302) and process-parameter data that include one or more values of the process parameters for the trained machine-learning or artificial-intelligence process. In some instances, executed artifact management engine 146 may "copy" these output artifacts from a development environment (e.g., a development partition of the distributed computing components of FI computing system 130) to a production environment (e.g., a production partition of the distributed computing components of FI computing system 130), which may facilitate inferencing based on an application of the trained machine-learning or artificial-intelligence process to feature vectors derived from elements of confidential customer data. For instance, the final featurizer pipeline script and the elements of process-parameter data may represent input artifacts for inferencing pipeline script 152, and one or more of these input artifacts may be ingested into a corresponding default inferencing pipeline established by inferencing pipeline script 152, e.g., upon execution of the one or more processors of FI computing system 130.

By way of example, developer 103 may elect to apply the now-trained machine-learning or artificial-intelligence process to the feature vectors derived from the elements of confidential customer data and obtain elements of predictive output associated with a particular use-case of interest to developer 103, e.g., in support of one or more customer-facing or back-end decisioning processes involving a subset of the customers of the financial institution. For instance, the predictive output of associated with a particular use-case of interest may include, but is not limited to, data indicative of an occurrence, or a non-occurrence, of a targeted event involving each of the subset of the customers during a future temporal interval, which may be separated from a temporal prediction point by a corresponding buffer temporal interval, and examples of the targeted event may include, are is not limited to, an application for a financial product or service, a request by a customer to modify a term or condition of a financial product or service provisioned to the customer by the financial institution, or an occurrence of an account- or usage-specific event involving the customer or the provisioned financial product or service, such as a delinquency event involving a secured or unsecured credit product.

In some instances, and based on input provisioned by developer 103, computing system 102 may perform any of the exemplary described herein to access to one or more of the elements of configuration data associated with the application engines executed sequentially within a default inferencing pipeline established by the one or more process of FI computing system 130 (e.g., in accordance with inferencing pipeline script 152), and to update, modify, or "customize" the one or more of the accessed elements of configuration data to reflect the particular use-case of interest to developer 103. As described herein, the modification of the accessed elements of configuration data by developer computing system 102 may enable developer 103 to customize the sequential execution of the application engines within the default inference pipeline to reflect the particular use-case without modification to the underlying code associated with the executed application engines or to inferencing pipeline script 152, and while maintaining compliance with the one or more process-validation operations or requirements and with the one or more governmental or regulatory requirements.

For example, developer 103 may provide input to developer computing system 102 (e.g., via input device 112), which causes executed web browser 108 to perform any of the exemplary processes described herein to request access to the elements of configuration data associated with the application engines executed sequentially within the default inferencing pipeline. As described herein, and upon execution by the one or more processors of FI computing system 130 (e.g., via executed orchestration engine 144), inferencing pipeline script 152 may establish the default training pipeline, and sequentially execute retrieval engine 156, preprocessing engine 158, indexing engine 160, feature-generation engine 166, inferencing engine 170, and reporting engine 172 in accordance with respective elements of engine-specific configuration data. In some instances, executed web browser 108 may perform operations, described herein, that generate a corresponding access request identifying the default inferencing pipeline (e.g., via a unique, alphanumeric identifier of the default inferencing pipeline) and developer computing system 102 or executed web browser 108 (e.g., via the IP address of developer computing system 102, the MAC address of developer computing system 102, or the digital token or application cryptogram of executed web browser 108.

As described herein, executed web browser 108 may transmit the corresponding access request across network 120 to FI computing system 130, e.g., via the secure, programmatic channel of communications established between executed web browser 108 and executed programmatic web service 148. In some instances, customization API 206 of executed customization application 204 at FI computing system 130 may receive the corresponding access request, and based on an established permission of developer computing system 102 (and executed web browser 108) to access the elements of configuration data maintained within configuration data store 140, executed customization application 204 may obtain each of the elements of configuration data associated with the default inferencing pipeline (e.g., the elements of retrieval configuration data 157, preprocessing configuration data 159, indexing configuration data 161, feature-generation configuration data 167, inferencing configuration data 171, and reporting configuration data 173), and package the obtained elements of engine-specific configuration within a response to the corresponding access request, which FI computing system 130 may transmit across network 120 to developer computing system 102.

Figure 4A:
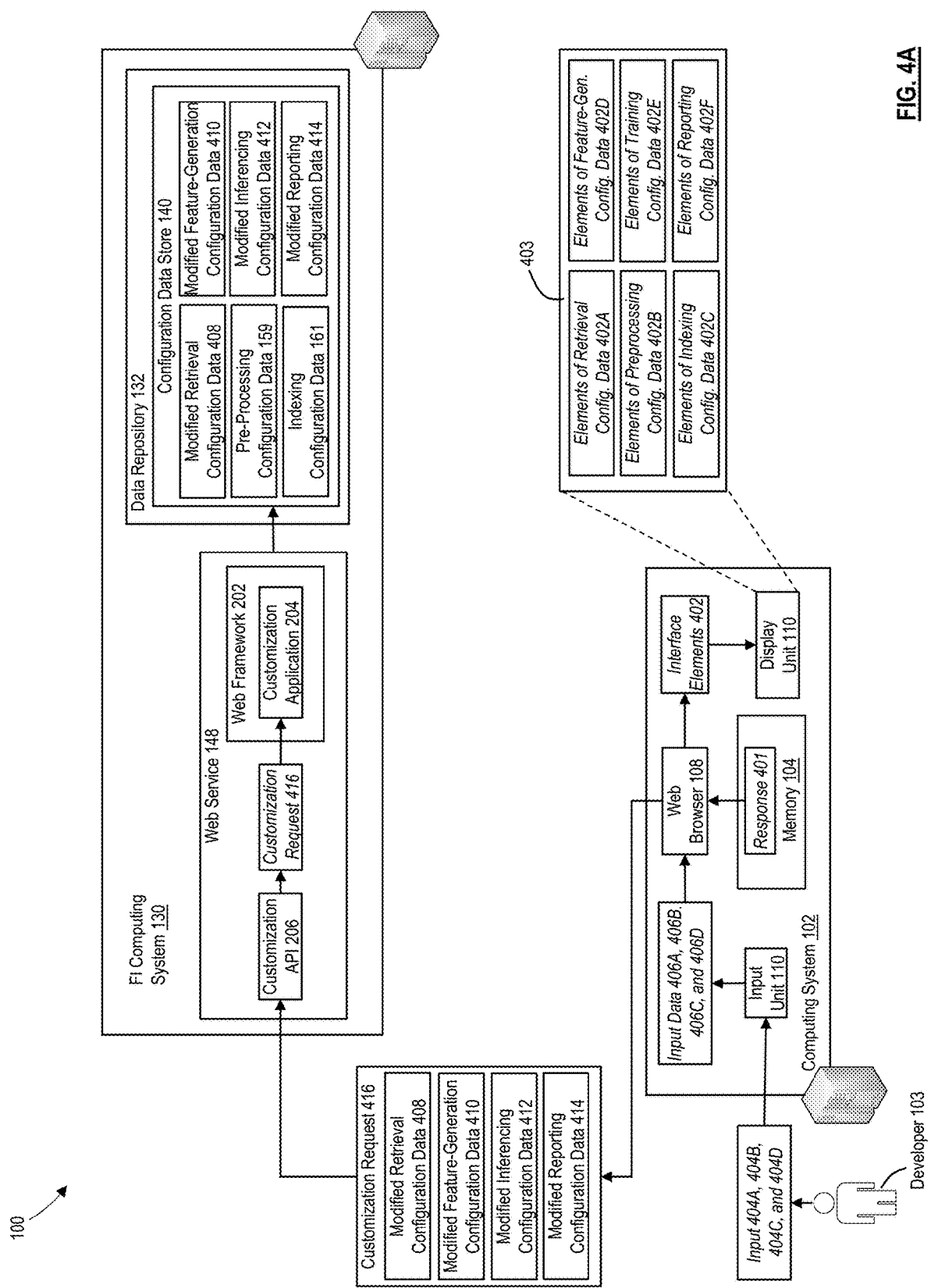

Referring to FIG. 4A, developer computing system 102 may receive the response to the corresponding access request, and executed web browser 108 may store the response, e.g., response 401, within a portion of memory 104. Executed web browser 108 may access response 401 within memory 104, and may obtain the requested elements of retrieval configuration data 157, preprocessing configuration data 159, indexing configuration data 161, feature-generation configuration data 167, inferencing configuration data 171, and reporting configuration data 173 from response 401, and executed web browser 108 may perform operations that process these elements of configuration data and generate corresponding interface elements 402, which executed web browser 108 may route to display device 110 of developer computing system 102.

Display device 110 may, for example, receive interface elements 402, which provide a graphical representation of the requested elements of configuration data associated with the default inferencing pipeline, as described herein, and may renders all, or a selected portion, of interface elements 402 for presentation within one or more display screens of digital interface 403. As illustrated in FIG. 2B, the one or more display screens of digital interface 403 may present interface elements 402A, which provide a graphical, and editable, representation of the requested elements of retrieval configuration data 157, interface elements 402B, which provide a graphical, and editable, representation of the requested elements of preprocessing configuration data 159, interface elements 402C, which provide a graphical, and editable, representation of the requested elements of indexing configuration data 161, and interface elements 402D, which provide a graphical, and editable, representation of the requested elements of feature-generation configuration data 167, interface elements 402E, which provide a graphical, and editable, representation of the requested elements of inferencing configuration data 171, and interface elements 402F, which provide a graphical, and editable, representation of the requested elements of reporting configuration data 173.

In some instances, and based on input received from developer 103 via input device 112, developer computing system 102 may perform operations that update, modify, or customize corresponding portions of the elements of engine-specific configuration data in accordance with the particular use-case of interest to developer 103. As described herein, the particular use-case of interest to developer 103 may be associated with an application of the gradient-boosted, decision-tree process (e.g., the XGBoost process) to the feature vectors derived from elements of confidential customer data, and a prediction of the likelihood of the occurrence, or the non-occurrence, of the targeted event involving the subset of the customers of the financial institution during the future temporal interval, which may be separated from the temporal prediction point by the corresponding buffer temporal interval.

To facilitate the modification and customization of the elements of retrieval configuration data 157, developer 103 may review interface elements 214A of digital interface 216, and may provide, to input device 112, elements of developer input 218A that, among other things, specify a unique identifier of each of the subset of the customers associated with the particular use-case, a unique identifier of each source data table that supports the generation of feature vectors for each of the customers, a primary key or composite primary key of each of the source data tables, and a network address of an accessible data repository that maintains each of the source data tables, e.g., a file path or an IP address of source data store 134, etc. Input device 112 may, for example, may receive developer input 404A, and may route corresponding elements of input data 406A to executed web browser 108, which may modify the elements of retrieval configuration data 157 to reflect input data 406A and that generate corresponding elements of modified retrieval configuration data 408.

Further, upon review interface elements 402B and 402C of digital interface 403, developer 103 may not elect to modify any of the elements of preprocessing configuration data 159 or indexing configuration data 161. Instead, developer 103 may elect to rely on the default preprocessing and data-indexing operations performed by corresponding ones of preprocessing engine 158 and indexing engine 160 within the default inferencing pipeline, and on the default values for the one or more parameters of the default preprocessing and data-indexing operations implemented by respective ones of preprocessing engine 158 and indexing engine 160.

Upon review of interface elements 402D of digital interface 403, developer 103 may elect to modify and customize one or more of the elements of feature-generation configuration data 167 to reflect the particular use-case of interest to developer 103 within the default inferencing pipeline. For example, developer 103 may elect to apply, to the source data tables ingested as artifacts by feature-generation engine 166 within the default inferencing pipeline, one or more temporal filters that exclude, from the corresponding inferencing data table(s), rows associated with timestamps disposed outside of the scope of the particular use-case (e.g., prior to a corresponding extraction interval, etc.). Further, developer 103 may elect to rely on the additional default preprocessing operations that generate, based on the ingested source data tables, one or more inferencing data tables that include rows characterizing each of the subset of the customers associated with the particular use-case.

In some instances, developer 103 may provide, to input device 112, corresponding elements of developer input 404B that specify each of the temporal filtration operations, along with corresponding values of the parameters that facilitate the application of each of the one or more temporal filtration operations, and that specify a specify a unique identifier of each of the subset of the customers associated with the particular use-case, e.g., to support the implementation of the additional default preprocessing operations that generate the inferencing data table(s). Input device 112 may, for example, receive developer input 404B, and may route corresponding elements of input data 406B to executed web browser 108, which may modify the elements of feature-generation configuration data 167 to reflect input data 406B and that generate corresponding elements of modified feature-generation configuration data 410.

Further, upon review of interface elements 402E and interface elements 402F of digital interface 403, developer 103 may elect to modify and customize one or more of the elements of inferencing configuration data 171 and reporting configuration data 173 to reflect the particular use-case of interest to developer 103. By way of example, developer 103 may provide, to input device 112, elements of developer input 404C that, among other things, specify the trained machine-learning or artificial-intelligence process of interest to developer 103 (e.g., the trained, gradient-boosted, decision-tree process, such as the XGBoost process), and a value of one or more process parameters of the trained machine-learning or artificial-intelligence processes (and additionally, or alternatively, an identifier and location of an ingestible artifact specifying the one or more process parameter values, e.g., output artifact generated by executed training engine 168 during the final training run of default training pipeline 302).

As described herein, the data that specifies the gradient-boosted, decision-tree process may include a helper script or function callable within the namespace of inferencing engine 170 or a corresponding class path, and the value of one or more process parameters of the trained gradient-boosted, decision-tree process, such as, but not limited to, those described herein, may facilitate an instantiation of the gradient-boosted, decision-tree process during the default inferencing pipeline (e.g., by executed inferencing engine 170). Further, in some instances, the elements of developer input 404C may also specify a structure of format of the elements of predictive output, and a structure of format of the generated inferencing logs (e.g., as an output file having a corresponding file format accessible at developer computing system 102, such as a PDF or a DOCX file). Input device 112 may, for example, receive developer input 404C, and may route corresponding elements of input data 406C to executed web browser 108, which may modify the elements of training configuration data 169 to reflect input data 406C and that generate elements of modified inferencing configuration data 412.

Further, as described herein, the elements of reporting configuration data 173 may specify a default composition of the elements of pipelined reporting data generated by executed reporting engine 172 during the default inferencing pipeline and a default structure or format of the pipeline monitoring and/or validation data, e.g., in PDF form, in DOCX form, in XML form, etc.). In some instances, upon review of interface elements 402F of digital interface 403, developer 103 may elect not to modify the default composition of either of the pipeline reporting data for the default inferencing pipeline, but may provide, to input device 112, elements of developer input 404D that, among other things, specifying that reporting engine 172 generate the pipeline reporting data in DOCX format. Input device 112 may, for example, receive developer input 404D, and may route corresponding elements of input data 406D to executed web browser 108, which may modify the elements of reporting configuration data 173 to reflect input data 406D and that generate elements of modified reporting configuration data 414.

Executed web browser 108 may perform operations that package the elements of modified retrieval configuration data 408, modified feature-generation configuration data 410, modified inferencing configuration data 412, and modified reporting configuration data 414 into corresponding portions of a customization request 416. In some instances, executed web browser 108 may also package, into an additional portion of customization request 416, a unique identifier of the default inferencing pipeline and the identifiers of developer computing system 102 or executed web browser 108, such as, but not limited to, those described herein. Executed web browser 108 may also perform operations that cause developer computing system 102 to transmit customization request 416 across communications network 120 to FI computing system 130.

In some instances, customization API 206 of executed customization application 204 may receive customization request 416, and perform any of the exemplary processes described herein to determine whether FI computing system 130 permits a source of customization request 234, e.g., developer computing system 102 or executed web browser 108, to modify or customize the elements of configuration data maintained within configuration data store 140. If, for example customization API 206 were to establish that FI computing system 130 fails to grant developer computing system 102, or executed web browser 108, permission to modify or customize the elements of configuration data maintained within configuration data store 140, customization API 206 may discard customization request 416 and FI computing system 130 may transmit a corresponding error message to developer computing system 102. Alternatively, if customization API 206 were to establish that FI computing system 130 grants developer computing system 102 and/or executed web browser 108, permission to modify or customize the elements of configuration data maintained within configuration data store 140, customization API 206 may route customization request 416 to executed customization application 204.

Executed customization application 204 may obtain, from customization request 416, the identifier of the default inferencing pipeline, the elements of modified retrieval configuration data 408, modified feature-generation configuration data 410, modified inferencing configuration data 412, and modified reporting configuration data 414, which reflect a customization of the default elements of retrieval configuration data 157, feature-generation configuration data 167, inferencing configuration data 171, and reporting configuration data 173 in accordance with the particular use-case of interest to developer 103. Based on the identifier, executed customization application 204 may access the elements of engine-specific configuration data associated with the default inferencing pipeline and maintained within configuration data store 140, and perform operations that replace the elements of retrieval configuration data 157, feature-generation configuration data 167, inferencing configuration data 171, and reporting configuration data 173 with corresponding ones of the elements of modified retrieval configuration data 408, modified feature-generation configuration data 410, modified inferencing configuration data 412, and modified reporting configuration data 414. Through a modification of one or more of the elements of configuration data in accordance with the particular use-case of interest to developer 103, the exemplary processes described herein may enable developer computing system 102 to customize the sequential execution of the application engines within the default inferencing pipeline to reflect the particular use-case without any modification, by developer computing system 102, to inferencing pipeline script 152, or to the underlying code of any of the application engines executed sequentially within the default inferencing pipeline by the one or more processors of FI computing system 130.

Figure 4B:
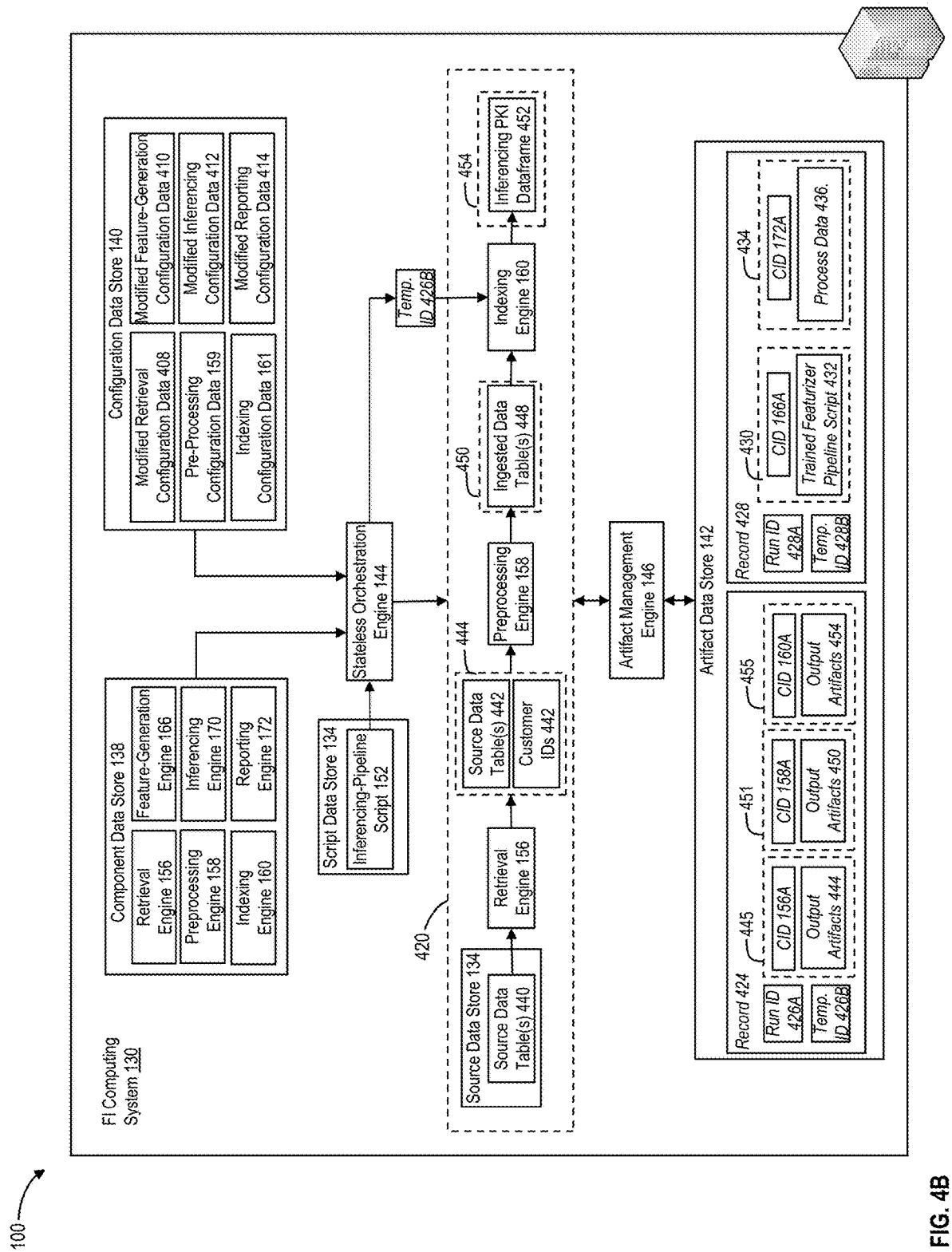

Referring to FIG. 4B, the one or more processors of FI computing system 130 may execute orchestration engine 144, data store 136 and obtain inferencing pipeline script 152. Inferencing pipeline script 152 may specify the execution flow of the default inferencing pipeline (e.g., an order of sequential execution of each of the application engines within the default inferencing pipeline) and may include, for each of the sequentially executed application engines, data identifying corresponding elements of engine-specific configuration data, one or more input artifacts ingested by the sequentially executed application engine, and additionally, or alternatively, one or more output artifacts generated by the sequentially executed application engine. By way of example, and as described herein, the default training pipeline may include retrieval engine 156, preprocessing engine 158, indexing engine 160, feature-generation engine 166, inferencing engine 170, and reporting engine 172, which may be executed sequentially by the one or more processors in accordance with the execution flow specified within executed training pipeline script.

Executed orchestration engine 144 may trigger an execution of inferencing pipeline script 152 by the one or more processors of FI computing system 130, which may establish the default inferencing pipeline, e.g., default inferencing pipeline 420. In some instances, upon execution of inferencing pipeline script 152, executed orchestration engine 144 may generate a unique, alphanumeric identifier, e.g., run identifier 426A, for a current run of default inferencing pipeline 420 in accordance with the corresponding elements of engine-specific configuration data (e.g., which developer 103 may customize in accordance with the particular use-case of interest using any of the exemplary processes described herein), and executed orchestration engine 144 may provision run identifier 426A to artifact management engine 146 via artifact API. Executed artifact management engine 146 may perform operations that, based on run identifier 426A, associate one or more data record 424 of artifact data store 142 with the current run of default inferencing pipeline 420, and that store run identifier 426A within data record 424 along with a corresponding temporal identifier 426B indicative of date at which executed orchestration engine 144 executed inferencing pipeline script 152 and established default inferencing pipeline 420 (e.g., on Nov. 1, 2023)

Upon execution by the one or more processors of FI computing system 130, each of retrieval engine 156, preprocessing engine 158, indexing engine 160, feature-generation engine 166, inferencing engine 170, and reporting engine 172 may ingest one or more input artifacts and corresponding elements of configuration data specified within executed inferencing pipeline script 152, and may generate one or more output artifacts. In some instances, executed artifact management engine 146 may obtain the output artifacts generated by corresponding ones of these application engines, and store the obtained output artifacts within a corresponding portion of data record 424, e.g., in conjunction within a unique, alphanumeric component identifier of the corresponding one of the executed application engines and run identifier 426A. Further, executed artifact management engine 146 may also maintain, in conjunction with the component identifier and corresponding output artifacts within data record 304, data characterizing input artifacts ingested by one, or more, of the executed application engines within default inferencing pipeline 420. As described herein, the maintenance of input artifacts ingested by a corresponding one of these executed application engines within default inferencing pipeline 420, and the association of the ingested input artifacts with the corresponding component identifier and run identifier 426A, may establish an artifact lineage that facilitates an audit of a provenance of an artifact ingested by the corresponding one of the executed application engines during the current run of default inferencing pipeline 420 (e.g., associated with run identifier 426A), and recursive tracking of the generation or ingestion of that artifact across the current implementation or run of default inferencing pipeline 420 (e.g., associated with run identifier 426A) and one or more prior runs of default inferencing pipeline 420 (or of the default training and target-generation pipelines described herein).

Further, and in addition to data record 424 characterizing the current run of default inferencing pipeline 420, executed artifact management engine 146 may also maintain, within artifact data store 142, data records characterizing prior runs of default inferencing pipeline 420, one or more prior runs of a default target-generation pipeline, and one or more prior runs of default training pipeline 302. For example, as illustrated in FIG. 4B, artifact data store 142 may also include additional data record 428, which characterizes the output artifacts generated by (and in some instances, the input artifacts ingested by), each of the application engines executed sequentially by the one or more processors of FI computing system 130 during the final training run of default training pipeline 302. Additional data record 428 may include a unique, alphanumeric identifier 428A of the final training run of default training pipeline 302, a temporal identifier 428B that identifies an initiation time or date of final training run of default training pipeline 302, and elements of engine-specific artifact data that include the output artifacts generated by corresponding ones of the sequentially application engines and that associate each of the engine-specific output artifacts with a corresponding component identifier.

By way of example, the elements of engine-specific artifact data may include, among other things, elements of feature-generation artifact data 430, which include component identifier 166A of feature-generation engine 166 and a final featurizer pipeline script 432 generated by executed feature-generation engine 166 during the final training run of default training pipeline 302, and elements of reporting artifact data 434, which include component identifier 172A of reporting engine 172 and elements of process data 436 characterizing the trained machine-learning or artificial-intelligence process. As described herein, final featurizer pipeline script 432 may establish a final featurizer pipeline of sequentially executed ones of the mapped, default stateless transformation and the mapped, default estimation operations that, upon application to the rows of corresponding ones an inferencing data table, generate a feature vector appropriate for ingestion by the trained machine-learning or artificial-intelligence process. Further, the elements of process data 436 include the values of one or more process parameters associated with the trained machine-learning or artificial-intelligence process.

In some instances, one or more of the elements of artifact data characterizing the final training run of default training pipeline 302, including the elements of elements of feature-generation artifact data 430 and reporting artifact data 434, may represent input artifacts for executed inferencing pipeline script 152 (and for default inferencing pipeline 420), and may be ingested by corresponding ones of the executed application engines within default inferencing pipeline 420. By way of example, featurizer module 346 of executed feature generation engine 168 within default inferencing pipeline 420 may ingest final featurizer pipeline script 432 and generate feature vectors for the trained machine-learning or artificial-intelligence process based on sequential application the mapped, default stateless transformation operations and the mapped, default estimation operations to rows of one or more inferencing data tables, e.g., in accordance with final featurizer pipeline script 432. Further, within default inferencing pipeline 420, executed inferencing engine 170 may ingest the elements of process data 436 and perform operations described herein that cause the one or more processors of FI computing system 130 to instantiate the trained machine-learning or artificial-intelligence process in accordance with the values of the one or more process parameters.

Referring back to FIG. 4B, executed inferencing pipeline script 152 may trigger an execution of retrieval engine 156 by the one or more one or more processors of FI computing system 130, and orchestration engine 144 may provision one or more the elements of modified retrieval configuration data 408 to the programmatic interface associated with executed retrieval engine 156 (e.g., as corresponding input artifacts), and may perform any of the exemplary processes described herein to establish a consistency of the corresponding input artifacts with the engine- and pipeline-specific operational constraints imposed on executed retrieval engine 156. Based on an established consistency of the input artifacts with the imposed engine- and pipeline-specific operational constraints, executed retrieval engine 156 may perform operations, described herein, to access source data store 134, and obtain one or more of source data table(s) 440 associated with the particular use-case of developer 103, based on the elements of modified retrieval configuration data 408. Further, executed retrieval engine 156 may also perform operations that obtain the unique identifiers of the subset of the customers associated with the particular use-case from the elements of modified retrieval configuration data 408 (e.g., as customer identifiers 442), and that provision source data table(s) 440 and customer identifiers 442 to executed artifact management engine 146, e.g., as output artifacts 444 of executed retrieval engine 156.

In some instances, executed artifact management engine 146 may receive each of output artifacts 444 via the artifact API, and may perform operations that package each of output artifacts 444 into a corresponding portion of retrieval artifact data 445, along with identifier 156A of executed retrieval engine 156, and that store retrieval artifact data 445 within a corresponding portion of artifact data store 142, e.g., within data record 424 associated with default inferencing pipeline 420 and run identifier 426A. Further, although not illustrated in FIG. 4B, executed artifact management engine 146 may also package, into a corresponding portion of retrieval artifact data 445, additional data identifying and characterizing one or more of the input artifacts ingested by executed retrieval engine 156, such as, but not limited to, the elements of modified retrieval configuration data 222.

Further, and in accordance with default inferencing pipeline 420, executed retrieval engine 156 may provide output artifacts 444, including source data table(s) 440 and customer identifiers 442, as inputs to preprocessing engine 158 executed by the one or more processors of FI computing system 130, and executed orchestration engine 144 may provision one or more elements of preprocessing configuration data 159 maintained within configuration data store 140 to executed preprocessing engine 158, e.g., in accordance with executed training pipeline script 150. In some instances, the programmatic interface associated with executed preprocessing engine 158 may ingest each of source data table(s) 440, customer identifiers 442 and one or more elements of preprocessing configuration data 159 (e.g., as corresponding input artifacts), and may perform any of the exemplary processes described herein to establish a consistency of the corresponding input artifacts with the engine- and pipeline-specific operational constraints imposed on executed preprocessing engine 158.

Based on an established consistency of the input artifacts with the imposed engine- and pipeline-specific operational constraints, executed preprocessing engine 158 may perform operations that apply each of the default preprocessing operations to corresponding ones of source data table(s) 440 (and in some instances, to customer identifiers 442 of the target subset of the customers) in accordance with the elements of preprocessing configuration data 159 (e.g., through an execution or invocation of each of the specified default scripts or classes within the namespace of executed preprocessing engine 158, etc.). Further, and based on the application of each of the default preprocessing operations to source data table(s) 440 and/or customer identifiers 442, executed preprocessing engine 158 may also generate one or more ingested data table(s) 448 having identifiers, and structures or formats, consistent with the default identifier, and default structures or formats, specified within the elements of preprocessing configuration data 159.

In some instances, executed preprocessing engine 158 may perform operations that provision ingested data table(s) 448 to executed artifact management engine 146, e.g., as output artifacts 450 of executed preprocessing engine 158. Executed artifact management engine 146 may receive each of output artifacts 450 via the artifact API, and may perform operations that package each of output artifacts 450 into a corresponding portion of preprocessing artifact data 451, along with identifier 158A of executed preprocessing engine 158, and that store preprocessing artifact data 451 within a corresponding portion of artifact data store 142, e.g., within data record 424 associated with default inferencing pipeline 420 and run identifier 426A. Further, although not illustrated in FIG. 4B, executed artifact management engine 146 may also package, into a corresponding portion of preprocessing artifact data 451, additional data identifying and characterizing one or more of the input artifacts ingested by executed preprocessing engine 158, such as, but not limited to, the elements of preprocessing configuration data 159, source data tables 440, and/or customer identifiers 442.

Executed preprocessing engine 158 may provide output artifacts 450, including ingested data table(s) 448, as inputs to indexing engine 160 executed by the one or more processors of FI computing system 130. Executed orchestration engine 144 may also perform operations that provision one or more elements of indexing configuration data 161 maintained within configuration data store 140 to executed indexing engine 160, Further, and based on programmatic communications with executed artifact management engine 146, executed orchestration engine 144 may perform operations that obtain customer identifiers 442 (e.g., a portion of output artifacts 444) and temporal identifier 426B (e.g., identifying the Nov. 1, 2023, initiation date of default inferencing pipeline 420) from record 424 of artifact data store 142, and that provision temporal identifier 426B and customer identifiers 442 to executed indexing engine 160 in accordance with default inferencing pipeline 420. As described herein, the programmatic interface associated with executed indexing engine 160 may receive temporal identifier 426B, customer identifiers 442, ingested data table(s) 448, and the one or more elements of indexing configuration data 161 (e.g., as input artifacts), and may perform operations that establish a consistency of these input artifacts with the engine- and pipeline-specific operational constraints imposed on executed indexing engine 160.

Based on an established consistency of the input artifacts with the imposed engine- and pipeline-specific operational constraints, executed indexing engine 160 may perform operations, consistent with the elements of indexing configuration data 161, that generate an inferencing PKI dataframe 452 for the current run of default inferencing pipeline 420, e.g., initiated on Nov. 1, 2023. By way of example, the elements of indexing configuration data 161 may include, among other things, an identifier of each of the ingested data table(s) 448, a primary key or composite primary key of each of ingested data table(s) 448, data characterizing a structure, format, or storage location of an output artifact generated by executed indexing engine 160, such as inferencing PKI dataframe 452, and one or more constraints imposed on the output artifact, e.g., inferencing PKI dataframe 452. Based on the elements of indexing configuration data 161, executed indexing engine 160 access each of ingested data table(s) 448, select one or more columns from each of the each of ingested data table(s) 448 that are consistent with the corresponding primary key (or composite primary key), and generate a dataframe, e.g., inferencing PKI dataframe 452, that includes the entries of each of the selected columns.

Inferencing PKI dataframe 452 may, for example, include a plurality of discrete rows populated with corresponding ones of the entries of each of the selected columns, e.g., the values of corresponding ones of the primary keys (or composite primary keys) obtained from each of ingested data table(s) 440, and as described herein, examples of these primary keys (or composite primary keys) may include, but are not limited to, a unique, alphanumeric identifier assigned to corresponding customers by the financial institution, and temporal data, such as a timestamp. Further, in some instances the one or more constraints imposed on inferencing PKI dataframe 452 within default inferencing pipeline 420 may include, but are not limited to, a constraint that inferencing PKI dataframe 452 include a single row for each of the subset of the customers associated with the particular use-case (e.g., including a corresponding one of customer identifiers 442), and that the temporal data maintained within each customer-specific row of inferencing PKI dataframe 452 reflect a temporal prediction point of the inferencing operations performed within default inferencing pipeline 420, e.g., the Nov. 1, 2023, initiation time of default inferencing pipeline 420.

In some instances, within default inferencing pipeline 420, executed indexing engine 160 may perform additional operations that process inferencing PKI dataframe 452 in accordance with the imposed constraints, e.g., by deleting one or more customer-specific rows that maintain duplicate or redundant ones of customer identifiers 442 and by populating each of the customer-specific rows with temporal data characterizing the temporal prediction point of Nov. 1, 2023. Upon processing in accordance with the imposed constraints, each of the discrete rows of inferencing PKI dataframe 452 may be associated with a corresponding one of the subset of the customers associated with the particular use-case (and may include a corresponding one of customer identifiers 442) and may reference the temporal prediction point for the inferencing processes described herein, the rows maintained within inferencing PKI dataframe 452 may represent a base population for one or more of the exemplary feature-generation and inferencing processes performed by the one or more processors of FI computing system 130 within default inferencing pipeline 420 (e.g., in accordance with executed inferencing pipeline script 152).

Executed indexing engine 160 may perform operations that provision inferencing PKI dataframe 452 to executed artifact management engine 146, e.g., as output artifacts 454 of executed indexing engine 160. In some instances, executed artifact management engine 146 may receive output artifacts 454 via the artifact API, and may perform operations that package output artifacts 454 into a corresponding portion of indexing artifact data 455, along with a unique, alphanumeric identifier 160A of executed indexing engine 160, and that store indexing artifact data 455 within a corresponding portion of artifact data store 142, e.g., within data record 424 associated with default inferencing pipeline 420 and run identifier 426A. Further, although not illustrated in FIG. 4B, executed artifact management engine 146 may also package, into a corresponding portion of retrieval artifact data 307, additional data identifying and characterizing one or more of the input artifacts ingested by executed indexing engine 160, such as, but not limited to, ingested data table(s) 308 and the elements of indexing configuration data 161.

Figure 4C:
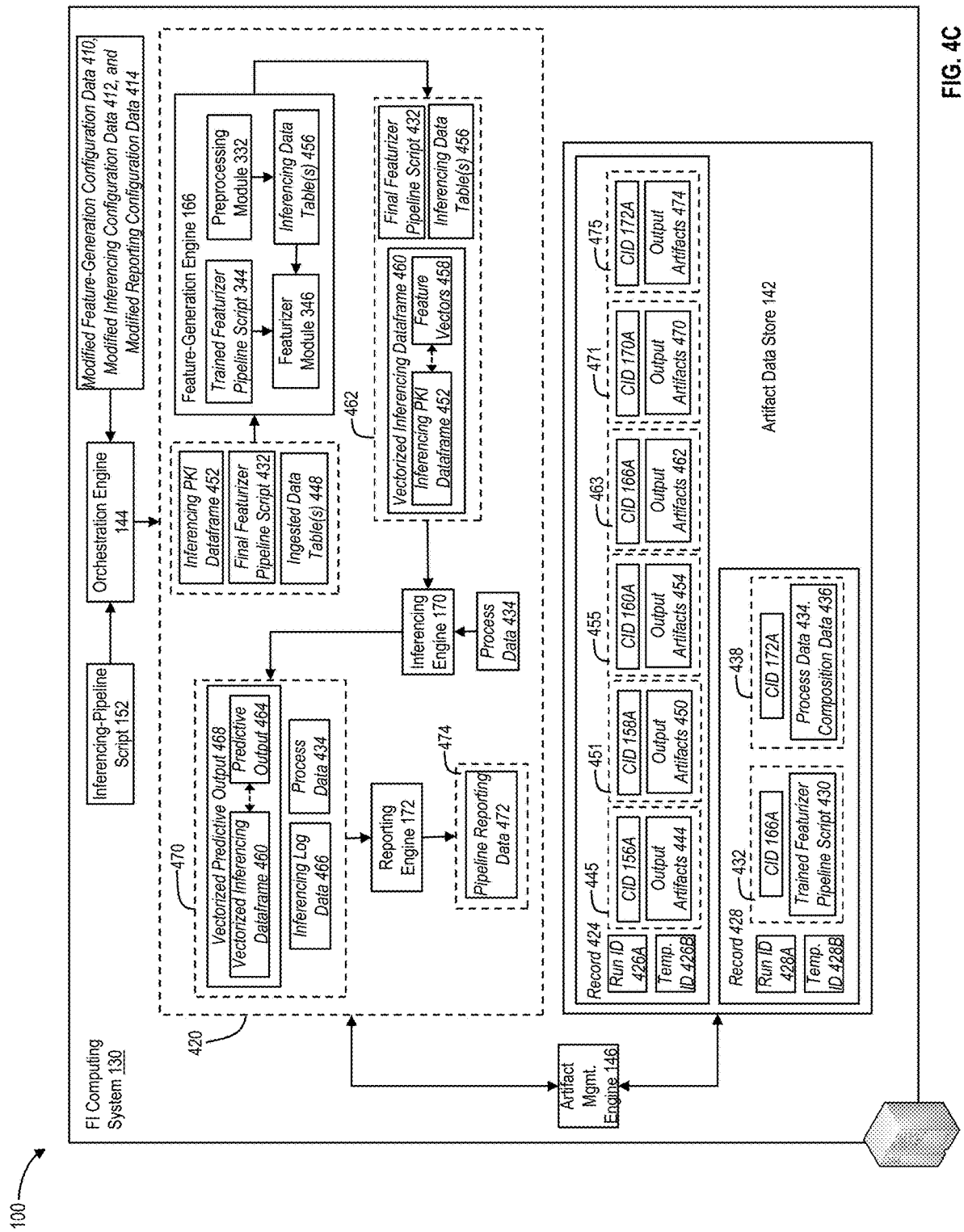

Referring to FIG. 4C, and in accordance with default inferencing pipeline 420, executed indexing engine 160 may provide output artifacts 454, including inferencing PKI dataframe 452, as input to feature-generation engine 166 executed by the one or more processors of FI computing system 130. In some instances, within default inferencing pipeline 420, executed orchestration engine 144 may provision one or more elements of modified feature-generation configuration data 410 maintained within configuration data store 140. Further, and based on programmatic communications with executed artifact management engine 146, executed orchestration engine 144 may perform operations that obtain ingested data table(s) 448 (e.g., a portion of output artifacts 450 of executed preprocessing engine 158) from record 424 of artifact data store 142, and that obtain a featurizer pipeline script associated with a final training run of default training pipeline 302 and with the trained machine-learning or artificial-intelligence process, such as, but not limited to, a final featurizer pipeline script 432 maintained as a portion of feature-generation artifact data 430 within data record 428 of artifact data store 142. As described herein, final featurizer pipeline script 432 may establish a final featurizer pipeline of sequentially executed ones of the mapped, default stateless transformation and the mapped, default estimation operations that, upon application to the rows of inferencing data table(s) 448, generate a customer-specific feature vector appropriate for ingestion by the trained machine-learning or artificial-intelligence process. Executed orchestration engine 144 may provision final featurizer pipeline script 432 and each of ingested data table(s) 448 as additional input to executed feature-generation engine 166.

In some instances, the programmatic interface of executed feature-generation engine 166 may receive modified feature-generation configuration data 410, final featurizer pipeline script 432, ingested data table(s) 448, and inferencing PKI dataframe 452 (e.g., as corresponding input artifacts), and may perform operations that establish a consistency of these input artifacts with the engine- and pipeline-specific operational constraints imposed on executed feature-generation engine 166. Based on an established consistency of the input artifacts with the imposed engine- and pipeline-specific operational constraints, executed feature-generation engine 166 may perform one or more of the exemplary processes described herein that, consistent with the elements of modified feature-generation configuration data 410, generate a customer-specific feature vector of corresponding feature values for each row of inferencing PKI dataframe 452 based on, among other things, a sequential application of the mapped, default stateless transformations and the mapped, default estimation operations specified within final featurizer pipeline script 432 to elements of an inferencing data table.

For example, within default inferencing pipeline 420, preprocessing module 332 of executed feature-generation engine 166 may obtain each of ingested data table(s) 448, and may apply sequentially one or more of the preprocessing operations to selected ones of ingested data table(s) 448 in accordance with the elements of modified feature-generation configuration data 410. As described herein, elements of modified feature-generation configuration 410 may include, among other things, data specifying each of the one or more preprocessing operations and a sequential order in which executed preprocessing module 332 applies the one or more preprocessing operations to ingested data table(s) 448 (e.g., via sequentially ordered scripts or functions callable within the namespace of feature-generation engine 166, etc.) and values of one or more parameters of each of the specified preprocessing operations, which may customized to reflect the particular use-case of interest to developer 103 using any of the exemplary processes described herein.

Examples of the specified preprocessing operations may include, but are not limited to, one or more temporal filtration operations, one or more customer-, account-, or transaction-specific filtration operations, and a join operation (e.g., an inner- or outer-join operations, etc.) applied to a subset of ingested data table(s) 448. Further, in applying the join operation to the subset of the subset of ingested data table(s) 448, executed feature-generation engine 166 may perform operations, described herein, that establish a presence or absence, within each of subset of ingested data table(s) 448, of columns associated with each of the primary keys within inferencing PKI dataframe 452 (e.g., the customer identifier and temporal data described herein, etc.). In some instances, and based on an absence of a column associated with one of the primary keys within at least one of ingested data table(s) 308 subject to the join operation, executed preprocessing module 332 may perform operations that augment the at least one of ingested data table(s) 440 to include an additional column associated with the absent primary key, e.g., based on an application of a "fuzzy join" operation based on fuzzy string matching.

Based on an application of the one or more preprocessing operations to corresponding ones of ingested data table(s) 448 in accordance with the modified elements of feature-generation configuration data 410, executed preprocessing module 332 may generate one or more inferencing data table(s) 456, which may facilitate a generation, using any of the exemplary processes described herein, of a feature vector of specified, or adaptively determined, feature values for each row of inferencing PKI dataframe 452. For example, as illustrated in FIG. 4C, featurizer module 346 of executed feature generation engine 166 may obtain final featurizer pipeline script 432, inferencing PKI dataframe 452, and inferencing data table(s) 456, and executed featurizer module 346 may trigger an execution of final featurizer pipeline script 432 by the one or more processors of FI computing system 130. As described herein, the execution of final featurizer pipeline script 432 may establish the final featurizer pipeline of the sequentially executed ones of the mapped, default stateless transformation operations and the mapped, default estimation operations associated with the trained machine-learning or artificial-intelligence process, and the established, final featurizer pipeline may ingest inferencing data table(s) 456.

Within the established, final featurizer pipeline, executed featurizer module 346 may apply sequentially each of the mapped, default stateless transformation operations and the mapped, default estimation operations to the rows of inferencing data table(s) 456, and generate a corresponding feature vector of sequentially ordered feature values for each of the rows of inferencing PKI dataframe 452, e.g., a corresponding one of feature vectors 458. As described herein, each of feature vectors 458 may include feature values associated with a corresponding set of features, and executed featurizer module 346 may perform operations that append each of feature vectors 458 to a corresponding row of inferencing PKI dataframe 452, and that generate elements of a vectorized inferencing dataframe 460 that include each row of inferencing PKI dataframe 452 and the appended one of feature vectors 458.

Further, executed featurizer module 346 may also perform operations that provision vectorized inferencing dataframe 460 and in some instances, final featurizer pipeline script 432 and inferencing data table(s) 456 to executed artifact management engine 146, e.g., as output artifacts 462 of executed featurizer module 346 within default inferencing pipeline 420. In some instances, executed artifact management engine 146 may receive each of output artifacts 462, and may perform operations that package each of output artifacts 360 into a corresponding portion of feature-generation artifact data 463, along with identifier 166A of executed feature-generation engine 166, and that store feature-generation artifact data 463 within a corresponding portion of artifact data store 142, e.g., within data record 424 associated with default inferencing pipeline 420 and run identifier 426A. Further, although not illustrated in FIG. 4C, executed artifact management engine 146 may also package, into a corresponding portion of feature-generation artifact data 463, additional data identifying and characterizing one or more of the input artifacts ingested by executed feature-generation engine 166.

In some instances, and in accordance with default inferencing pipeline 420, executed feature-generation engine 166 may provide vectorized inferencing dataframe 460 as an input to inferencing engine 170 executed by the one or more processors of FI computing system 130 within default inferencing pipeline 420, e.g., in accordance with executed inferencing pipeline script 152. Further, and based on programmatic communications with executed artifact management engine 146, executed orchestration engine 144 may perform operations that obtain a value of one or more processor parameters that characterize the trained machine-learning or artificial-intelligence process, such as, but not limited to, the elements of process data 436 maintained as a portion of reporting artifact data 434 within data record 428 of artifact data store 142 (e.g., generated during the final training run of default training pipeline 302). Executed orchestration engine 144 may also provision the elements of process data 436, and the one or more elements of modified inferencing configuration data 412 maintained within configuration data store 140, as additional inputs to executed inferencing engine 170 within default inferencing pipeline 420.

A programmatic interface associated with executed inferencing engine 170 may receive the elements of modified inferencing configuration data 412, the elements of process data 436, vectorized inferencing dataframe 460, e.g., as input artifacts, and the programmatic interface may perform operations that establish a consistency of these input artifacts with the engine- and pipeline-specific operational constraints imposed on executed training engine 168. Based on an established consistency of the input artifacts with the imposed engine- and pipeline-specific operational constraints, executed inferencing engine 170 may cause the one or more processors of FI computing system 130 to perform operations that instantiate the trained machine-learning or artificial-intelligence process specified within the elements of modified inferencing configuration data 412 in accordance with the values of the corresponding process parameters.

In some instances, as described herein, the elements of process data 436 may specify all, or a selected subset, of the process parameter values associated with the trained machine-learning process, although in other instances, one or more of the process parameter values may be specified within the elements of modified inferencing configuration data 412 (e.g., which may be customized to reflect the particular use-case of interest to developer 103 using any of the exemplary processes described herein). Examples of these developer-specified parameter values include, but are not limited to, a learning rate, a number of discrete decision trees (e.g., the "n_estimator" for the trained, gradient-boosted, decision-tree process), a tree depth characterizing a depth of each of the discrete decision trees, a minimum number of observations in terminal nodes of the decision trees, and/or values of one or more hyperparameters that reduce potential model overfitting.

Through the implementation of one or more parallelized, fault-tolerant distributed computing and analytical processes described herein, the one or more processors of FI computing system 130 may perform operations that apply the instantiated, and trained, machine-learning or artificial-intelligence process to each row of vectorized inferencing dataframe 460 (e.g., the corresponding row of inferencing PKI dataframe 452 and the appended one of feature vectors 458). Further, based on the application of the trained, machine-learning or artificial-intelligence process to each row of vectorized inferencing dataframe 460, the one or more processors of FI computing system 130 may generate an element of predictive output 464 associated with the corresponding customer and temporal prediction point, and elements of inferencing log data 466 that characterize the application of the trained machine-learning or artificial-intelligence process to the each row of vectorized inferencing dataframe 460.

In some instances, the elements of inferencing log data 466 may include performance data characterizing the application of the trained machine-learning or artificial-intelligence process to the rows of vectorized inferencing dataframe 460 (e.g., execution times, memory or processor usage, etc.) and the values of the process parameters associated with the trained machine-learning or artificial-intelligence process, as described herein. Further, the elements of inferencing log data 466 may also include elements of explainability data characterizing the predictive performance and accuracy of the trained machine-learning or artificial-intelligence process during application to the rows of vectorized inferencing dataframe 460. By way of example, the elements of explainability data may include, but are not limited to, one or more Shapley feature values that a relative of importance of each of the discrete features within feature vectors 458 and/or values of one or more deterministic or probabilistic metrics that characterize the relative importance of discrete ones of the features, such as, but not limited to, data establishing individual conditional expectation (ICE) curves or partial dependency plots, computed precision values, computed recall values, computed areas under curve (AUCs) for receiver operating characteristic (ROC) curves or precision-recall (PR) curves, and/or computed multiclass, one-versus-all areas under curve (MAUCs) for ROC curves.

By way of example, and as described herein, developer 103 may elect to train a gradient-boosted, decision-tree process (e.g., an XGBoost process), to predict a likelihood of an occurrence, or a non-occurrence, of a targeted event involving one or more customers of the financial institution during a future temporal interval separated from the temporal prediction point by a corresponding buffer interval. As described herein, elements of modified inferencing configuration data 412 may include data that identifies the gradient-boosted, decision-tree process (e.g., a helper class or script associated with the XGBoost process and capable of invocation within the namespace of executed inferencing engine 170). In some instances, and based on the elements of modified inferencing configuration data 412, executed training engine 168 may cause the one or more processors of FI computing system 130 to instantiate the gradient-boosted, decision-tree process (e.g., the XGBoost process) in accordance with the values of the corresponding process parameters specified within process data 436 and additionally, or alternatively, within modified inferencing configuration data 412.

Executed inferencing engine 170 may cause the one or more processors of FI computing system 130 may perform operations that establish a plurality of nodes and a plurality of decision trees for the trained gradient-boosted, decision-tree process, each of which receive, as inputs, each of the rows of vectorized inferencing dataframe 460, which include the corresponding row of inferencing PKI dataframe 452 and the appended one of feature vectors 458. Based on the ingestion of the rows of vectorized inferencing dataframe 460 by the plurality of nodes and decision trees of the trained gradient-boosted, decision-tree process (e.g., which apply the trained gradient-boosted, decision-tree process to each of the rows of vectorized inferencing dataframe 460), the one or more processors of FI computing system 130 may generate corresponding ones of the elements of predictive output 464, which may indicate the predicted likelihood of the occurrence, or non-occurrence, of the targeted event involving corresponding ones of the subset of the customers the future temporal interval, and the elements of inferencing log data 466, which characterize the application of the trained gradient-boosted, decision-tree process to the rows of vectorized inferencing dataframe 460.

As illustrated in FIG. 4C, executed inferencing engine 170 may append each of the elements of predictive output 464 to the corresponding row of vectorized inferencing dataframe 460, and generate elements of vectorized predictive output 468 that include each row of vectorized inferencing dataframe 460 and the appended element of predictive output 464. Further, executed inferencing engine 170 may perform operations that provision vectorized predictive output 468, the elements of inferencing log data 466, and in some instances, the elements of process data 436, to executed artifact management engine 146, e.g., as output artifacts 470 of executed inferencing engine 170 within default inferencing pipeline 420.

Executed artifact management engine 146 may receive each of output artifacts 470, and may perform operations that package each of output artifacts 470 into a corresponding portion of inferencing artifact data 471, along with a unique, component identifier 170A of executed inferencing engine 170, and that store inferencing artifact data 471 within a corresponding portion of artifact data store 142, e.g., within data record 424 associated with default inferencing pipeline 420 and run identifier 426A. Further, although not illustrated in FIG. 4C, executed artifact management engine 146 may also package, into a corresponding portion of inferencing artifact data 471, additional data identifying and characterizing one or more of the input artifacts ingested by executed inferencing engine 170, and as described herein, the inclusion of the data characterizing the input artifacts ingested by executed inferencing engine 170, and the association of the data characterizing these input artifacts with the identifier 170 of executed inferencing engine 170 and run identifier 426A of the current run of the default inferencing pipeline, may establish an artifact lineage facilitating recursive artifact auditing and tracking using any of the exemplary processes described herein.

Further, and in accordance with default inferencing pipeline 420, executed inferencing engine 170 may provide output artifacts 470, including vectorized predictive output 468 (e.g., the rows vectorized inferencing dataframe 460 and the appended elements of predictive output 464) and the elements of inferencing log data 466 as inputs to reporting engine 172 executed by the one or more processors of FI computing system 130. Based on programmatic communications with executed artifact management engine 146, executed orchestration engine 144 may perform operations that obtain output artifacts generated by respective ones of retrieval engine 156, preprocessing engine 158, indexing engine 160, target-generation engine 162, splitting engine 164, feature-generation engine 166, and inferencing engine 170 within the current run of default inferencing pipeline 420, such as, but not limited to, output artifacts 444, 450, 454, and 462 maintained within data record 424 of artifact data store 142. Executed orchestration engine 144 may also provision each of the obtained output artifacts, and the elements of modified reporting configuration data 414 maintained configuration data store 1401, to executed reporting engine 172.

In some instances, executed reporting engine 172 may perform any of the exemplary processes described herein to establish a consistency of these input artifacts with the engine- and pipeline-specific operational constraints imposed on executed reporting engine 172. Based on an established consistency of the input artifacts with the imposed engine- and pipeline-specific operational constraints, executed reporting engine 172 may perform operations that generate one or more elements of pipeline reporting data 472 that characterize an operation and a performance of the discrete, modular components executed by the one or more processors of FI computing system 130 within default inferencing pipeline 420, and that characterize the predictive performance and accuracy of the machine-learning or artificial-intelligence process during application to vectorized inferencing dataframe 460. As described herein, the elements of modified reporting configuration data 414 may specify a default composition of pipeline reporting data 472 and a customized format of pipeline reporting data 472, e.g., DOCX format.

By way of example, and based on corresponding ones of output artifacts 444, 450, 454, 462, and 470, executed reporting engine 172 may perform operations that establish a successful, or failed, execution of corresponding ones of executed retrieval engine 156, preprocessing engine 158, indexing engine 160, target-generation engine 162, splitting engine 164, feature-generation engine 166, and inferencing engine 170 within the current run of default inferencing pipeline 420, e.g., by confirming that each of the generated elements of artifact data are consistent, or inconsistent, with corresponding ones of the imposed, and enforced, operational constraints imposed and enforced by corresponding ones of the elements of configuration data and APIs. In some instances, executed reporting engine 172 may generate one or more elements of pipeline reporting data 386 indicative of the successful execution of the application engines within default inferencing pipeline 420 (and a successful execution of default inferencing pipeline 420) or alternatively, an established failure in an execution of one, or more, of the application engines within default inferencing pipeline 420 (e.g., and a corresponding failure of default inferencing pipeline 420).

In some examples, based on output artifacts 462 generated by feature-generation engine 166, and on output artifacts 470 generated by executed inferencing engine 170 (e.g., within default inferencing pipeline 420), executed reporting engine 172 may package, into portions of pipeline reporting data 472, final featurizer pipeline script 432 and the elements of process data 436 associated with the trained machine-learning or artificial-intelligence process. Further, and based on output artifacts 470 generated by executed inferencing engine 170 executed reporting engine 172 may also obtain all or a selected portion of the explainability data characterizing the predictive performance and accuracy of the trained machine-learning or artificial-intelligence process (e.g., the gradient-boosted, decision-tree process described herein, such as the XGBoost process) during application to vectorized inferencing dataframe 460 within default inferencing pipeline 420, such as, but not limited to, the elements of explainability data described herein, and perform operations that package the obtained portions of the explainability data into corresponding portions of pipeline reporting data 472.

Additionally, or alternatively, and based on one or more of output artifacts 444, 450, 454, 462, and 470, executed reporting engine 172 may perform operations that generate values of metrics characterizing a bias or a fairness of the machine-learning or artificial-intelligence process and additionally, or alternatively, at a bias or a fairness associated with the calculations performed at all, or a selected subset, of the discrete steps of the execution flow established by default inferencing pipeline 420, e.g., the sequential execution of retrieval engine 156, preprocessing engine 158, indexing engine 160, feature-generation engine 166, and inferencing engine 170 within default inferencing pipeline 420. As described herein, the metrics characterizing the bias or fairness may be imposed internally by the financial institution, or may be associated with one or more governmental or regulatory entities, and executed reporting engine may package the generated metric values with an additional portion of pipeline reporting data 386.

Executed reporting engine 172 may structure the pipeline reporting data 472 in accordance with the elements of modified reporting configuration data 414, such as, but not limited to, DOCX format, and executed reporting engine 172 may provide pipeline reporting data 472 to executed artifact management engine 146, e.g., as output artifacts 474 of executed reporting engine 172 within default inferencing pipeline 420. In some instances, executed artifact management engine 146 may receive each of output artifacts 474, and may perform operations that package each of output artifacts 474 into a corresponding portion of reporting artifact data 475, along with identifier 168A of executed training engine 168, and that store reporting artifact data 475 within a corresponding portion of artifact data store 142, e.g., within data record 424 associated with default inferencing pipeline 420 and run identifier 426A. Further, although not illustrated in FIG. 4C, executed artifact management engine 146 may also package, into a corresponding portion of reporting artifact data 475, additional data identifying and characterizing one or more of the input artifacts ingested by executed reporting engine 172 within default inferencing pipeline 420.

Figure 4D:
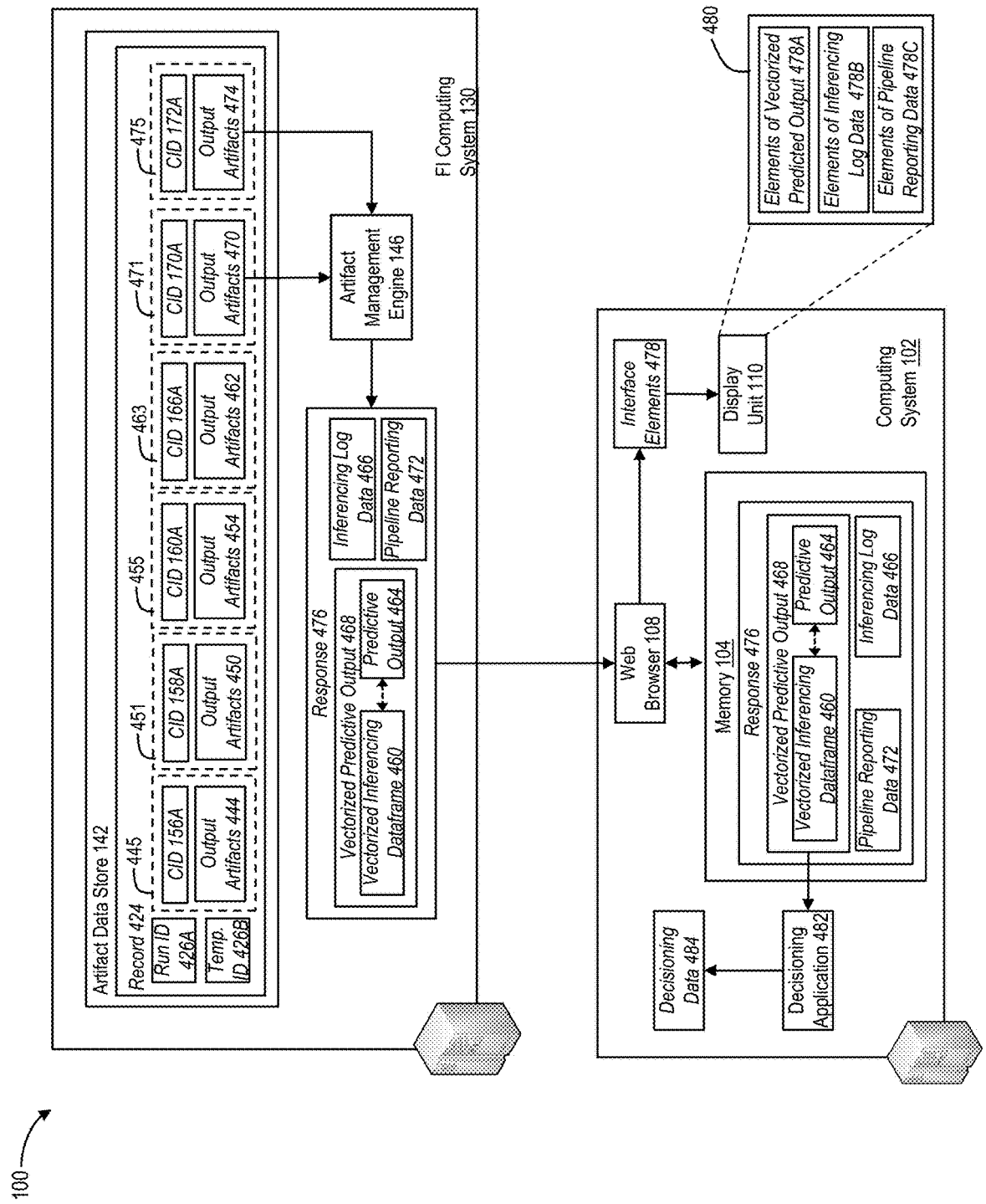

In some instances, and upon completion of the current run of default inferencing pipeline 420 (e.g., at the temporal prediction point of Nov. 1, 2023), executed orchestration engine 144 may also perform operations that cause the one or more processors of FI computing system 130 to transmit each, or a selected subset, of the elements of inferencing artifact data 471, which include output artifacts 470 generated by executed inferencing engine 170 during the current run of default inferencing pipeline 420, and the elements of reporting artifact data 475, which include output artifacts 474 generated by executed reporting engine 174 during the current run of default inferencing pipeline 420, to developer computing system 102. For example, referring to FIG. 4D, executed orchestration engine 144 may access data record 424 of artifact data store 142, which includes run identifier 426 of the current, November $1^{st}$ run of default inferencing pipeline 420, and obtain output artifacts 470 and 474 from respective ones of inferencing artifact data 471 and reporting artifact data 475. As described herein, output artifacts 470 may include the elements of vectorized predictive output 468, which include each row of vectorized inferencing dataframe 460 and the appended element of predictive output 464, and inferencing log data 466, and output artifacts 474 may include pipeline reporting data 472, and executed orchestration engine 144 may package the elements of vectorized predictive output 468, inferencing log data 466, and pipeline reporting data 472 into corresponding portions of a response 476 to customization request 416, which FI computing system 130 may transmit across network 120 to developer computing system 102, e.g., via the secure, programmatic channel of communications established between executed web browser 108 and executed programmatic web service 148.

Developer computing system 102 may, for example, receive response 476, which includes vectorized predictive output 468, inferencing log data 466, and pipeline reporting data 472, and executed web browser 108 may store the elements of response 476 within a portion of memory 104. In some instances, executed web browser may process portions of response 476, such as, but not limited to, portions of vectorized predictive output 468, inferencing log data 466, and pipeline reporting data 472, and generate corresponding interface elements 478, which executed web browser 108 may route to display device 110 of developer computing system 102. Display device 110 may, for example, present portions of interface elements 478 within one or more display screens of an additional digital interface 480, and developer 103 may review interface elements 478A characterizing the elements of vectorized predicted output 468, interface elements 478B characterizing the elements of interface log data 466, and interface elements 478C characterizing the elements of pipeline reporting data 472 within the one or more display screens of digital interface 480

As described herein, and for the particular use-case of interest to developer 103, the elements of predictive output 464 (e.g., as maintained within vectorized predictive output 468) may indicate a predicted likelihood of an occurrence, or a non-occurrence, of a targeted event involving corresponding ones of the subset of customers of the financial institution during a future, three-month temporal interface disposed between six and nine-months subsequent to a corresponding temporal prediction point (e.g., separated from the temporal prediction point by a six-month buffer interval). By way of example, for the current, November $1^{st}$ inferencing run of default inferencing pipeline 420, the elements of predictive output 464 may indicate the predicted likelihood of the occurrence, or the non-occurrence, of the targeted event involving the corresponding ones of the subset of customers between May 1, 2024, and Jul. 31, 2024, and the elements of predictive output 464 may inform, and support, one or more customer-facing or back-end decisioning operations involving the corresponding ones of the subset of customers.

To facilitate the customer-facing or back-end decisioning operations, a decisioning application 482 executed by processor(s) 106 of developer computing system 102 may access the vectorized predictive output 468 maintained within memory 104, and obtain the elements of predictive output 464 and identifiers of the corresponding ones of the subset of the customers (e.g., maintained within the rows of vectorized inferencing dataframe 460). For each of the subset of customers, the elements of predictive output 464 may include a numerical value indicative of the predicted likelihood of the occurrence of the targeted event during the future temporal interval (e.g., a value of unity) or the predicted likelihood of the non-occurrence of the targeted event during the future temporal interval (e.g., a value of zero), and based on an application of one or more decision rubrics associated with the particular user-case of interest to developer 103 to the customer-specific elements of predictive output 464, decisioning application 482 may generate customer-specific elements of decisioning data 484, which may inform the customer-facing or back-end decisioning operations involving corresponding ones of the customers.

Though a performance of one or more of the exemplary processes described herein, the one or more processors of FI computing system 130 may facilitate a customization of a plurality of sequentially executed, default application engines within default inferencing pipeline 420 to reflect a particular use-case of interest to developer 103 without requiring any modification to the elements of executable code of these default application engines, any modification to inferencing pipeline script 152 that, upon execution, establishes default inferencing pipeline 420, and any modifications to an execution flow of the default application engines within default training pipeline 302. Certain of these exemplary processes, which leverage engine-specific elements of configuration data formatted and structured in a human-readable data-serialization language (e.g., a YAML™ data-serialization language, etc.) and accessible, and modifiable, using a browser-based interface, may enable analysts, data scientists, developers, and other representatives of the financial institution characterized by various familiarities with machine-learning or artificial-intelligence processes, and various skill levels in coding and scripting, to incorporate machine-learning or artificial-intelligence processes into various, customer-facing or back-end decisioning operations, and to train adaptively, and deploy and monitor, machine-learning or artificial-intelligence processes through default pipelines customized to reflect these decisioning processes.

By way of example, and in support of the customer-facing or back-end decisioning operations, developer 103 may elect to train a forward-in-time, machine-learning or artificial-intelligence process, such as a trained gradient-boosted, decision-tree process (e.g., a trained XGBoost process), within established default training people 302 using any of the exemplary processes described herein. As described herein, the trained, forward-in-time, machine-learning or artificial-intelligence process may predict a likelihood of an occurrence, or a non-occurrence, of a targeted event involving a customer of the financial institution during a future temporal interval, such as a three-month interval, which may be separated from a temporal prediction point by a buffer interval, such as a six-month buffer interval. In some instances, and based on an application of the trained, forward-in-time, machine-learning or artificial-intelligence process to feature vectors characterizing corresponding customers of the financial institution within default inferencing pipeline 420 at the temporal prediction point of Nov. 1, 2023, the one or more processors of FI computing system may generate customer-specific elements of predictive output (the elements of predictive output 464 appended to corresponding row) that indicate the predicted likelihood of the occurrence, or the non-occurrence, of the target event involving each of the customers between May 1, 2024, and Jul. 31, 2024.

While the elements of predictive output 464 generated within default inferencing pipeline 420 may inform the customer-facing or back-end decisioning operations of interest to developer 103, the one or more processors of FI computing system 130 may be incapable of monitoring or assessing an accuracy of these forward-in-time predictions, as a corresponding target, ground-truth label for the predicted, future occurrence, or non-occurrence, of the target event may remain unknown upon initiation of default inferencing pipeline 420 (e.g., at the temporal prediction point of Nov. 1, 2023) and would be defined upon expiration of the corresponding, future temporal interval (e.g., on or after Aug. 1, 2024). To facilitate a generation of target, ground-truth labels associated with forward-in-time predicted output generated during one, or more, prior runs of default inferencing pipeline 420, computing system 102 may perform operations, based on additional elements of input from developer 103, that trigger a sequential execution of a plurality of application engines within a default target-generation pipeline established by the one or more process of FI computing system 130 in accordance with executed target-generation pipeline script 154, and in accordance with engine-specific elements of configuration data, which may be updated, modified, or "customized" by computing to reflect the one, or more, prior runs of default inferencing pipeline 420 using any of the exemplary processes described herein. In some instances, the update, modification, or customization of the engine-specific elements of configuration data by developer computing system 102 may enable developer 103 to customize the sequential execution of the application engines within the default target-generation pipeline to reflect the one or more prior runs of default inferencing pipeline 420 (e.g., the prior run of default inferencing pipeline 420 on Nov. 1, 2023) without modification to the underlying code associated with the executed application engines or to target-generation pipeline script 154, and while maintaining compliance with the one or more process-validation operations or requirements and with the one or more governmental or regulatory requirements.

By way of example, developer 103 may provide input to developer computing system 102 (e.g., via input device 112), which causes executed web browser 108 to perform any of the exemplary processes described herein to request access to the one or more elements of configuration data associated with the application engines executed sequentially within the default target-generation pipeline (e.g., in accordance with target-generation pipeline script 154). As described herein, and upon execution by the one or more processors of FI computing system 130 (e.g., via executed orchestration engine 144), target-generation pipeline script 154 may establish the default target-generation pipeline based on a sequential execution of retrieval engine 156, preprocessing engine 158, target-generation engine 162 and reporting engine 172 in accordance with respective elements of retrieval configuration data 157, preprocessing configuration data 159, target-generation configuration data 163, and reporting configuration data 173. In some instances, executed web browser 108 may perform operations, described herein, that generate a corresponding access request identifying the default target-generation pipeline (e.g., via a unique, alphanumeric identifier of the default inferencing pipeline) and developer computing system 102 or executed web browser 108 (e.g., via the IP address of developer computing system 102, the MAC address of developer computing system 102, or the digital token or application cryptogram of executed web browser 108.

Executed web browser 108 may transmit the corresponding access request across network 120 to FI computing system 130, e.g., via the secure, programmatic channel of communications established between executed web browser 108 and executed programmatic web service 148. In some instances, customization API 206 of executed customization application 204 at FI computing system 130 may receive the corresponding access request, and based on an established permission of developer computing system 102 (and executed web browser 108) to access the elements of configuration data maintained within configuration data store 140, executed customization application 204 may obtain each of the elements of configuration data associated with the default target-generation pipeline, and package the obtained elements of configuration within a response to the corresponding access request, which FI computing system 130 may transmit across network 120 to developer computing system 102.

Figure 5A:
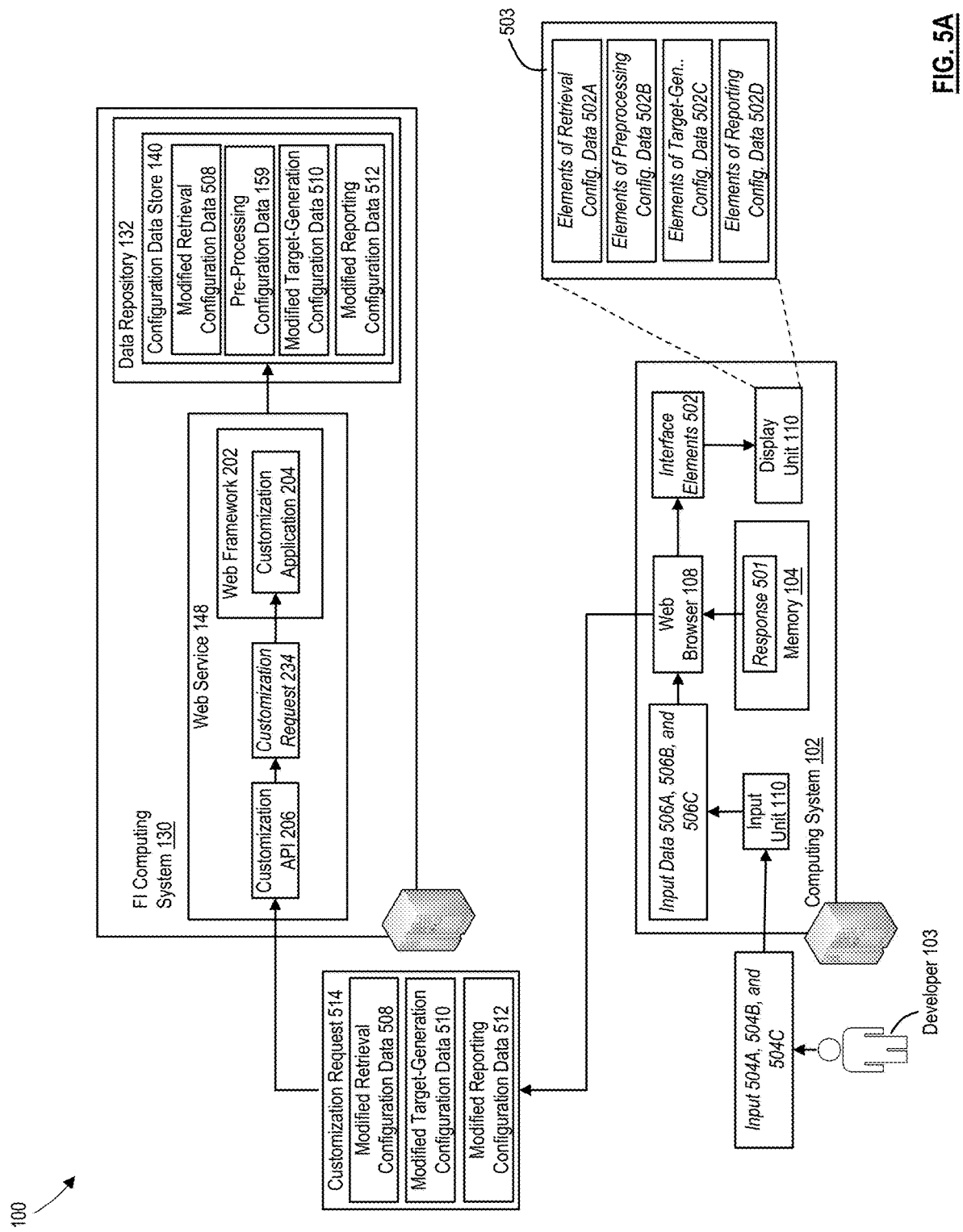

Referring to FIG. 5A, developer computing system 102 may receive the response to the corresponding access request, and executed web browser 108 may store the response, e.g., response 501, within a portion of memory 104. Executed web browser 108 may access response 501 within memory 104, and may obtain the requested elements of retrieval configuration data 157, preprocessing configuration data 159, target-generation configuration data 163, and reporting configuration data 173 from response 401, and executed web browser 108 may perform operations that process these requested elements of configuration data and generate corresponding interface elements 502, which executed web browser 108 may route to display device 110 of developer computing system 102. Display device 110 may, for example, receive interface elements 402, which provide a graphical representation of the requested elements of configuration data associated with the default target-generation pipeline, as described herein, and may renders all, or a selected portion, of interface elements 502 for presentation within one or more display screens of digital interface 503. For example, the one or more display screens of digital interface 503 may present interface elements 502A, which provide a graphical, and editable, representation of the requested elements of retrieval configuration data 157, interface elements 502B, which provide a graphical, and editable, representation of the requested elements of preprocessing configuration data 159, interface elements 502C, which provide a graphical, and editable, representation of the requested elements of target-generation configuration data 163, and interface elements 502D, which provide a graphical, and editable, representation of the requested elements of reporting configuration data 173.

To facilitate the modification and customization of the elements of retrieval configuration data 157 to facilitate the generation of the target, ground-truth labels for the predictive output generated during the prior, November $1^{st}$ run of default inferencing pipeline 420, developer 103 may review interface elements 502A of digital interface 503, and may provide, to input device 112, elements of developer input 504A that, among other things, specify, a unique identifier of each source data table that supports the generation of the target, ground-truth labels, a primary key or composite primary key of each of the source data tables, and a network address of an accessible data repository that maintains each of the source data tables, e.g., a file path or an IP address of source data store 134, etc. By way of example, and as described herein, the customer-specific elements of predictive output generated during the prior, November $1^{st}$ run of default inferencing pipeline 420 (e.g., the elements of predictive output 464) may indicate the predicted likelihood of the occurrence, or the non-occurrence, of the target event involving each of the corresponding customers between May 1, 2024, and Jul. 31, 2024 (e.g., during the three-month, future temporal interval disposed between six and nine months subsequent to the November $1^{st}$ temporal prediction point), and the source data table(s) identified by developer input 504A may include elements that characterize each of the customers during the three-month temporal interval. Input device 112 may, for example, may receive developer input 504A, and may route corresponding elements of input data 506A to executed web browser 108, which modify the elements of retrieval configuration data 157 to reflect input data 506A and that generate corresponding elements of modified retrieval configuration data 508.

Upon review of interface elements 502C of digital interface 503, developer 103 may elect to modify and customize one or more of the elements of target-generation configuration data 163 to reflect the target event associated with the prior, November $1^{st}$ inferencing run of default inferencing pipeline 420. For example, to customize the elements of target-generation configuration data 163, developer 103 may provide, to input device 112, elements of developer input 504B that, among other things, a duration of the future temporal interval and of the buffer temporal interval associated with the prior, November $1^{st}$ inferencing run (e.g., three months and six months, respectively). Further, the elements of developer input 504B provisioned to input device 112 may also specify logic that defines the target event associated with the prior, November $1^{st}$ inferencing run of default inferencing pipeline 420 and facilitates a detection of the target event when applied to elements of the preprocessed source data tables and in some instances, to one or more of the output artifacts associated with run identifier 426A and generated during the prior, November $1^{st}$ inferencing run. By way of example, the elements of developer input 504B may include such as, but not limited to, one or more helper scripts that, when executable in the namespace of target-generation engine 162 within the default target-generation pipeline, ingest the preprocessed source tables and/or the one or more output artifacts, and generate corresponding ones of the target, ground-truth labels in accordance with the specified logic. In some instances, input device 112 may receive developer input 504B, and may route corresponding elements of input data 506B to executed web browser 108, which may modify the elements of target-generation configuration data 163 to reflect input data 506B and that generate corresponding elements of modified target-generation configuration data 510.

The elements of reporting configuration data 173 may specify a default composition of the elements of reporting data and evaluation data generated by executed reporting engine 172 during the default target-generation pipeline and a default structure or format of the reporting and evaluation data, e.g., in PDF form, in DOCX form, in XML form, etc.). For example, the elements of evaluation data may characterize a predictive performance and accuracy of the trained machine-learning or artificial-intelligence process applied during the prior, November $1^{st}$ inferencing run of default inferencing pipeline 420, and may include, but is not limited to, values of precision, recall, and/or accuracy associated with the application of the trained machine-learning or artificial-intelligence process applied during the prior, November $1^{st}$ inferencing run. Further, the elements of reporting configuration data 173 may specify one or more default operations (e.g., as helper scripts executable within a namespace of executed reporting engine 172) that calculate the values of precision, recall, and/or based on a comparison of the elements of predicted output generated during the prior, November $1^{st}$ inferencing run of default inferencing pipeline 420 (e.g., the customer-specific elements of predictive output 464) and corresponding ones of the target, ground-truth labels generated by executed target-generation engine 162 within the default target-generation pipeline.

In some instances, upon review of interface elements 502D of digital interface 403, developer 103 may elect not to modify either the default composition of the reporting data for the default inferencing pipeline, or the default operations that facilitate the calculation of the precision, recall, and/or accuracy values within the evaluation data, but may provide, to input device 112, elements of developer input 504C that, among other things, specifying that reporting engine 172 generate the pipeline reporting data in DOCX format. Input device 112 may, for example, receive developer input 504C, and may route corresponding elements of input data 506D to executed web browser 108, which may perform operations that parse input data 506C, and that modify the elements of reporting configuration data 173 to reflect input data 506D and that generate corresponding elements of modified reporting configuration data 512.

Executed web browser 108 may perform operations that package the elements of modified retrieval configuration data 508, modified target-generation configuration data 510, and modified reporting configuration data 512 into portions of a customization request 514. In some instances, executed web browser 108 may also package, into an additional portion of customization request 416, an identifier of the default, target-generation pipeline and the one or more identifiers of developer computing system 102 or executed web browser 108. Executed web browser 108 may also perform operations that cause developer computing system 102 to transmit customization request 514 across communications network 120 to FI computing system 130.

As described herein, customization API 206 of executed customization application 204 may receive customization request 514, and perform any of the exemplary processes described herein to determine whether FI computing system 130 permits a source of customization request 514, e.g., developer computing system 102 or executed web browser 108, to modify or customize the elements of configuration data maintained within configuration data store 140. If, for example customization API 206 were to establish that FI computing system 130 fails to grant developer computing system 102, or executed web browser 108, permission to modify or customize the elements of configuration data maintained within configuration data store 140, customization API 206 may discard customization request 514 and FI computing system 130 may transmit a corresponding error message to developer computing system 102. Alternatively, if customization API 206 were to establish that FI computing system 130 grants developer computing system 102 and/or executed web browser 108, permission to modify or customize the elements of configuration data maintained within configuration data store 140, customization API 206 may route customization request 514 to executed customization application 204.

Executed customization application 204 may obtain the identifier of the default target-generation pipeline and the elements of modified retrieval configuration data 508, modified target-generation configuration data 510, and modified reporting configuration data 512 from customization request 514. Based on the identifier, executed customization application 204 may access the elements of engine-specific configuration data associated with the default target-generation pipeline and maintained within configuration data store 140, and perform operations that replace, or modify, the elements of retrieval configuration data 157, target-generation configuration data 163, and reporting configuration data 173 based on corresponding ones of the elements of modified retrieval configuration data 508, modified target-generation configuration data 510, and modified reporting configuration data 512.

Figure 5B:
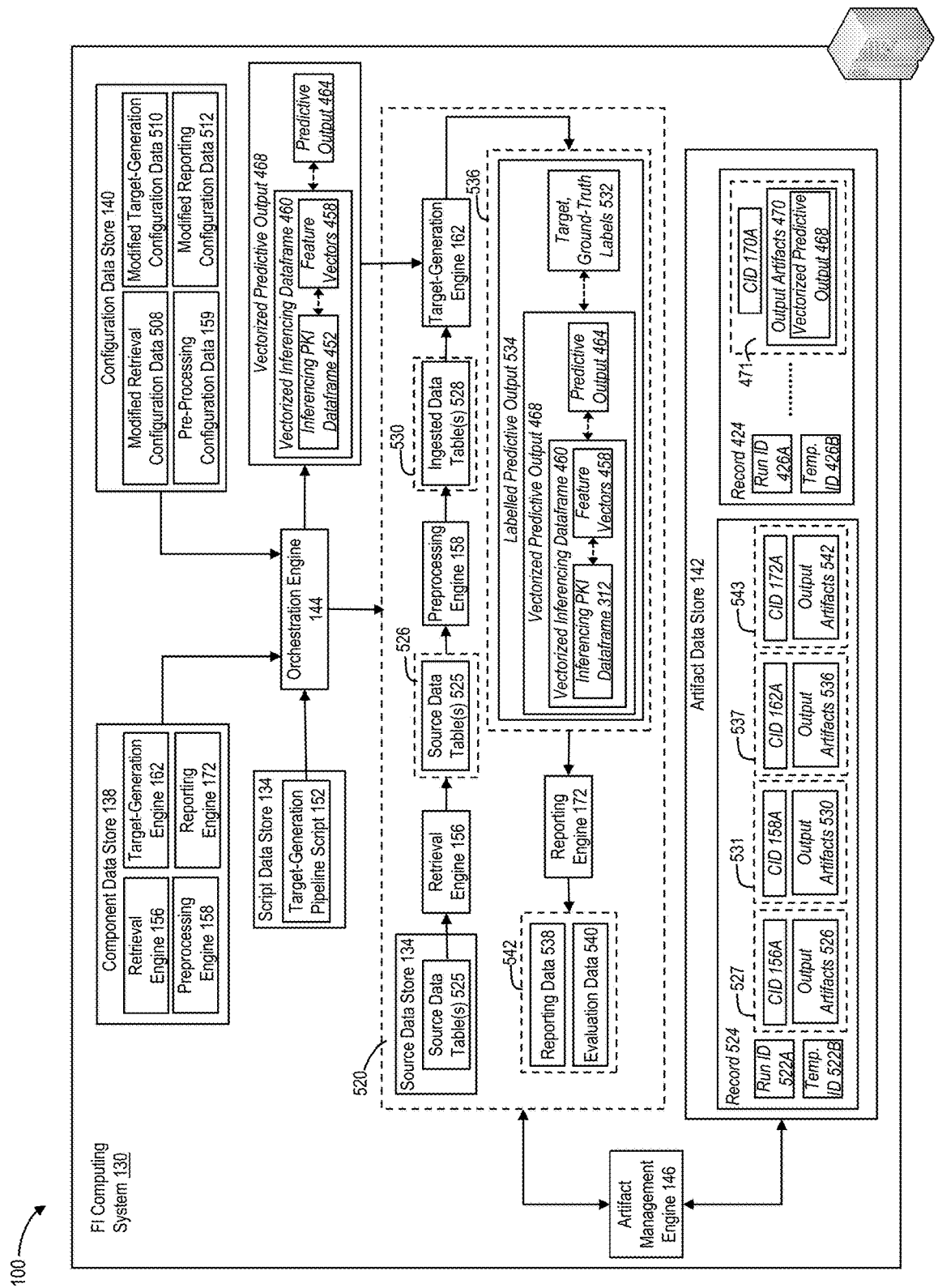

Referring to FIG. 5B, the one or more processors of FI computing system 130 may execute orchestration engine 144, which may access script data store 136 and obtain target-generation pipeline script 154. Executed orchestration engine 144 may trigger an execution of target-generation pipeline script 154 by the one or more processors of FI computing system 130, which may establish the default target-generation pipeline, e.g., default target-generation pipeline 520. In some instances, upon execution of target-generation pipeline script 154, executed orchestration engine 144 may generate a unique, alphanumeric identifier, e.g., run identifier 522A, for a current run of default target-generation pipeline 520 in accordance with the corresponding elements of engine-specific configuration data (e.g., which developer 103 may customize in accordance with the particular use-case of interest using any of the exemplary processes described herein), and executed orchestration engine 144 may provision run identifier 522A to artifact management engine 146 via artifact API. Executed artifact management engine 146 may perform operations that, based on run identifier 522A, associate data record 524 of artifact data store 142 with the current run of default target-generation pipeline 520, and that store run identifier 522A within data record 524 along with a corresponding temporal identifier 522B indicative of date at which executed orchestration engine 144 executed target-generation pipeline script 154 and established default target-generation pipeline 520 (e.g., Aug. 1, 2024).

As described herein, upon execution by the one or more processors of FI computing system 130, each of retrieval engine 156, preprocessing engine 158, target-generation engine 162, and reporting engine 172 may ingest one or more input artifacts and corresponding elements of configuration data specified within executed target-generation pipeline script 154, and may generate one or more output artifacts. In some instances, executed artifact management engine 146 may obtain the output artifacts generated by corresponding ones of retrieval engine 156, preprocessing engine 158, target-generation engine 162, and reporting engine 172, and store the obtained output artifacts within a corresponding portion of data record 524, e.g., in conjunction within a unique component identifier of the corresponding one of executed retrieval engine 156, preprocessing engine 158, target-generation engine 162, and reporting engine 172.

In some instances, executed artifact management engine 146 may also maintain, in conjunction with the component identifier and corresponding output artifacts within data record 524, data characterizing input artifacts ingested by one, or more, of executed retrieval engine 156, preprocessing engine 158, target-generation engine 162, and reporting engine 172. In some instances, the inclusion of the data characterizing the input artifacts ingested by a corresponding one of these executed application engines within default target-generation pipeline 520, and the association of the data characterizing the ingested input artifacts with the corresponding component identifier and run identifier 522A, may establish an artifact lineage that facilitates an audit of a provenance of an artifact ingested by the corresponding one of the executed application engines during the current implementation or run of default target-generation pipeline 520 (e.g., associated with run identifier 522A), and recursive tracking of the generation or ingestion of that artifact across the current implementation or run of default target-generation pipeline 520 (e.g., associated with run identifier 426A) and one or more prior runs of default target-generation pipeline 520 (or of the default training and inferencing pipelines described herein).

Further, and in addition to data record 524 characterizing the current run, of default target-generation pipeline 520, executed artifact management engine 146 may also maintain, within artifact data store 142, data records characterizing prior runs of default target-generation pipeline 520, default inferencing pipeline 420, and/or default training pipeline 302. For example, as illustrated in FIG. 5B. artifact data store 142 may also include data record 424, which characterize the output artifacts generated by (and in some instances, the input artifacts ingested by), each of the application engines executed sequentially by the one or more processors of FI computing system 130 during the prior, November $1^{st}$ inferencing run of default inferencing pipeline 420. As described herein, data record 424 may include run identifier 426A of the prior, November $1^{st}$ inferencing run of default inferencing pipeline 420, temporal identifier 426B that identifies the Nov. 1, 2023, initiation of the prior inferencing run, and elements of engine-specific artifact data that include the output artifacts generated by corresponding ones of the sequentially application engines and that associate each of the engine-specific output artifacts with a corresponding component identifier.

By way of example, record 424 may include, among other things, inferencing artifact data 471 that associates component identifier 170A of executed inferencing engine 170 with one or more output artifacts 470 generated by executed inferencing engine 170 within the prior, November $1^{st}$ inferencing run of default inferencing pipeline 420. Output artifacts 470 may include elements of vectorized predictive output 468 that include each row of vectorized inferencing dataframe 460 and the appended element of predictive output 464, and as described herein, each row of vectorized inferencing dataframe 460 may also associate a corresponding row of inferencing PKI dataframe 452 with an appended one of feature vectors 458. Further, and as described herein, each of the discrete rows of inferencing PKI dataframe 452 may be associated with a corresponding customer of the financial institution, and may reference the Nov. 1, 2023, temporal prediction for the prior, November $1^{st}$ run of default inferencing pipeline 420.

In some instances, the elements of engine-specific artifact data associated with the prior, November $1^{st}$ inferencing run of default inferencing pipeline 420, and maintained within data record 424 of artifact data store 142, may represent input artifacts for executed target-generation pipeline script 154 (and for default target-generation pipeline 520), and may be ingested by one or more of the executed application engines within default target-generation pipeline 520. By way of example, executed target-generation engine 162 within default target-generation pipeline 520 may ingest the elements of vectorized predictive output 468 and perform operations, consistent with the elements of modified target-generation configuration data 510, that generate a target, ground-truth label for each of the rows of vectorized predictive output 468.

Referring back to FIG. 5B, executed target-generation pipeline script 154 may trigger an execution of retrieval engine 156 by the one or more one or more processors of FI computing system 130, and orchestration engine 144 may provision one or more the elements of modified retrieval configuration data 508 to the programmatic interface associated with executed retrieval engine 156 (e.g., as input artifacts). As described herein, the programmatic interface of executed retrieval engine 156 may establish a consistency of the input artifacts with the engine- and pipeline-specific operational constraints imposed on executed retrieval engine 156. Based on an established consistency of the input artifacts with the imposed engine- and pipeline-specific operational constraints, executed retrieval engine 156 may perform operations, described herein, that access source data store 134, and obtain one or more of source data table(s) 525 that facilitate the generation of the target-ground-truth labels, based on the elements of modified target-generation configuration data 510.

In some instances, executed retrieval engine 156 may provision source data table(s) 525 to executed artifact management engine 146, e.g., as output artifacts 526 of executed retrieval engine 156. Executed artifact management engine 146 may receive each of output artifacts 526 via the artifact API, and may perform operations that package each of output artifacts 526 into a corresponding portion of retrieval artifact data 527, along with identifier 156A of executed retrieval engine 156, and that store retrieval artifact data 527 within a corresponding portion of artifact data store 142, e.g., within data record 524 associated with default target-generation pipeline 520 and run identifier 522A. Further, although not illustrated in FIG. 5B, executed artifact management engine 146 may also package, into a corresponding portion of retrieval artifact data 445, additional data identifying and characterizing one or more of the input artifacts ingested by executed retrieval engine 156, such as, but not limited to, the elements of modified retrieval configuration data 222.

Further, and in accordance with default target-generation pipeline 520, executed retrieval engine 156 may provide output artifacts 526, including source data table(s) 525, as inputs to preprocessing engine 158 executed by the one or more processors of FI computing system 130, and executed orchestration engine 144 may provision one or more elements of preprocessing configuration data 159 maintained within configuration data store 140 to executed preprocessing engine 158. In some instances, the programmatic interface associated with executed preprocessing engine 158 may ingest each of source data table(s) 525 and the elements of preprocessing configuration data 159 (e.g., as input artifacts), and may perform operations that establish a consistency between each of these input artifacts and the engine- and pipeline-specific operational constraints imposed on executed preprocessing engine 158.

Based on an established consistency of the input artifacts with the imposed engine- and pipeline-specific operational constraints, executed preprocessing engine 158 may perform operations that apply each of the default preprocessing operations applicable to corresponding ones of source data table(s) 525 in accordance with the elements of preprocessing configuration data 159 (e.g., through an execution or invocation of each of the specified default scripts or classes within the namespace of executed preprocessing engine 158, etc.). Further, and based on the application of each of the default preprocessing operations to source data table(s) 525, executed preprocessing engine 158 may also generate one or more ingested data table(s) 528 having structures or formats consistent with the default structures or formats specified within the elements of preprocessing configuration data 159.

In some instances, executed preprocessing engine 158 may perform operations that provision ingested data table(s) 528 to executed artifact management engine 146, e.g., as output artifacts 530 of executed preprocessing engine 158. Executed artifact management engine 146 may receive each of output artifacts 530 via the artifact API, and may perform operations that package each of output artifacts 530 into a corresponding portion of preprocessing artifact data 531, along with identifier 158A of executed preprocessing engine 158, and that store preprocessing artifact data 531 within a corresponding portion of artifact data store 142, e.g., within data record 524 associated with default target-generation pipeline 520 and run identifier 522A. Further, although not illustrated in FIG. 5B, executed artifact management engine 146 may also package, into a corresponding portion of preprocessing artifact data 531, additional data identifying and characterizing one or more of the input artifacts ingested by executed preprocessing engine 158, such as, but not limited to, the elements of preprocessing configuration data 159 and source data table(s) 525.

Further, and in accordance with default target-generation pipeline 520, executed preprocessing engine 158 may provide output artifacts 530, including ingested data table(s) 525, as inputs to target-generation engine 162 executed by the one or more processors of FI computing system 130, and executed orchestration engine 144 may provision one or more elements of modified target-generation configuration data 224 maintained within configuration data store 140 to executed target-generation engine 162. As described herein, the elements of modified target-generation configuration data 510 may include, among other things, run identifier 426A of the prior, November $1^{st}$ inferencing run of default inferencing pipeline 420, the data specifying a duration of the future temporal interval and of the buffer temporal interval associated with the prior, November $1^{st}$ inferencing run (e.g., three months and six months, respectively), and logic that defines the target event associated with the prior, November $1^{st}$ inferencing run of default inferencing pipeline 420 and facilitates a detection of the target event when applied to elements of the preprocessed source data tables and in some instances, to one or more of the output artifacts associated with run identifier 426A and generated during the prior, November $1^{st}$ inferencing run.

Executed orchestration engine 144 may obtain, from the elements of modified target-generation configuration data 510, run identifier 522A associated with the prior, November $1^{st}$ inferencing run of default inferencing pipeline 420. Further, and based on programmatic communications with executed artifact management engine 146, executed orchestration engine 144 may perform operations that, based on run identifier 522A, access data record 424 and obtain elements of vectorized predictive output 468 from the elements of inferencing artifact data 471 (e.g., (e.g., a portion of output artifacts 470 of executed inferencing engine 170).

As described herein, vectorized predictive output 468 may include the rows of vectorized inferencing dataframe 460 and the corresponding ones of the appended elements of predictive output 464. Further, each row of vectorized inferencing dataframe 460 may also associate a corresponding row of inferencing PKI dataframe 452 with an appended one of feature vectors 458, and each of the rows of inferencing PKI dataframe 452 may be associated with a corresponding customer of the financial institution (e.g., a corresponding customer identifier), and may reference the Nov. 1, 2023, temporal prediction point for the prior, November 1$^{st}$ run of default inferencing pipeline 420. Executed orchestration engine 144 may also provision the elements of vectorized predictive output 468 to executed target-generation engine 162 within default target-generation pipeline 520.

In some instances, the programmatic interface associated with executed target-generation engine 162 may receive each of ingested data table(s) 308, the elements of modified target-generation configuration data 510, and vectorized predictive output 468 (e.g., as input artifacts), and may perform operations that establish a consistency of each of these input artifacts with the engine- and pipeline-specific operational constraints imposed on executed target-generation engine 162.

Based on an established consistency of the input artifacts with the imposed engine- and pipeline-specific operational constraints, executed target-generation engine 162 may perform operations that, consistent with the elements of modified target-generation configuration data 510, generate a corresponding one of ground-truth labels 532 for each row of vectorized predictive output 468. By way of example, each row of vectorized predictive output 468 may associate a corresponding customer of the financial institution (e.g., via a unique, alphanumeric customer identifier, etc.) and a corresponding temporal prediction point (e.g., the November 1$^{st}$ initiation date of the prior inferencing run) with an appended one of feature vectors 548 and an appended element of predictive output 464, which indicates a predicted likelihood of an occurrence, or non-occurrence, of the target event involving the corresponding customer during a future, three-month interval between May 1, 2024, and Jul. 1, 2024.

In some instances, executed target-generation engine 162 may access a row of vectorized predictive output 468, and obtain the identifier of the corresponding customer and the corresponding temporal identifier (e.g., the temporal prediction point of Nov. 1, 2023). Based on the obtained identifier, executed target-generation engine 162 may perform operations that access portions of ingested data table(s) 528 associated with the corresponding customer, and that apply the logic maintained within the elements of modified target-generation configuration data 510 to the accessed portions of ingested data table(s) 528. Based on the application of the logic to the accessed portions of ingested data table(s) 308, executed target-generation engine 162 may determine the occurrence, or non-occurrence, of the target event during the three-month, future temporal interval between May 1, 2024, and Jul. 1, 2024 (e.g., disposed subsequent to the temporal prediction point and separated from the temporal prediction point by the six-month buffer interval), and may generate, for the accessed row of vectorized predictive output 468, a corresponding one of target, ground-truth labels 532 indicative of a determined occurrence of the target event during the future temporal interval (e.g., a "positive" target associated with a ground-truth label of unity) or alternatively, a determined non-occurrence of the corresponding target event during the specified future temporal interval (e.g., a "negative" target associated with a ground-truth label of zero).

Executed target-generation engine 162 may perform these exemplary processes to generate a corresponding one of target, ground-truth labels 532 for the customer identifier and temporal prediction point maintained within each additional, or alternate, row of vectorized predictive output 468. Further, executed target-generation engine 162 may also append each of target, ground-truth labels 532 to the corresponding row of vectorized predictive output 468, and generate labelled predictive output 534 that includes each row of vectorized predictive output 468 and the appended one of target, ground-truth labels 532. In some instances, executed target-generation engine 162 may perform operations that provision labelled predictive output 534, which includes the rows of vectorized predictive output 468 and the appended ones of target, ground-truth labels 532, to executed artifact management engine 146, e.g., as output artifacts 536 of executed target-generation engine 162.

In some instances, executed artifact management engine 146 may receive each of output artifacts 536 via the artifact API, and may perform operations that package each of output artifacts 536 into a corresponding portion of target-generation artifact data 537, along with a unique, alphanumeric identifier 162A of executed target-generation engine 162, and that store target-generation artifact data 537 within a corresponding portion of artifact data store 142, e.g., within data record 524 associated with default target-generation pipeline 520 and run identifier 522A. Further, although not illustrated in FIG. 3A, executed artifact management engine 146 may also package, into a corresponding portion of target-generation artifact data 321, additional data identifying and characterizing one or more of the input artifacts ingested by executed target-generation engine 162, such as, but not limited to, run identifier 426A, vectorized predictive output data 468, ingested data table(s) 525, and the elements of modified target-generation configuration data 510.

Further, and in accordance with default target-generation pipeline 520, executed target-generation engine 162 may provide output artifacts 536, including labelled predictive output 534 (e.g., the rows of vectorized predictive output 468, which include corresponding rows vectorized inferencing dataframe 460 and the appended elements of predictive output 464, and the appended ones of target, ground-truth labels 532) as inputs to reporting engine 172 executed by the one or more processors of FI computing system 130. Further, and based on programmatic communications with executed artifact management engine 146, executed orchestration engine 144 may perform operations that, based on run identifier 522A, output artifacts generated by respective ones of retrieval engine 156 and preprocessing engine 158 within the current run of default target-generation pipeline 520, such as, but not limited to, output artifacts 526 and 530 maintained within data record 524 of artifact data store 142. Executed orchestration engine 144 may also provision each of the obtained output artifacts, and the elements of modified reporting configuration data 512 maintained configuration data store 140, to executed reporting engine 172.

In some instances, the programmatic interface associated with executed reporting engine 172 may receive each of output artifact 536 (including labelled predictive output 534), output artifacts 526 and 530, and the elements of modified reporting configuration data 512 (e.g., as input artifacts), and may perform operations that establish a consistency of each of these input artifacts with the engine- and pipeline-specific operational constraints imposed on executed reporting engine 172. Based on an established consistency of the input artifacts with the imposed engine- and pipeline-specific operational constraints, executed reporting engine 172 may perform operations that generate one or more elements of reporting data 538 that characterize an operation and a performance of the discrete, modular components executed by the one or more processors of FI computing system 130 within default target-generation pipeline 520, and elements of evaluation data 540 that characterize the predictive performance and accuracy of the machine-learning or artificial-intelligence process during the prior, November $1^{st}$ inferencing run of default inferencing pipeline 420. As described herein, the elements of modified reporting configuration data 512 may specify a default composition of reporting data 538 and evaluation data 540, and a customized format of reporting data 538 and evaluation data 540, e.g., DOCX format.

The elements of evaluation data 540 may characterize a predictive performance and accuracy of the trained machine-learning or artificial-intelligence process applied during the prior, November $1^{st}$ inferencing run of default inferencing pipeline 420, and may include, but are not limited to, values of precision, recall, and accuracy associated with the application of the trained machine-learning or artificial-intelligence process applied during the prior, November $1^{st}$ inferencing run. Further, the elements of modified reporting configuration data 512 may also specify one or more default operations (e.g., as helper scripts executable within a namespace of executed reporting engine 172) that calculate the values of precision, recall, and/or accuracy based on a comparison of the elements of predicted output generated during the prior, November $1^{st}$ inferencing run of default inferencing pipeline 420 (e.g., the customer-specific elements of predictive output 464) and corresponding ones of target, ground-truth labels 532.

By way of example, and based on corresponding ones of output artifacts 526, 530, and 536 (including labelled predictive output 534), executed reporting engine 172 may perform operations that establish a successful, or failed, execution of corresponding ones of executed retrieval engine 156, preprocessing engine 158, and target-generation engine 162 within the current run of default target-generation pipeline 520, e.g., by confirming that each of the output artifacts is consistent, or inconsistent, with corresponding ones of the operational constraints imposed and enforced by corresponding ones of executed retrieval engine 156, preprocessing engine 158, and target-generation engine 162. In some instances, executed reporting engine 172 may generate one or more elements of reporting data 538 indicative of the successful execution of the application engines within default target-generation pipeline 520 (and a successful execution of default target-generation pipeline 520) or alternatively, an established failure in an execution of one, or more, of the application engines within default target-generation pipeline 520 (e.g., and a corresponding failure of default target-generation pipeline 520).

Further, and based on corresponding pairs of the elements of predictive output 464 and the appended ones of target, ground-truth labels 532 (e.g., as maintained within labelled predictive output 534), executed reporting engine 172 may perform one or more of the operations specified within the elements of modified reporting configuration data 512 (e.g., via an execution of the corresponding helper scripts, etc.) and calculate the values of precision, recall, and/or accuracy that characterize the trained machine-learning or artificial-intelligence process within the prior, November $1^{st}$ inferencing run of default inferencing pipeline 420. By way of example, based on comparison between the corresponding pairs of the elements of predictive output 464 and the appended ones of target, ground-truth labels 532, executed reporting engine 172 may compute a number of the elements of predictive output 464 that represent true-positive results, true-negative results, false-positive results, and false-positive results.

Executed reporting engine 172 may determine a value characterizing the precision of the trained machine-learning or artificial-intelligence process within the prior, November $1^{st}$ inferencing run as a quotient of the number of true-positive results and a sum of the numbers of true-positive and false-positive results, and may determine a value characterizing the recall of the trained machine-learning or artificial-intelligence process within the prior, November $1^{st}$ inferencing run as a quotient of the number of true-positive results and a sum of the numbers of true-positive and false-negative results. Further, executed reporting engine 172 may determine a value of an accuracy of the trained machine-learning or artificial-intelligence process within the prior, November $1^{st}$ inferencing run as a quotient of (i) a sum of the numbers of true-positive and true-negative results and (ii) an additional sum of the numbers of true-positive, true-negative, false-negative, and false positive results. In some instances, executed reporting engine 172 may package the determined values of precision, recall, and/or accuracy into corresponding portions of evaluation data 540. Further, executed reporting engine 172 may also perform one or more of the operations specified within the elements of modified reporting configuration data 512 (e.g., via an execution of the corresponding helper scripts, etc.) to determine the values of the one or more composite metrics described herein, and may package the determined values of the one or composite metrics into additional portions of evaluation data 540.

In some instances, executed reporting engine 172 may structure the elements reporting data 538 and evaluation data 540 in accordance with the elements of modified reporting configuration data 512, such as, but not limited to, DOCX format, and executed reporting engine 172 may provide the elements reporting data 538 and evaluation data 540 to executed artifact management engine 146, e.g., as output artifacts 542 of executed reporting engine 172 within default target-generation pipeline 520. In some instances, executed artifact management engine 146 may receive each of output artifacts 542, and may perform operations that package each of output artifacts 542 into a corresponding portion of reporting artifact data 543, along with identifier 172A of executed reporting engine 172, and that store reporting artifact data 543 within a corresponding portion of artifact data store 142, e.g., within data record 524 associated with default target-generation pipeline 520 and run identifier 522. Further, although not illustrated in FIG. 5B, executed artifact management engine 146 may also package, into a corresponding portion of reporting artifact data 543, additional data identifying and characterizing one or more of the input artifacts ingested by executed reporting engine 172 within default target-generation pipeline 520. As described herein, the inclusion of the data characterizing the input artifacts ingested by executed reporting engine 172 within default target-generation pipeline 520, and the association of run identifier 522A and component identifier 172A with the ingested input artifacts may establish an artifact lineage facilitating recursive artifact auditing and tracking using any of the exemplary processes described herein.

Figure 5C:
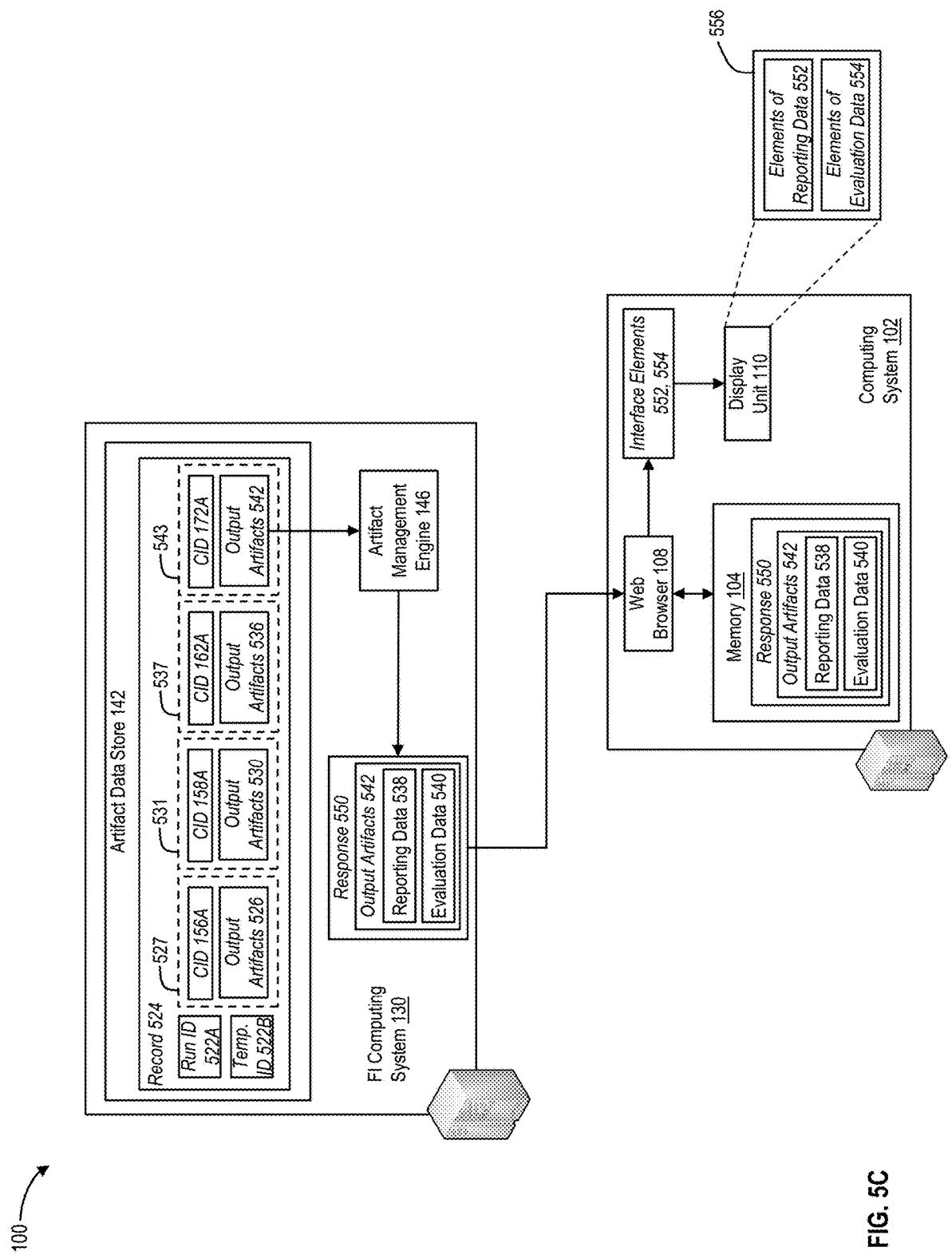

Referring to FIG. 5C, executed orchestration engine 144 may also perform operations that, upon completion of the current run of default target-generation pipeline 520, package output artifacts 542, including the elements of reporting data 538 and the elements of evaluation data 540, into portions of a response 550 to customization request 514, and the one or more processors of FI computing system 130 to transmit response 550 across network 120 to computing system 130. In some instances, the one or more processors of FI computing system 130 may generate and transmit response 550 to computing system 130 in accordance with a predetermined schedule (e.g., upon completion of the current run of default target-generation pipeline 520 on Aug. 1, 2024, in batch mode with other output artifacts generated during additional runs of default target-generation pipeline 520 on a daily or weekly basis, etc.) or in response to request generated programmatically by developer computing system 102 and provisioned to the one or more processors of FI computing system 130.

By way of example, the one or more processors of FI computing system 130 may transmit response 550 (including the elements of reporting data 538 and evaluation data 540) across network 120 via the secure programmatic channel of communications established between programmatic web service 148 executed by the one or more processors of FI communications and web browser 108 executed by processor(s) 106 of computing system 130. In some instances, executed web browser 108 may interact programmatically with executed programmatic web service 148, and access, process, and interact with the elements of reporting data 538 and evaluation data 540, via a web-based interactive computational environment, such as a Juypter™ notebook or a Databricks™ notebook.

In some instances, computing system 102 may receive response 550, which includes the elements of reporting data 538 and evaluation data 540 generated during the current run of target-generation pipeline 520, and executed web browser 108 may store response 550 within one or more tangible, non-transitory memories of computing system 102, such with memory 104. Further, executed web browser 108 may also perform operations that generate one or more additional interface elements 552 representative of the elements of reporting data 538 and one or more additional interface elements 554 representative of the elements of evaluation data 540, and that provision additional interface elements 552 and 554 to display device 110 for presentation with one or more additional displays screens of an additional digital interface 556, e.g., a digital interface associated with the web-based interactive computational environment described herein. For example, and based on portions of presented, additional interface elements 552 that characterize the elements of reporting data 538, developer 103 may confirm that the one or more processors of FI computing system 130 successfully executed each of retrieval engine 156, preprocessing engine 158, target-generation engine 162, and reporting engine 172 within default target-generation pipeline 520, e.g., without any failure in the sequential execution of the application engines or any pipeline failure of default target-generation pipeline 520.

Further, and based on further portions of additional interface elements 554 that characterize the elements of evaluation data 540, developer 103 may access the determined precision value, recall value, and/or accuracy value that characterize the application of the trained machine-learning or artificial-intelligence process during the prior inferencing run of default inferencing pipeline 420 on Nov. 1, 2023. For example, and based on a determination that at least one of determined precision value, recall value, and/or accuracy value associated with the prior, November $1^{st}$ inferencing run of default inferencing pipeline 420 fails to exceed a predetermined threshold value, developer computing system 102 may perform any of the exemplary processes described herein to request, and receive access to, one or more elements of configuration data associated with the application engines executed sequentially within default inferencing pipeline 420.

Based on input provisioned by developer 103, computing system 130 may perform any of the exemplary processes described herein to update, modify, or customize further a value of one or more of the process parameters associated with the trained machine-learning or artificial-intelligence process, and to provision additional elements of modified inferencing configuration data (which includes the updated, modified, or customized process parameter values) to FI computing system 130, e.g., via the established, secure programmatic channel of communications described herein. In some instances, upon approval of the additional elements of modified inferencing configuration data (e.g., by executed customization application 204), executed orchestration engine 144 may perform operations that execute inferencing pipeline script 152 and initiate an additional run of default inferencing pipeline 420 based on, among other things, the additional elements of modified inferencing configuration data, which includes the updated, modified, or customized process parameter values specified by developer 103 in response to the determined precision, recall, and/or accuracy values.

In other examples, based on the determination that at least one of determined precision, recall, and/or accuracy value associated with the prior, November $1^{st}$ inferencing run of default inferencing pipeline 420 fails to exceed the predetermined threshold value, or that an average value of the precision, recall, and/or accuracy value that characterize the application of the trained machine-learning or artificial-intelligence process during a plurality of prior inferencing runs of default inferencing pipeline 420 over one or more temporal intervals (e.g., based on additional elements of evaluation data generated through further runs of default target-generation pipeline 520 and maintained within memory 104, etc.), computing system 102 may perform any of these processes described herein to request, and receive access to, one or more elements of configuration data associated with the application engines executed sequentially within default training pipeline 302. Based on input provisioned by developer 103, or based on an output of additional application program 398 executed by processor(s) 106, computing system 130 may perform any update, modify, or customize further the one or more elements of configuration data, such as, but not limited to, modifying the composition of the source data tables specified within the elements of retrieval configuration data 157, a composition of the feature values within the elements of feature-generation configuration data 167, or of the initial values of the process parameters within the elements of training configuration data 169.

Developer computing system 102 may also perform operations that provision the additional elements of modified configuration data associated with the application engines executed sequentially within default training pipeline 302 to FI computing system 130, e.g., via the established, secure programmatic channel of communications described herein. In some instances, upon approval of the additional elements of modified inferencing configuration data (e.g., by executed customization application 204), executed orchestration engine 144 may perform operations that execute training pipeline script 150 and initiate an additional run of default training pipeline 302 based on, among other things, the additional elements of elements of modified configuration generated in response to the determined precision, recall, and/or accuracy values.

Through a performance of one or more of the exemplary processes described herein, the one or more processors of FI computing system 130 may enable developer computing system 102, via executed web browser 108, to access to one or more of the elements of configuration data associated with corresponding ones of the default, standardized application engines executed sequentially within default target-generation pipeline 520 (e.g., as maintained within configuration data store 140), and to and to update, modify, or "customize" the one or more of the accessed elements of configuration data to reflect one or more data preprocessing, indexing and splitting, target-generation, feature-engineering, training, inferencing, and/or post-processing preferences associated with a particular use-case of interest to developer 103. The modification of the accessed elements of configuration data by developer computing system 102 may enable developer computing system 102 to customize the sequential execution of default, standardized application engines within default target-generation pipeline 520 to reflect the particular use-case without modification to the underlying code of the application engines or to corresponding ones of the pipeline-specific scripts executed by the distributed computing components of FI computing system 130, and while maintaining compliance with the one or more process-validation operations or requirements and with the one or more governmental or regulatory requirements.

In some instances, described herein, one or more of the default, standardized application engines executed sequentially within default training pipeline 302, default inferencing pipeline 420, or default target-generation pipeline 520 may be incompatible with, or inapplicable to, an additional use-case of interest to developer 103. By way of example, and as described herein, the execution flow of default training pipeline 302 may include a default, time-series splitting engine (e.g., splitting engine 164) that, upon execution by the one or more processors of FI computing system 130 in accordance with executed training pipeline script 150, partitions initially an indexed dataframe, such as labelled PKI dataframe 318, into corresponding in-time and out-of-time partitioned dataframes based on a temporal splitting point, and that partitions further each of the in-time and out-of-time partitioned dataframes into corresponding in-sample and out-of-sample partitions based on corresponding in-sample and out-of-sample population sizes. The temporal splitting point, and the in-sample and out-of-sample populations, for the default, time-series splitting engine may be specified within the elements of splitting configuration data, and may be modified, updated, or customized to reflect a preference of developer 103 using any of the exemplary processes described herein.

While the sequential execution of the default, time-series splitting engine within default training pipeline 302, and the configurable temporal splitting point and the configurable in-sample and out-of-sample populations, may be applicable and relevant to many potential use-cases across the financial intuition, the additional use-case of interest to developer 103 may, for example, be associated with one or more source data tables (e.g., maintained within source data store 134 of data repository 132) having a composition or statistical characteristics incompatible with the population-size-based partitioning associated with the default, time-series splitting engine within default training pipeline 302. In view of the incompatibility between the source data tables associated with the additional use-case and the default, time-series splitting engine, certain of the exemplary processes described herein, when implemented by developer computing system 102 and the one or more processes of FI computing system 130, may facilitate a replacement of the sequentially executed default, time-series splitting engine within default training pipeline 302 by a customized splitting engine that, upon execution by the one or more processors of FI computing system 130, performs splitting operations that are compatible with the composition or statistical characteristics of the source data tables associated with the additional use-case in accordance with corresponding elements of customized configuration data. The executed customized splitting engine may ingest input artifacts, and generate output artifacts, that are consistent with the corresponding input and output artifacts ingested and generated, respectively, by the default, time-series splitting engine executed sequentially with default training pipeline 302 (e.g., by executed splitting engine 164), and in some examples, described herein, the one or more processors of FI computing system 130 may execute sequentially the customized splitting engine within default training pipeline 302 (e.g., in place of the default, time-series splitting engine) without modification to an execution flow of default training pipeline 302, and while maintaining compliance with the one or more process-validation operations or requirements and with the one or more governmental or regulatory requirements.

Figure 6A:
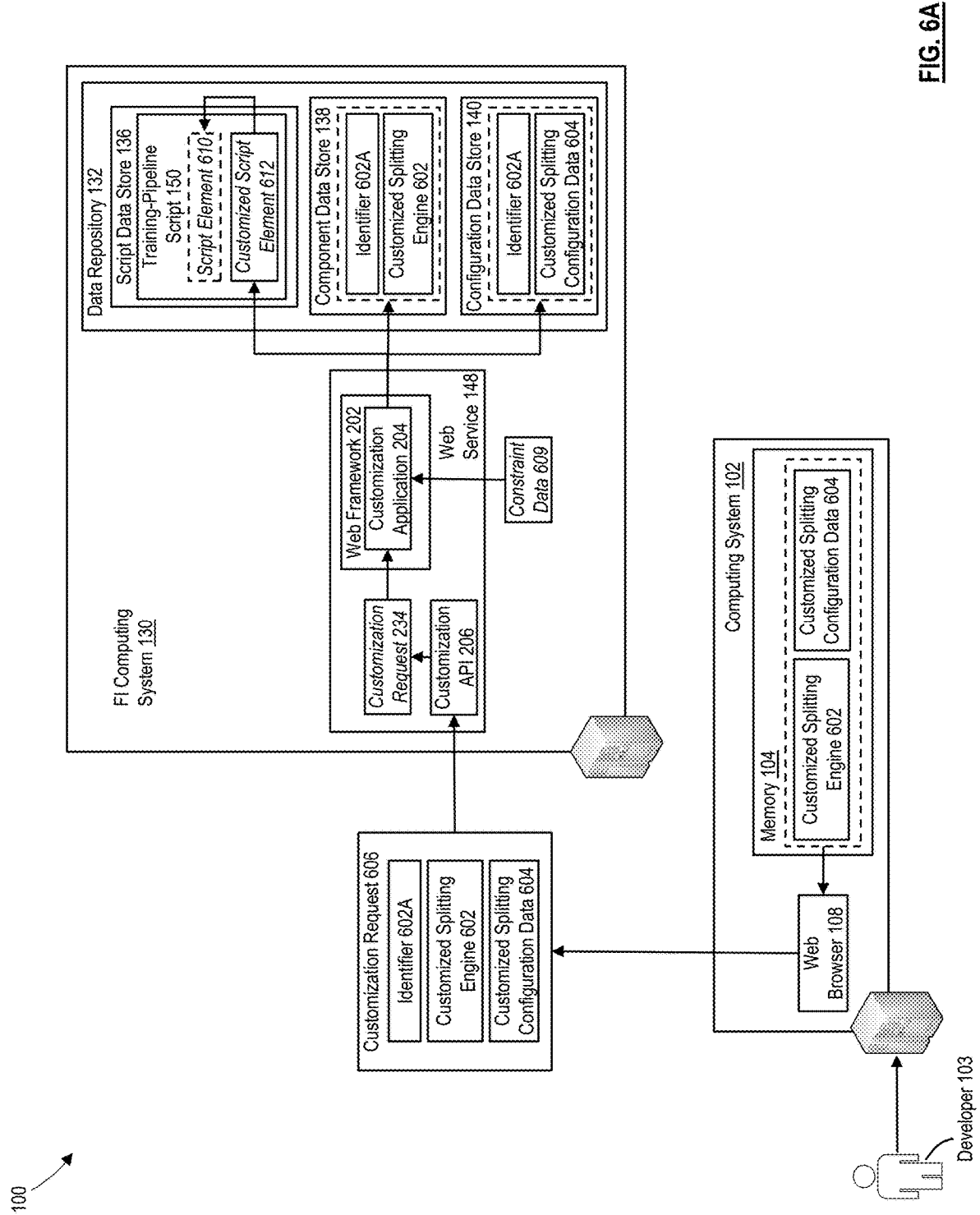

Referring to FIG. 6A, and in view of the incompatibility between the source data tables associated with the additional use-case and default, time-series splitting engine 164 within default training pipeline 302, computing system 102 may maintain, within memory 104, elements of executable code that establish a customized splitting engine 602, which upon execution, may implement one or more customized data-splitting operations that are consistent with the composition or statistical characteristics of the source data tables associated with the additional use-case of interest to developer 103. The one or more customized data-splitting operations may, for example, maintain the temporal partitioning of an ingested, labelled and indexed dataframe (e.g., labelled PKI dataframe 318 of FIG. 3A) into corresponding in-time and out-of-time partitioned dataframes in accordance with a developer-specified temporal splitting point, but may replace the population-sized-based sampling operations applied by the default, time-series splitting engine with a random or pseudo-random sampling operation that decompose each of the in-time and out-of-time partitioned dataframes into corresponding in-sample and out-of-sample partition (e.g., that maintain customer samples statistically representative of the population maintained within the labelled and indexed dataframe.

In some instances, computing system 102 may also maintain, within memory 104, elements of customized splitting configuration data 604 associated with customized splitting engine 602. The elements of customized splitting configuration data 604 may include, but are not limited to, data identifying, and characterizing a structure or format of, one or more input artifacts ingested by customized splitting engine 602 (e.g., a labelled, indexed dataframe), and data identifying, and characterizing a structure or format of, one or more output artifacts generated by customized splitting engine 602 (e.g., training, validation, and testing dataframes, and elements of data characterizing the temporal partitioning and random or pseudo-random sampling operations). Further, the elements of customized splitting configuration data 604 may specify each of the temporal partitioning operations and random or pseudo-random sampling operations applicable to the one or more input artifacts (e.g., in "helper" scripts callable in a namespace of executed customized splitting engine 602, etc.), and a value of one or more parameters associated with the temporal partitioning operations and random sampling operations, such as the temporal partitioning point and parameter values of the random or pseudo-random sampling operations.

Further, to facilitate the replacement of the default, time-series splitting engine of default training pipeline 302 with customized splitting engine 602, developer 103 may provide additional input to developer computing system 102 (e.g., via input device 112), which may cause executed web browser 108 to perform operations that package customized splitting engine 602 and the elements of customized splitting configuration data 604 into corresponding portions of a customization request 606, along with an identifier of default training pipeline 302 and a unique alphanumeric identifier of customized splitting engine 602, e.g., component identifier 602A. In some instances, executed web browser 108 may also package, into an additional portion of customization request 606, the one or more identifiers of developer computing system 102 or executed web browser 108, such as the exemplary identifiers described herein. Executed web browser 108 may also perform operations that cause developer computing system 102 to transmit customization request 606 across communications network 120 to FI computing system 130, e.g., via the secure, programmatic channel of communications established between executed web browser 108 and programmatic web service 148 executed by the one or more processors of FI computing system 130.

Customization API 206 of executed customization application 204 may receive customization request 606, and perform any of the exemplary processes described herein to determine whether FI computing system 130 permits a source of customization request 606, e.g., developer computing system 102 or executed web browser 108, to customize one or more of the application engines within the default execution flow of default training pipeline 302, e.g., as maintained within component data store 138. If, for example customization API 206 were to establish that FI computing system 130 fails to grant developer computing system 102, or executed web browser 108, permission to customize one or more of the application engines within the default execution flow of default training pipeline 302, customization API 206 may discard customization request 606 and FI computing system 130 may transmit a corresponding error message to developer computing system 102. Alternatively, if customization API 206 were to establish that FI computing system 130 grants developer computing system 102 and/or executed web browser 108, permission to customize one or more of the application engines within the default execution flow of default training pipeline 302, customization API 206 may route customization request 606 to executed customization application 204.

Executed customization application 204 may obtain, from customization request 606, the identifier of default training pipeline 302, customized splitting engine 602, component identifier 602A, and the elements of customized splitting configuration data 604, which reflect the data-splitting operations compatible with the elements of the source data tables of relevance to the additional use-case of relevance to developer 103. In some instances, executed customization application 204 may parse the identifier of default training pipeline 302 and the elements of customized splitting configuration data 604, and establish that customized splitting engine 602 corresponds to a splitting engine subject to sequential execution within the default execution flow of default training pipeline 302. Executed customization application 204 may also obtain one or more elements of constraint data 609, which identify and characterize the engine-specific and pipeline-specific constraints imposed on the splitting engine within default training pipeline 302.

The imposed constraints may include, among other things, one or more artifact constraints on a composition, and input, and a structure of the input artifacts ingested by a splitting engine executed sequentially within default training pipeline 302 and additionally, or alternatively, of the output artifacts generated by the sequentially executed splitting engine within default training pipeline 302. By way of example, the one or more artifact constraints may specify that any splitting engine executed sequentially within default training pipeline 302 ingest a labelled, indexed dataframe (e.g., having rows that maintain values of corresponding ones of the primary keys and corresponding, target ground-truth labels, such as labelled PKI dataframe 318) and generate output artifacts that include training, validation and testing partitions of the labelled, indexed dataframe (e.g., that maintain subsets of the rows of the labelled indexed dataframe) and structured or unstructured elements that include parameters of the partitioning operations.

In some instances, based on constraint data 609, executed customization application 204 may perform operations that apply each of the engine-specific and pipeline-specific constraints imposed on the splitting engine within default training pipeline 302 to, among other things, the elements of customized splitting configuration data 604. If, for example, executed customization application 204 were to determine an inconsistency between the elements of customized splitting configuration data 604 and at least one or more of the imposed constraints (including the artifact constraints described herein), executed customization application 204 may decline to replace the default, time-series splitting engine (e.g., splitting engine 164) within default training pipeline 302 with customized splitting engine 602. Executed customization application 204 may generate an error message indicating the detected inconsistency, and executed customization application 204 may cause FI computing system to transmit the generated error message across network 120 to developer computing system 102, e.g., via the established, secure programmatic channel of communications described herein.

Alternatively, if executed customization application 204 were to establish a consistency between each of the imposed constraints (including the artifact constraints described herein) and the elements of customized splitting configuration data 604, executed customization application 204 may approve customization request 606 and perform operations that replace the default, time-series splitting engine (e.g., splitting engine 164) within the default execution flow of default training pipeline 302 with customized splitting engine 602. For example, as illustrated in FIG. 6A, executed customization application may store customized splitting engine 602 and component identifier 602A within a portion of component data store 138, and may store the elements of customized splitting configuration data 604 and component identifier 602A within a portion of configuration data store 140.

Further, executed customization application 204 may access training pipeline script 150 within script data store 136, and identify, within training pipeline script 150, a corresponding script element 610 that calls or invokes default splitting engine 164 within the default execution flow of default training pipeline 302 (e.g., via a call to a programmatic interface of default splitting engine 164). As described herein, script element 610 may include or reference an identifier of the elements of configuration data associated with sequentially executed default splitting engine 164 (e.g., the elements of splitting configuration data 165, the elements of modified splitting configuration data 226, etc.), one or more input artifacts ingested by sequentially executed default splitting engine 164, and additionally, or alternatively, one or more output artifacts generated by sequentially executed default splitting engine 164. In some instances, executed customization application 204 may perform operations that generate a customized script element 612 (e.g., based on component identifier 602A and the elements of customized splitting configuration data 604, etc.) that calls or invokes customized splitting engine 602 within the default execution flow of default training pipeline 302 (e.g., via a call to a programmatic interface of customized splitting engine 602).

Customized script element 612 may, for example, include or reference an identifier of the elements of customized splitting configuration data 604 (e.g., as maintained within configuration data store 140), and one or more input artifacts ingested by sequentially executed customized splitting engine 602, and additionally, or alternatively, one or more output artifacts generated by sequentially executed customized splitting engine 602. As described herein, the input artifacts ingested by, and the output artifacts generated by, customized splitting engine 602 executed sequentially within the default execution flow of default training pipeline 302 may be consistent with the one or more imposed engine- and pipeline-specific operational constraints and further, with the input artifacts ingested by, and the output artifacts generated by, default splitting engine 164 upon sequential execution within default training pipeline 302. As illustrated in FIG. 6A, executed customization application 204 may replace script element 610 with customized script element 612 within training pipeline script 150, which executed customization application 204 may store within script data store 136.

The one or more processors of FI computing system 130 may execute orchestration engine 144, which may access script data store 136 and obtain training pipeline script 150 that specifies the order of sequential execution of each of the application engines within default training pipeline 302, including customized script element 612 that calls or invokes customized splitting engine 602 that implements the one or more temporal partitioning operations and random or pseudo-random sampling operations associated with the additional use-case of interest to developer 103 within default training pipeline 302. By way of example, executed orchestration engine 144 may trigger an execution of training pipeline script 150 (including customized script element 612) by the one or more processors of FI computing system 130. Consistent with executed training pipeline script 150, the one or more processors of FI computing system 130 may execute sequentially retrieval engine 156, preprocessing engine 158, indexing engine 160, and target-generation engine 162 within an additional implementation, or run, of default training pipeline 302.

As described herein, executed retrieval engine 156 may perform any of the exemplary processes described herein to obtain one or more source data tables from source data store 134 in accordance with the elements of modified retrieval configuration data 222, executed preprocessing engine 158 may perform any of the exemplary processes described herein, consistent with the elements of preprocessing configuration data 159, to ingest the one or more source data tables, and to generate one or more ingested data tables based on an application of one or more preprocessing operations to the one or more source data tables. Further, executed indexing engine 160 may perform any of the exemplary processes described herein, consistent with the elements of indexing configuration data 161, to select one or more columns from each of the each of the ingested data tables that are consistent with a corresponding primary key (or composite primary key) and to generate a PKI dataframe that includes the entries within each of the selected columns. In some instances, each of sequentially executed retrieval engine 156, preprocessing engine 158, and indexing engine 160, may generate corresponding output artifacts, and executed artifact management engine 146 may perform any of the exemplary processes described herein to store the generated, engine-specific output artifacts within one or more data records of artifact data store 142 in conjunction with corresponding component identifiers.

Figure 6B:
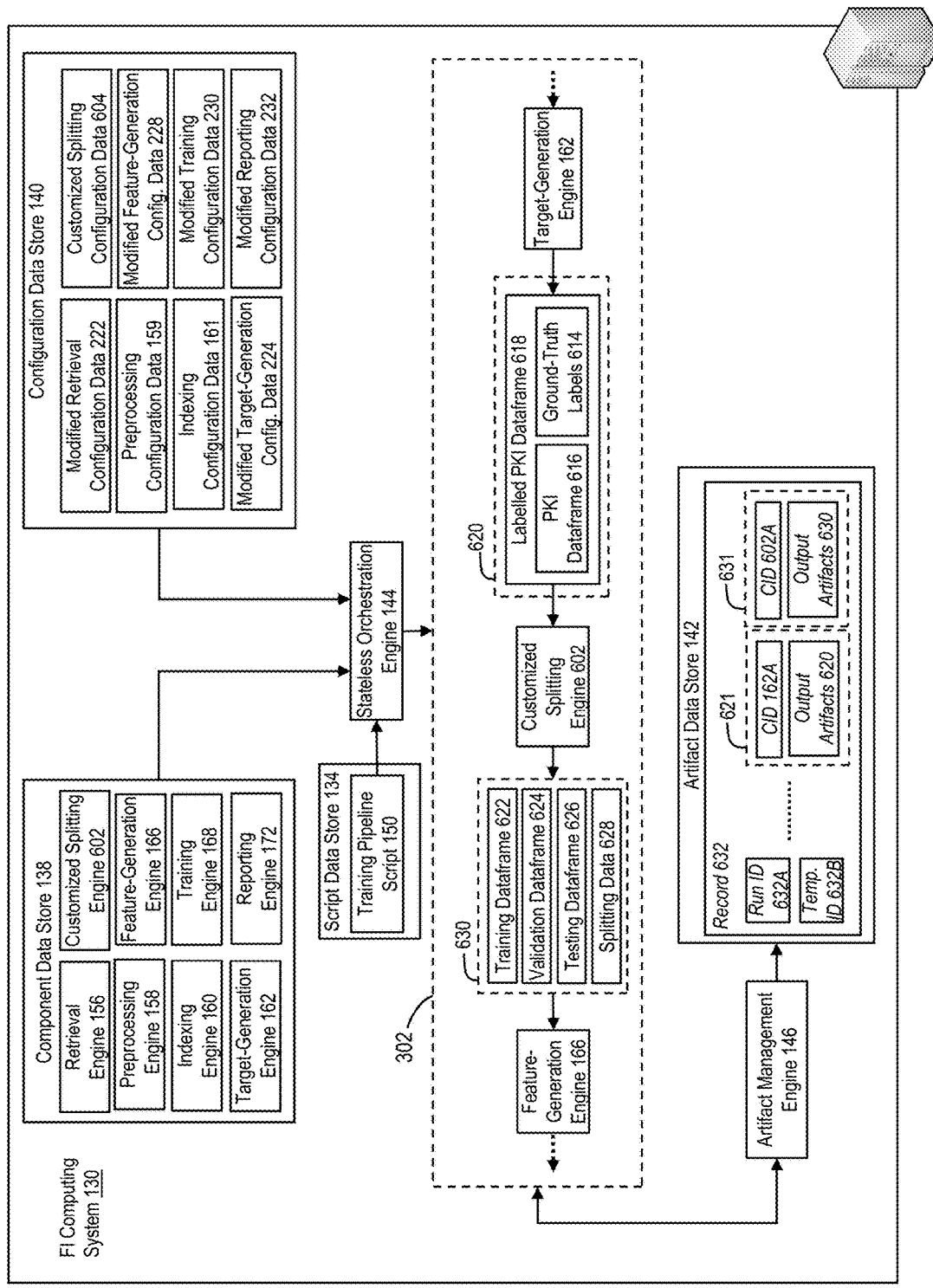

Referring to FIG. 6B, executed target-generation engine 162 may perform any of the exemplary processes described herein, consistent with the elements of modified target-generation configuration data 224 within default training pipeline 302, to determine a corresponding ones of target, ground-truth labels 614 for each row of the PKI data frame generated by sequentially executed indexing engine 160 (e.g., PKI dataframe 616), to append each of target, ground-truth labels 614 to the corresponding row of PKI dataframe 616, and generate elements of a labelled PKI dataframe 618 that include each row of PKI dataframe 616 and the appended one of target, ground-truth labels 614. In some instances, executed target-generation engine 162 may perform operations that provision labelled PKI dataframe 618 to executed artifact management engine 146, e.g., as output artifacts 620 of executed target-generation engine 162.

Executed artifact management engine 146 may receive each of output artifacts 620 via the artifact API, and may perform operations that package each of output artifacts 620 into a corresponding portion of target-generation artifact data 621, along with a unique, alphanumeric identifier 162A of executed target-generation engine 162, and in some instances, one or more input artifacts ingested by executed target-generation engine 162 during the additional run of default training pipeline 302. Further, executed artifact management engine 146 may also store target-generation artifact data 621 within a corresponding portion of artifact data store 142, e.g., within data record 632 associated with the additional run of default training pipeline 302, and with corresponding run identifier 632A and temporal identifier 632B.

Further, and in accordance with default training pipeline 302, executed target-generation engine 162 may provide output artifacts 620, including labelled PKI dataframe 618 (e.g., maintaining each the rows of PKI dataframe 616 and the appended ones of ground-truth labels 614) as inputs to customized splitting engine 602 executed by the one or more processors of FI computing system 130. Additionally, in some instances, executed orchestration engine 144 may provision one or more elements of customized splitting configuration data 604 maintained within configuration data store 140 to executed customized splitting engine 602 in accordance with default training pipeline 302. As described herein, the elements of customized splitting configuration data 604 may include, but are not limited to, data specifying the one or more temporal partitioning operations and random or pseudo-random sampling operations, and in some instances, data specifying a structure, format, or composition of the partitioned dataframes generated by executed customized splitting engine 602. The data characterizing each of the temporal partitioning operations, and the random or pseudo-random sampling operations may include, but is not limited to, one or more scripts callable in a namespace of executed customized splitting engine 602, etc.), and a value of one or more parameters associated with the specified temporal partitioning operations (e.g., the temporal splitting point of Jan. 1, 2023) and a value of one or more parameters associated with the specified random or pseudo-random sampling operations.

A programmatic interface associated with customized splitting engine 602 may receive labelled PKI dataframe 618 and the elements of customized splitting configuration data 604 (e.g., as input artifacts), and may perform operations that establish a consistency between these input artifacts and the engine- and pipeline-specific operational constraints imposed on executed customized splitting engine 602 (and on default splitting engine 164). Based on an established consistency of the input artifacts with the imposed engine- and pipeline-specific operational constraints, executed splitting engine 164 may perform operations that, consistent with the elements of customized splitting configuration data 604, partition labelled PKI dataframe 618 into a plurality of partitioned dataframes suitable for training, validating, and testing a machine-learning or artificial process within default training pipeline 302. As described herein, each of the partitioned dataframes may include a partition-specific subset of the rows of labelled PKI dataframe 618, each of which include a corresponding row of PKI dataframe 616 and the appended one of ground-truth labels 614.

Based the elements of customized splitting configuration data 604, executed customized splitting engine 602 may apply the one or more temporal partitioning operations to labelled PKI dataframe 618, and based on the application of the one or more temporal partitioning operations to labelled PKI dataframe 618, executed customized splitting engine 602 may partition labelled PKI dataframe 618 into an intermediate, in-time partitioned dataframe and into an intermediate, out-of-time partitioned dataframe. For example, each of the rows of labelled PKI dataframe 618 may include, among other things, a unique, alphanumeric customer identifier and an element of temporal data, such as a corresponding timestamp. In some instances, and based on a comparison between the corresponding timestamp and the temporal splitting point maintained within the elements of customer splitting configuration data 604, executed splitting engine 164 may assign each of the rows of labelled PKI dataframe 618 to the intermediate, in-time partitioned dataframe (e.g., based on a determination that the corresponding timestamp is disposed prior to, or concurrent with, the temporal splitting point of Jan. 1, 2023) or to the intermediate, out-of-time partitioned dataframe (e.g., based on a determination that the corresponding timestamp is disposed subsequent to the temporal splitting point of Jan. 1, 2023).

Further, executed customized splitting engine 602 may apply the one or more random or pseudo-random partitioning operations to the rows of the intermediate, in-time partitioned dataframe in accordance with the parameter values specified with the elements of customized splitting configuration data 604, and based on the application of the one or more random or pseudo-random partitioning operations to the rows of the intermediate, in-time partitioned dataframe, executed customized splitting engine 602 may generate in-time, and in-sample, partitioned dataframe that includes a first sampled subset of the rows of the intermediate, in-time partitioned dataframe, and an in-time, and out-of-sample, partitioned dataframe that includes a second sampled subset of the rows of the intermediate, in-time partitioned dataframe. As described herein, the rows of the in-time, and in-sample, partitioned dataframe may establish a training dataframe 622 appropriate to train adaptively a machine-learning or artificial-intelligence process using any of the exemplary processes described herein, the rows of the in-time, and out-of-sample, partitioned dataframe may establish a validation dataframe 624 appropriate to validate the trained machine-learning or artificial-intelligence using any of the exemplary processes described herein, and the rows of the intermediate, out-of-time partitioned dataframe (e.g., including both in-sample and out-of-sample row) may establish a testing dataframe 626 appropriate to tested a performance and an accordance of the previously trained and validated machine-learning or artificial-intelligence processes using any of the exemplary processes described herein.

In some instances, executed customized splitting engine 602 may perform operations that provision training dataframe 622, training dataframe 624, and testing dataframe 626, and elements of splitting data 628 that characterize the one or more applied temporal partitioning operations and the one or more applied random or pseudo-random sampling operations to executed artifact management engine 146, e.g., as output artifacts 630 of executed customized splitting engine 602. In some instances, executed artifact management engine 146 may receive each of output artifacts 330 via the artifact API, and may perform operations that package each of output artifacts 630 into a corresponding portion of splitting artifact data 631, along component identifier 602A, and that store retrieval artifact data 631 within a corresponding portion of artifact data store 142, e.g., within data record 632 associated with the additional run of default training pipeline 302 and run identifier 632. Further, although not illustrated in FIG. 6B, executed artifact management engine 146 may also package, into a corresponding portion of splitting artifact data 631, additional data identifying and characterizing one or more of the input artifacts ingested by executed customized splitting engine 602, such as, but not limited to, labelled PKI dataframe 618 and the elements of customized splitting configuration data 604.

Further, executed customized splitting engine 602 may provide output artifacts 630, including training dataframe 622, training dataframe 624, and testing dataframe 626, and the elements of splitting data 628, as inputs to feature-generation engine 166 executed by the one or more processors of FI computing system 130 within the additional run of default training pipeline 302. Although not illustrated in FIG. 6B, executed feature-generation engine 166 may perform any of the exemplary processes described herein, consistent with the elements of modified feature-generation configuration data 228, to generate a feature vector of discrete feature values for corresponding rows of the training dataframe 622, training dataframe 624, and testing dataframe 626, and to append each of the generated feature vectors to the corresponding row of training dataframe 622, training dataframe 624, and testing dataframe 626, and to generated vectorized training, validation, and testing dataframes that include, respectively, the corresponding rows of training dataframe 622, training dataframe 624, and testing dataframe 626 and the appended ones of the generated feature vectors.

In some instances, consistent with executed training pipeline script 150, the one or more processors of FI computing system 130 may execute sequentially training engine 168 and reporting engine 172 within the additional run of default training pipeline 302. For example, although not illustrated in FIG. 6B, executed training engine 168 may perform any of the exemplary processes described herein, consistent with the elements of modified training configuration data 230, that instantiate a machine-learning or artificial-intelligence process in accordance with the specified process parameters, and that apply the instantiated machine-learning or artificial-intelligence process to the rows of the vectorized training, validation, and testing dataframes, and that generate elements of training, validation, and testing output data, and elements of training, validation, and testing log data, based on the application of the instantiated machine-learning or artificial-intelligence process to the rows of the corresponding ones of the vectorized training, validation, and testing dataframes. In some instances, each of sequentially executed feature-generation engine 166 and executed training engine 168 may generate corresponding output artifacts, and executed artifact management engine 146 may perform any of the exemplary processes described herein to store the engine-specific output artifacts within one or more data records of artifact data store 142 in conjunction with corresponding component identifiers Further, although not illustrated in FIG. 6B, executed reporting engine 172 may perform any of the exemplary processes described herein, in accordance with the elements of modified reporting configuration data 232, to access output artifacts generated by executed retrieval engine 156, executed preprocessing engine 158, executed indexing engine 160, executed target-generation engine 162, executed customized splitting engine 602, executed feature-generation engine 166, and executed training engine 168, and to generate elements of pipeline reporting data that characterize an operation and a performance of the discrete, modular components executed by the one or more processors of FI computing system 130 within the additional run of default training pipeline 302. Executed reporting engine 172 may generate additional output artifacts within the additional run of default training pipeline 302, and executed artifact management engine 146 may perform any of the exemplary processes described herein to store the additional output artifacts within one or more data records of artifact data store 142 in conjunction with component identifier 172A.

Through a performance of one or more of the exemplary processes described herein, executed customization application 204 may replace default splitting engine 164 within the execution flow of default training pipeline 302 with customized splitting engine 602 that is consistent with the additional use-case of interest to developer 103 without modification to the execution flow of default training pipeline 302, and while maintaining compliance with the one or more process-validation operations or requirements and with the one or more governmental or regulatory requirements. Further, the disclosed embodiments are not limited to the replacement of default splitting engine 164 within default training pipeline 302. In other examples, developer computing system 102 and the one or more processors of FI computing system 130 may perform operations, described herein, that replace an additional, or alternative, one of the sequentially executed application engines of default training pipeline 302, and additionally, or alternatively, within one of default inferencing pipeline 420 or default target-generation pipeline 520, with a customized application engine consistent with the imposed, pipeline- and engine-specific constraints and with a corresponding use case of interest to developer 103, e.g., without modification to the execution flow of default training pipeline 302, and while maintaining compliance with the one or more process-validation operations or requirements and with the one or more governmental or regulatory requirements.

Additionally, in some examples, an execution flow of sequentially executed application engines within one or more of default training pipeline 302, default inferencing pipeline 420, or default target-generation pipeline 520 may be incompatible with, or inapplicable to, a further use-case of interest to developer 103. By way of example, developer 103 may elect, within the default execution flow of default inferencing pipeline 420, to apply a trained machine-learning or artificial-intelligence process, such as a trained, gradient-boosted, decision-tree process (e.g., an XGBoost process), to feature vectors derived from elements of confidential customer data and obtain elements of predictive output associated with the further use-case of interest to developer 103, e.g., in support of one or more customer-facing decisioning processes involving a subset of the customers of the financial institution. For instance, the predictive output of associated with a particular use-case of interest may include, but is not limited to, data indicative of an occurrence, or a non-occurrence, of a targeted event involving each of the subset of the customers during a future temporal interval, which may be separated from a temporal prediction point by a corresponding buffer temporal interval.

Based on input provisioned by developer 103 (e.g., via input device 112), developer computing system 102 may perform any of the exemplary processes described herein to customize elements of configuration data associated with one, or more, of the application engines sequentially executed within the default inferencing pipeline 420 to reflect the further use-case of interest to developer 103, e.g., the application of the trained, gradient-boosted, decision-tree process to the feature vectors associated with the subset of the customers and the generation of predictive output indicative of the likely occurrence, or the non-occurrence, of the targeted event involving each of the subset of the customers during the future temporal interval. In some instances, to inform further the customer-facing or back-end decisioning processes, developer 103 may also elect to apply an additional, trained machine-learning or artificial-intelligence process, such as a trained explainability process, to the customer-specific feature vectors and to the customer-specific elements of predicted output generated by the application of the trained, gradient-boosted, decision-tree process (e.g., an XGBoost process) to the customer-specific feature vectors within default inferencing pipeline 420. By way of example, the additional predictive output of the trained explainability process associate each of the subset of the customers with a clustered range of one or more feature values, which when mapped to corresponding customer characteristics, may enable developer 103 to provision an outcome of the customer-facing decisioning processes to the corresponding customers, but also one or more reasons associated with the outcome.

While inferencing engine 170 may be configured to apply the trained explainability process to corresponding, customer-specific feature vectors within the execution flow of default inferencing pipeline 420 without any modification to the executable code of inferencing engine 170 (e.g., via a customization of the elements of feature-generation configuration data 167 using any of the exemplary processes described herein), the execution flow of default inferencing pipeline 420 may not permit an initial inferencing operation that applies the trained gradient-boosted, decision-tree process to the customer-specific feature vectors in accordance with first elements of inferencing configuration data, followed by a subsequent inferencing operation that applies the trained explainability process to the customer-specific feature vectors and to the customer-specific elements of predicted output of the initial inferencing operation. In some instances, developer computing system 102 and the one or more processes of FI computing system 130 may perform one or more of the exemplary processes described herein modify the execution flow of the sequentially executed default application engines within default inferencing pipeline 420 to reflect the further use-case of interest to developer 103 (e.g., the initial and subsequent inferencing operations associated with executed inferencing engine 170), and establish a customized inferencing pipeline that implements the initial and subsequent inferencing operations of interest to developer 103, while maintaining compliance with the one or more process-validation operations or requirements and with the one or more governmental or regulatory requirements.

By way of example, and based on input provisioned to computing system 130 by developer 103 (e.g., via display device 110), executed web browser 108 of developer computing system 102 may perform any of the exemplary processes described herein to access not only the elements of modified inferencing configuration data 412 maintained within configuration data store 140, but also to access inferencing pipeline script 152 maintained within script data store 136, and to store inferencing pipeline script 152 and the elements of modified inferencing configuration data 412. Further, and as described herein, executed web browser 108 may also perform operations, described herein, to present interface elements representative of inferencing pipeline script 152 and the elements of modified inferencing configuration data 412 within a corresponding digital interface, e.g., via display device 110.

As described herein, the elements of modified inferencing configuration data 412 may reflect the initial inferencing operation associated with the further use-case of interest to developer 103 (e.g., application of the trained, gradient-boosted, decision-tree process to the feature vectors associated with the subset of the customers and the generation of predictive output indicative of the likely occurrence, or the non-occurrence, of the targeted event involving each of the subset of the customers during the future temporal interval). Thus, upon review of inferencing pipeline script 152 within one or more display screen of the corresponding digital interface, developer 103 may elect to maintain portion of the execution flow of default inferencing pipeline 420 that facilitates the initial inferencing operation by executed inferencing engine 170, e.g., the applies the trained gradient-boosted, decision-tree process to the customer-specific feature vectors in accordance with the elements of modified inferencing configuration data 412.

Figure 7A:
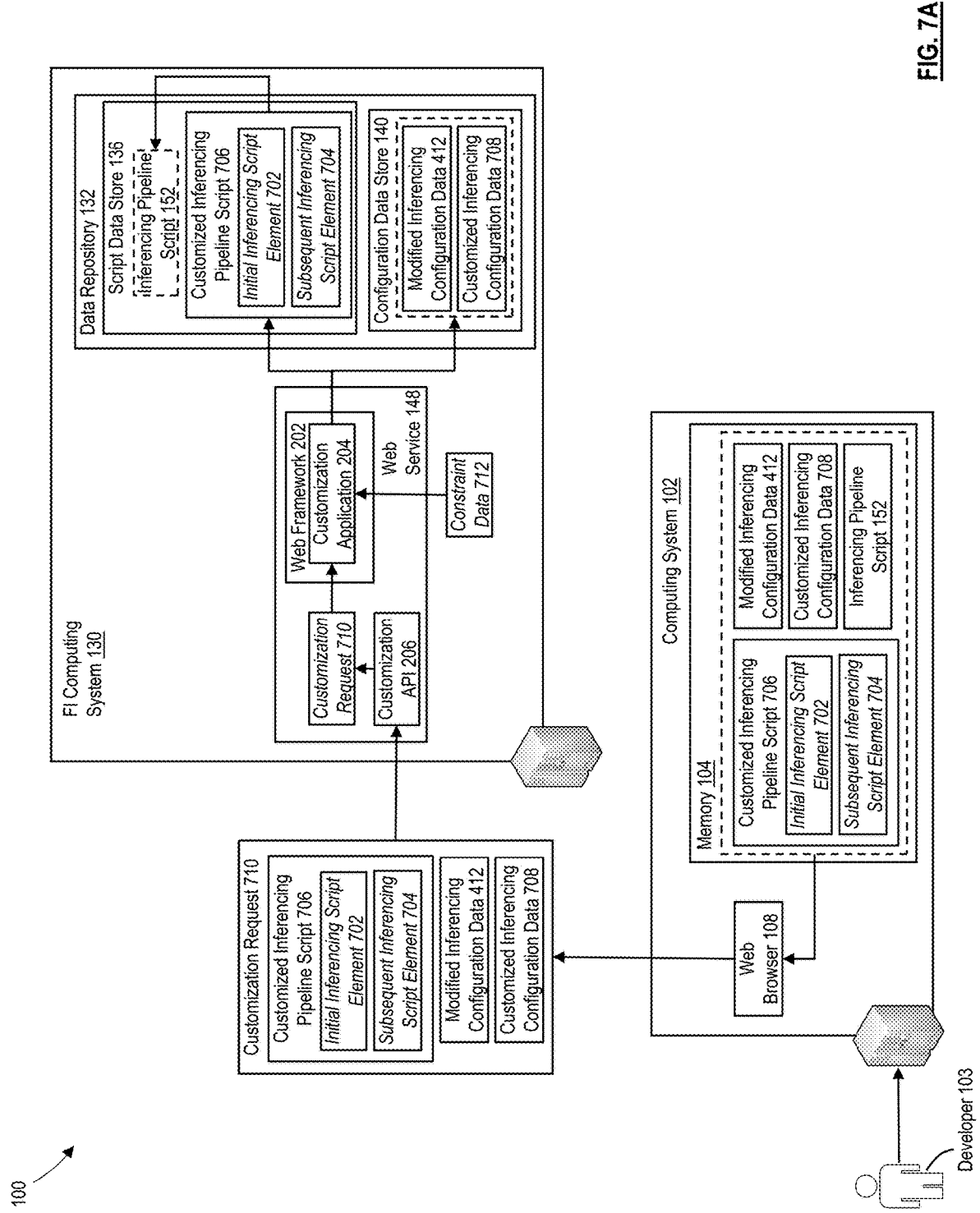

Referring to FIG. 7A, developer 103 may identify an initial inferencing script element 702 associated with the initial inferencing operation by executed inferencing engine 170 within inferencing pipeline script 152. Further, and based on additional input provided by developer 103 (e.g., via input device 112), developer computing system 102 may generate a subsequent inferencing script element 704 that executes the subsequent inferencing operation by executed inferencing engine 170, and may insert subsequent inferencing script element 704 into inferencing pipeline script 152, and may generate elements of a customized inferencing pipeline script 706 that includes initial inferencing script element 702 associated with the initial inferencing operation by executed inferencing engine 170 and subsequent inferencing script element 704 that executes the subsequent inferencing operation by executed inferencing engine 170.

As described herein, customized inferencing pipeline script 706 may, upon execution by the one or more processors of FI computing system 130, establish a customized execution flow characterized by an execution of retrieval engine 156, execution of preprocessing engine 158, execution of indexing engine 160, execution of feature-generation engine 166, an initial execution of inferencing engine 170 associated with the initial inferencing operation, a successive execution of inferencing engine 170 associated with the subsequent inferencing operation, and an execution of reporting engine 172. Executed web browser 108 may perform operations that store customized inferencing pipeline script 706, which include initial inferencing script element 702 and subsequent inferencing script element 704, within a portion of memory 104.

Further, and based on input provisioned by developer 103 (e.g., via input device 112), computing system 130 may also generate one or more elements of customized inferencing configuration data 708 ingestible by subsequent inferencing script element 704 upon execution by the one or more processors of FI computing system 130 (e.g., during execution of customized inferencing pipeline script 706). In some instances, the elements of customized inferencing configuration data 708 may include data that characterized the trained machine-learning or artificial-intelligence process associated with the subsequent inferencing operation, such as the trained explainability process described herein (e.g., via a helper script callable within the namespace of inferencing engine 170), and a value of one or more process parameters of the trained explainability process. Further, the elements of customized inferencing configuration data 708 may also identify, and characterize a structure or format, of one or more input artifacts ingested by the trained explainability process (e.g., the feature vectors associated with the subset of the customers and the predictive output generated by the initial inferencing operation) and additionally, or alternatively, of one or more output artifacts generated by the trained explainability process (e.g., the cluster-specific, clustered ranges of the feature values).

As described herein, initial inferencing script element 702 may call or invoke inferencing engine 170 during the initial inferencing operation within the execution flow of the customized inferencing pipeline, and as described herein, may include or reference an identifier of the elements of modified inferencing configuration data 412 (e.g., as maintained within configuration data store 140), and one or more input artifacts ingested by sequentially executed inferencing engine 170, and additionally, or alternatively, one or more output artifacts generated by sequentially executed inferencing engine 170, during the initial inferencing operation and in accordance with the elements of modified inferencing configuration data 412. Further, initial inferencing script element 702 may also call or invoke inferencing engine 170 during the subsequent inferencing operation within the execution flow of the customized inferencing pipeline, and as described herein, may include or reference an identifier of the elements of customized inferencing configuration data 708, and one or more input artifacts ingested by sequentially executed inferencing engine 170, and additionally, or alternatively, one or more output artifacts generated by sequentially executed inferencing engine 170, during the subsequent inferencing operation and in accordance with the elements of customized inferencing configuration data 708

Web browser 108 may perform operations that package modified inferencing configuration data 412, customized inferencing pipeline script 706, including initial inferencing script element 702 and subsequent inferencing script element 704, and customized inferencing configuration data 708 into corresponding portions of a customization request 710, along with an identifier of default inferencing pipeline 420. In some instances, executed web browser 108 may also package, into an additional portion of customization request 710, the one or more identifiers of developer computing system 102 or executed web browser 108, such as the exemplary identifiers described herein. Executed web browser 108 may also perform operations that cause developer computing system 102 to transmit customization request 710 across communications network 120 to FI computing system 130, e.g., via the secure, programmatic channel of communications established between executed web browser 108 and programmatic web service 148 executed by the one or more processors of FI computing system 130.

Customization API 206 of executed customization application 204 may receive customization request 710, and perform any of the exemplary processes described herein to determine whether FI computing system 130 permits a source of customization request 710, e.g., developer computing system 102 or executed web browser 108, to customize the execution flow of default inferencing pipeline 420. If, for example customization API 206 were to establish that FI computing system 130 fails to grant developer computing system 102, or executed web browser 108, permission to customize the execution flow of default inferencing pipeline 420, customization API 206 may discard customization request 710 and FI computing system 130 may transmit a corresponding error message to developer computing system 102. Alternatively, if customization API 206 were to establish that FI computing system 130 grants developer computing system 102 and/or executed web browser 108, permission to customize one or more of the application engines within the default execution flow of default training pipeline 302, customization API 206 may route customization request 710 to executed customization application 204.

Executed customization application 204 may obtain the identifier of default inferencing pipeline 420, modified inferencing configuration data 412, customized inferencing pipeline script 706, including initial inferencing script element 702 and subsequent inferencing script element 704, and customized inferencing configuration data 708 from customization request 710. In some instances, based on the identifier, executed customization application 204 may obtain one or more elements of constraint data 712 that identify and characterize each of the engine-specific and pipeline-specific constraints imposed on, and associated with, the execution flow of default inferencing pipeline 420.

The imposed constraints may include, among other things, one or more artifacts constraints on a composition, and input, and a structure of the input artifacts ingested by each of the discrete application engines executed sequentially in accordance with the execution flow of default inferencing pipeline 420. In some instances, based on constraint data 712, executed customization application 204 may perform operations that apply each of the engine-specific and pipeline-specific constraints imposed on the splitting engine within default inferencing pipeline 420 to, among other things, the discrete executable script elements of customized inferencing pipeline script 706, including initial inferencing script element 702 and subsequent inferencing script element 704, and to the elements of modified inferencing configuration data 412 and customized inferencing configuration data 708 ingested by executed inferencing engine 170 during the initial and subsequent inferencing operations, e.g., as implemented via initial inferencing script element 702 and subsequent inferencing script element 704, respectively. If, for example, executed customization application 204 were to determine an inconsistency between the discrete executable script elements of customized inferencing pipeline script 706, or the elements of modified inferencing configuration data 412 and customized inferencing configuration data 708, and at least one of the imposed constraints (including the artifact constraints described herein), executed customization application 204 may decline to replace the inferencing pipeline script 152, which establishes default inferencing pipeline 420, with customized inferencing pipeline script 706. Executed customization application 204 may generate an error message indicating the detected inconsistency, and executed customization application 204 may cause FI computing system to transmit the generated error message across network 120 to developer computing system 102, e.g., via the established, secure programmatic channel of communications described herein.

Figure 7B:
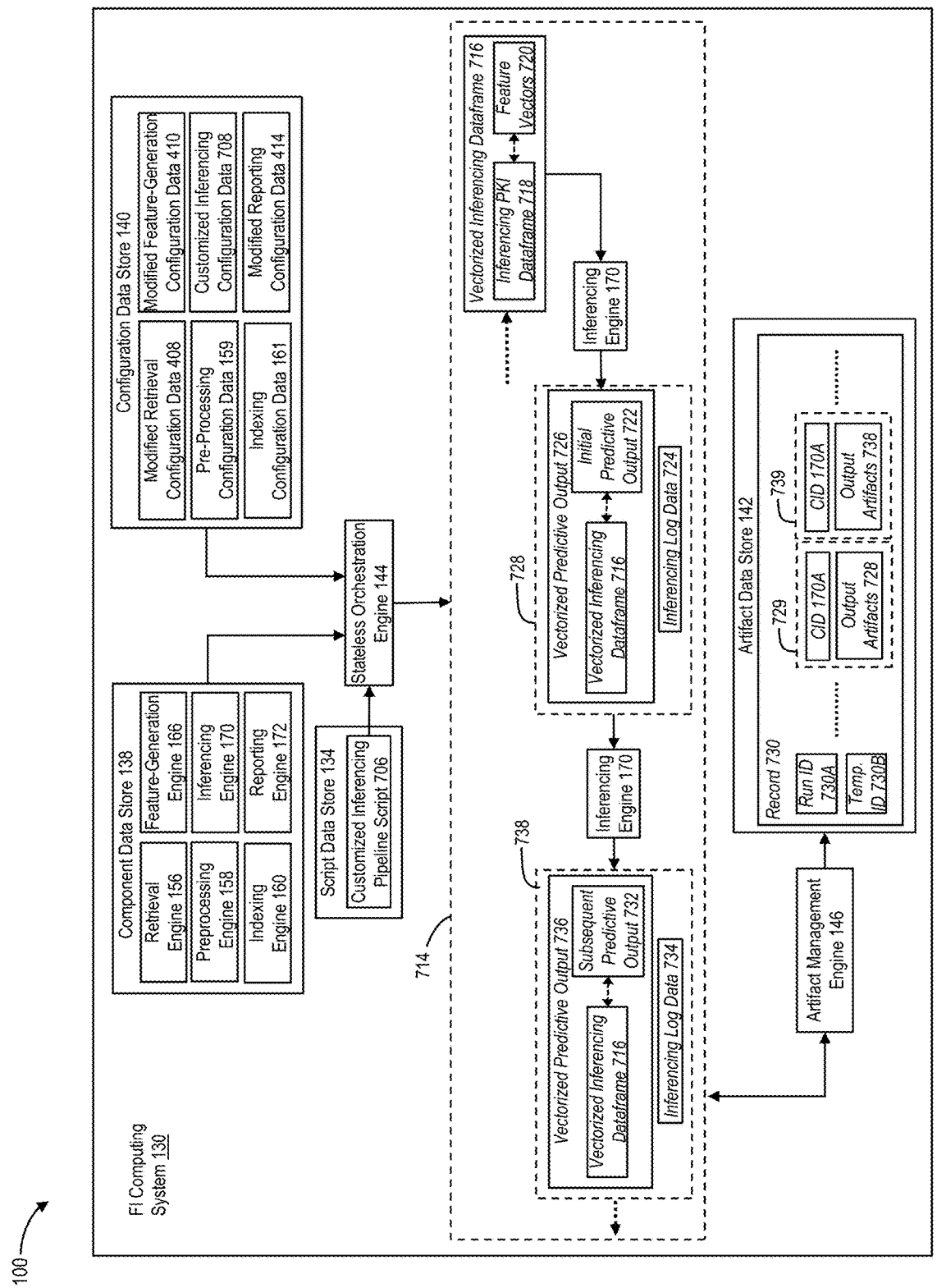

Referring to FIG. 7B, the one or more processors of FI computing system 130 may execute orchestration engine 144, which may access script data store 136 and obtain customized inferencing pipeline script 706. Executed orchestration engine 144 may trigger an execution of customized inferencing pipeline script 706 by the one or more processors of FI computing system 130, which may establish the customized inferencing pipeline, e.g., default customized inferencing pipeline 714. In some instances, upon execution of customized inferencing pipeline script 706, executed orchestration engine 144 may generate a unique, alphanumeric identifier, e.g., run identifier 730A, for a current run of customized inferencing pipeline 714 in accordance with the corresponding elements of engine-specific configuration data (e.g., which developer 103 may customize in accordance with the particular use-case of interest using any of the exemplary processes described herein), and executed orchestration engine 144 may provision run identifier 730A to artifact management engine 146 via artifact API. Executed artifact management engine 146 may perform operations that, based on run identifier 730A, associate data record 730 of artifact data store 142 with the current run of customized inferencing pipeline 714, and that store run identifier 730A within data record 730 along with a corresponding temporal identifier 730B indicative of date at which executed orchestration engine 144 executed customized inferencing pipeline script 706 and established customized inferencing pipeline 714.

As described herein, customized inferencing pipeline script 706 may include initial inferencing script element 702 that calls or invokes inferencing engine 170 during the initial inferencing operation (e.g., in accordance with the elements of modified inferencing configuration data 412) and subsequent inferencing script element 704 that calls or invokes inferencing engine 170 during the subsequent inferencing operation (e.g., in accordance with the elements of customized inferencing configuration data 708). By way of example, executed orchestration engine 144 may trigger an execution of customized inferencing pipeline script 706 (including initial inferencing script element 702 and subsequent inferencing script element 704) by the one or more processors of FI computing system 130, which may establish customized inferencing pipeline 714 that includes the initial and subsequent inferencing operations and that reflects the further use-case of interest to developer 103.

Consistent with executed customized inferencing pipeline script 706, the one or more processors of FI computing system 130 may execute sequentially retrieval engine 156, preprocessing engine 158, indexing engine 160, and feature-generation engine 166 within an implementation, or run, of customized inferencing pipeline 714. Although not illustrated in FIG. 7B, executed retrieval engine 156 may perform any of the exemplary processes described herein to obtain one or more source data tables from source data store 134 in accordance with the elements of modified retrieval configuration data 408, executed preprocessing engine 158 may perform any of the exemplary processes described herein, consistent with the elements of preprocessing configuration data 159, to ingest the one or more source data tables, and to generate one or more ingested data tables based on an application of one or more preprocessing operations to the one or more source data tables.

Further, while not illustrated in FIG. 7B, executed indexing engine 160 may perform any of the exemplary processes described herein, consistent with the elements of indexing configuration data 161, that generate an inferencing PKI dataframe having discrete rows associated with corresponding ones of the subset of the customers associated with the further use-case of interest to developer 103 (e.g., including a corresponding customer identifier) and that reference a corresponding temporal prediction point (e.g., an initiation time or date of the current run of the customized inferencing pipeline), and executed feature-generation engine 166 may perform any of the exemplary processes described herein, consistent with the elements of modified feature-generation configuration data 410, to generate a feature vector of discrete feature values for corresponding rows of the inferencing PKI dataframe, to append each of the generated feature vectors to the corresponding row of the inferencing PKI dataframe, and to generated a vectorized inferencing dataframe that includes, respectively, the corresponding rows of the inferencing PKI dataframe and the appended ones of the generated feature vectors. In some instances, each of sequentially executed retrieval engine 156, preprocessing engine 158, indexing engine 160, and feature-generation engine 166 may generate corresponding output artifacts, and executed artifact management engine 146 may perform any of the exemplary processes described herein to store the generated, engine-specific output artifacts within one or more data records of artifact data store 142 in conjunction with corresponding component identifiers.

Referring back to FIG. 7B, within customized inferencing pipeline 714, customized inferencing pipeline 714, executed inferencing engine 170 may perform any of the exemplary processes described herein, in accordance with the elements of modified inferencing configuration data 412 during the initial inferencing operation, to instantiate the trained, gradient-boosted, decision-tree process (e.g., the trained XGBoost process) in accordance with the values of the corresponding process parameters. Examples of these developer-specified parameter values include, but are not limited to, a learning rate, a number of discrete decision trees (e.g., the "n_estimator" for the trained, gradient-boosted, decision-tree process), a tree depth characterizing a depth of each of the discrete decision trees, a minimum number of observations in terminal nodes of the decision trees, and/or values of one or more hyperparameters that reduce potential model overfitting.

During the initial inferencing operation, executed inferencing engine 170 may also receive the vectorized inferencing dataframe, e.g., vectorized inferencing dataframe 716, which includes the rows of inferencing PKI dataframe 718 and the appended one of feature vectors 720. Further, and in accordance with the elements of modified inferencing configuration data 412 during the initial inferencing operation, executed inferencing engine 170 may also perform any of the exemplary operations described herein to apply the instantiated, and trained, gradient-boosted, decision-tree process to each row of vectorized inferencing dataframe 716. Based on the application of the trained, gradient-boosted, decision-tree process to each row of vectorized inferencing dataframe 716, the one or more processors of FI computing system 130 may generate, during the initial inferencing operation, an element of initial predictive output 722 associated with the corresponding customer and temporal prediction point, and elements of inferencing log data 724 that characterize the application of the trained gradient-boosted, decision-tree process to the each row of vectorized inferencing dataframe 716, such as, but not limited to, those exemplary elements of inferencing log data described herein.

By way of example, the elements of initial predictive output 722 generated during the initial inferencing operation may indicate the predicted likelihood of the occurrence, or non-occurrence, of the targeted event involving corresponding ones of the subset of the customers the future temporal interval. Executed inferencing engine 170 may also perform operations, consistent with the elements of modified inferencing configuration data 412, the append each of the elements of initial predictive output 722 to the corresponding row of vectorized inferencing dataframe 716, and generate elements of vectorized predictive output 726 that include each row of vectorized inferencing dataframe 716 and the appended element of initial predictive output 722. Further, executed inferencing engine 170 may perform operations, described herein, that provision vectorized predictive output 726, the elements of inferencing log data 724, and in some instances, the elements of process data that characterize the values of the process parameters of the trained, gradient-boosted, decision-tree process, to executed artifact management engine 146, e.g., as output artifacts 728 of executed inferencing engine 170 within the initial inferencing operation of customized inferencing pipeline 714.

Executed artifact management engine 146 may receive each of output artifacts 728, and may perform operations that package each of output artifacts 728 into a corresponding portion of inferencing artifact data 729, along with a unique, alphanumeric identifier 170A of executed inferencing engine 170, and that store inferencing artifact data 471 within a corresponding portion of artifact data store 142, e.g., within data record 730 associated with customized inferencing pipeline 714, run identifier 730A, and temporal identifier 730B indicative of an initiation time of the current run of customized inferencing pipeline 714. Further, although not illustrated in FIG. 7B, executed artifact management engine 146 may also package, into a corresponding portion of inferencing artifact data 729, additional data identifying and characterizing one or more of the input artifacts ingested by executed inferencing engine 170 during the initial inferencing operation.

In some examples, the one or more processors of FI computing system 130 may re-execute inferencing engine 170 based on an execution of subsequent inferencing script element 704 of customized inferencing pipeline script 706, e.g., during the subsequent inferencing operation of customized inferencing pipeline 714. In some instances, upon subsequent execution by the one or more processors of FI computing system 130 during the second inferencing operation, executed inferencing engine 170 may perform operations, consistent with the elements of customized inferencing configuration data 708, that instantiate the trained explainability process in accordance with the values of the corresponding process parameters. Further, during the second inferencing operation, executed inferencing engine 170 may also receive vectorized predictive output 726, which includes each row of vectorized inferencing dataframe 716 and the appended element of initial predictive output 722 (e.g., based on programmatic communications with executed artifact management engine 146 via the artifact API), and may perform, operations consistent with the elements of customized inferencing configuration data 708, that apply the instantiated, and trained, explainability process to the corresponding one of feature vectors 720 and the corresponding element of initial predictive output 722 associated with each row of vectorized inferencing dataframe 716 (e.g., maintained within vectorized predictive output 726).

Based on the application of the trained, explainability process to the corresponding ones of feature vectors 720 and the elements of initial predictive output 722 associated with each row of vectorized inferencing dataframe 716, the one or more processors of FI computing system 130 may generate, during the subsequent inferencing operation, an additional element of subsequent predictive output 732 associated with the corresponding customer and temporal prediction point, and elements of inferencing log data 734 that characterize the application of the trained explainability process to the corresponding ones of feature vectors 720 and the elements of initial predictive output 722. As described herein, each of the additional elements of subsequent predictive output 732 may associated the corresponding customer with a clustered range of one or more feature values, which when mapped to corresponding customer characteristics, may enable developer 103 to provision an outcome of the customer-facing decisioning processes to the corresponding customers, but also one or more reasons associated with the outcome.

Executed inferencing engine 170 may also perform operations, consistent with the elements of customized inferencing configuration data 708, the append each of the additional elements of subsequent predictive output 732 (e.g., generated during the subsequent inferencing operation within customized inferencing pipeline 714) and the corresponding element of initial predictive output 722 (e.g., generated during the initial inferencing operation within customized inferencing pipeline 714) to the corresponding row of vectorized inferencing dataframe 716, and generate additional elements of vectorized predictive output 736 that include each row of vectorized inferencing dataframe 716 and the appended elements of initial predictive output 722 and subsequent predictive output 732. Further, executed inferencing engine 170 may perform operations, described herein, that provision vectorized predictive output 738, the elements of inferencing log data 734, and in some instances, the elements of process data that characterize the values of the process parameters of the trained explainability process, to executed artifact management engine 146, e.g., as output artifacts 738 of executed inferencing engine 170 within the subsequent inferencing operation of customized inferencing pipeline 714.

Executed artifact management engine 146 may receive each of output artifacts 738, and may perform operations that package each of output artifacts 738 into a corresponding portion of inferencing artifact data 739, along with component identifier 170A of executed inferencing engine 170, and that store inferencing artifact data 739 within a corresponding portion of artifact data store 142, e.g., within data record 730 associated with customized inferencing pipeline 714, a corresponding run identifier 730A, and a corresponding temporal identifier 730B indicative of an initiation time of the current run of customized inferencing pipeline 714. Further, although not illustrated in FIG. 7B, executed artifact management engine 146 may also package, into a corresponding portion of inferencing artifact data 739, additional data identifying and characterizing one or more of the input artifacts ingested by executed inferencing engine 170 during the subsequent inferencing operation.

In some instances, although not illustrated in FIG. 7B, executed reporting engine 172 may perform any of the exemplary processes described herein, in accordance with the elements of modified reporting configuration data 414, to access output artifacts generated by executed retrieval engine 156, executed preprocessing engine 158, executed indexing engine 160, executed feature-generation engine 166, and further, to access output artifacts 728 and 738 generated by executed inferencing engine 170 within the corresponding ones of the initial and subsequent inferencing operations within customized inferencing pipeline 714. Executed reporting engine 172 may perform any of the exemplary processes described herein, in accordance with the elements of modified reporting data 414, that generate elements of pipeline reporting data that characterize an operation and a performance of the discrete, modular components executed by the one or more processors of FI computing system 130 within the current run of customized inferencing pipeline 714. Executed reporting engine 172 may generate additional output artifact(s) of the current run of customized inferencing pipeline 714, which may include the generated elements of pipelined reporting data, and executed artifact management engine 146 may perform any of the exemplary processes described herein to store the additional output artifacts within data record 730 artifact data store 142 in conjunction with component identifier 172A and run identifier 730A.

Through a performance of one or more of the exemplary processes described herein, executed customization application 204 may replace default inferencing pipeline script 152 with customized inferencing pipeline script 706, and may establish customized inferencing pipeline 714, which facilitates a customization of default inferencing pipeline 420 to include the initial and subsequent inferencing operations associated with the additional user-case of developer 103, while maintaining compliance with the one or more process-validation operations or requirements and with the one or more governmental or regulatory requirements. Further, the disclosed embodiments are not limited to the replacement of default inferencing pipeline script 152 with customized inferencing pipeline script 706 and the establishment of the initial and subsequent inferencing operations within customized inferencing pipeline 714. In other examples, developer computing system 102 and the one or more processors of FI computing system 130 may perform operations, described herein, that customize default inferencing pipeline 420 and additionally, or alternatively, default training pipeline 302 and default target-generation pipeline 520, to include any additional or alternate operations associated with corresponding one of the default application engines described herein, or associated with one of the customized application engines described herein, consistent with the imposed, pipeline- and engine-specific constraints and with a corresponding use case of interest to developer 103, e.g., while maintaining compliance with the one or more process-validation operations or requirements and with the one or more governmental or regulatory requirements.

Figure 8:
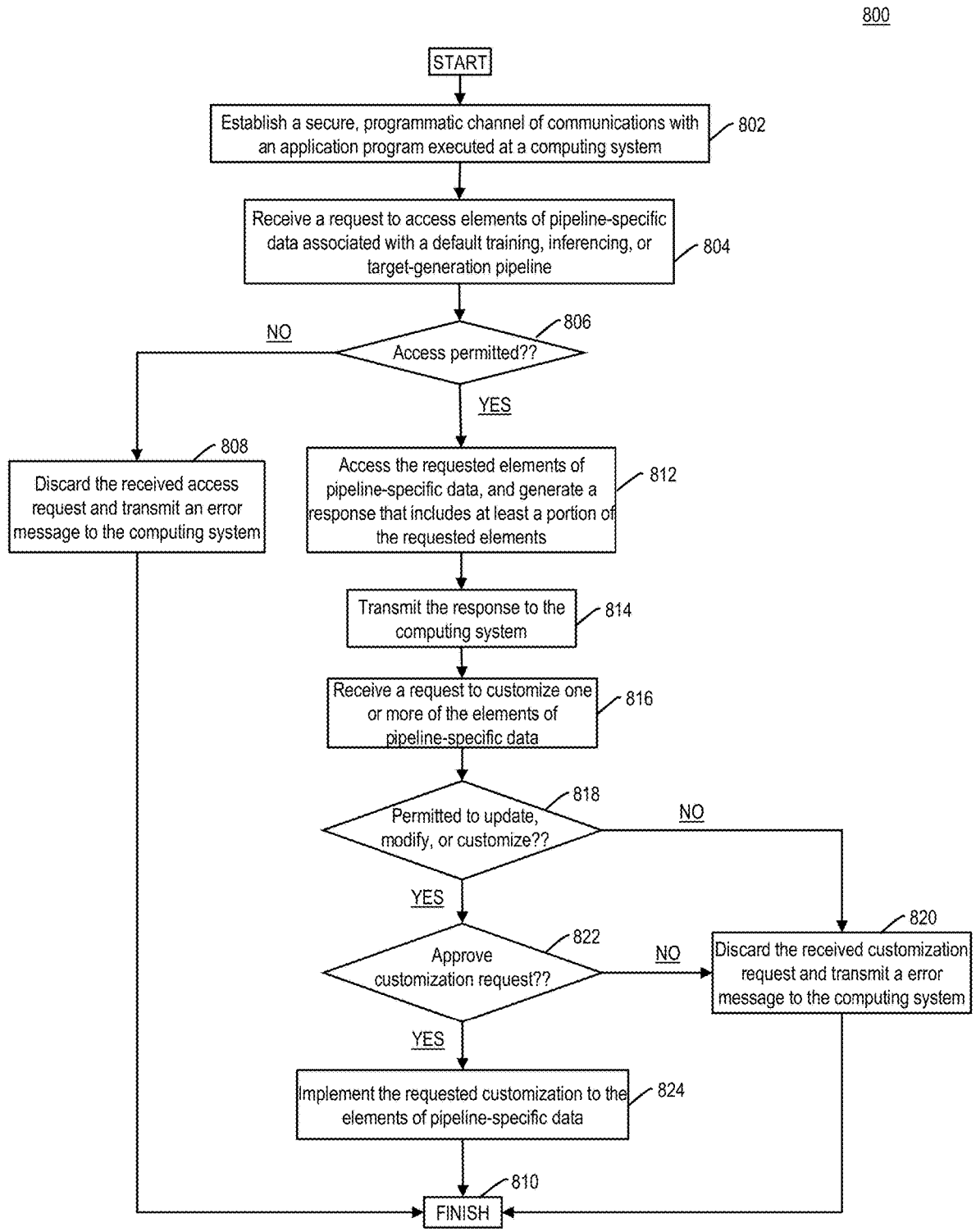
FIG. 8 is a flowchart of an exemplary process for configuring an execution of sequential operations within a training, inferencing, or target-generation pipeline associated with a machine-learning or artificial-intelligence process, in accordance with some embodiments.

FIG. 8 is a flowchart of an exemplary process 800 for configuring an execution of sequential operations within a default training, inferencing, or target-generation pipeline associated with a machine-learning or artificial-intelligence process. In some examples, one or more computing systems associated with a financial institution, such as one or more of the distributed computing components of FI computing system 130, may perform one or more of the steps of exemplary process 800, as described herein.

Referring to FIG. 8, the one or more processors of FI computing system 130 may perform operations, described herein, to establish a secure, programmatic channel of communications across communications network 120 with an application program executed at a computing system or device (e.g., in step 802 of FIG. 8). In some instances, computing system or device may be associated with, or operable by, a data scientist, developer, or other representative of the financial institution associated with FI computing system 130 (e.g., developer computing system 102 operable by developer 103 of FIG. 1), and the one or more processors of FI computing system 130 may execute a programmatic web server, such programmatic web service 148 of FIG. 1, which may perform any of the exemplary processes described herein to establish the secure, programmatic channel of communications across communications network 120 with a web browser or other application program (e.g., web browser 108 of FIG. 1) executed by developer computing system 102 in accordance with one, or more, appropriate communications protocols, such as, but not limited to, a hypertext transfer protocol (HTTP), a transmission control protocol (TCP), or an internet protocol (IP).

In some instances, the one or more processors of FI computing system 130 may receive, from computing system 102, the one or more processors of FI computing system 130 a request to access one or more elements of pipeline-specific data associated with a corresponding one of the default training, inferencing, or target-generation pipelines described herein (e.g., in step 804 of FIG. 8). The requested elements of pipeline-specific data may include, but is not limited to, one or more executable pipelines scripts maintained within script data store 136 (e.g., training pipeline script 150 associated with default training pipeline 302, inferencing pipeline script 152 associated with default inferencing pipeline 420, and target-generation pipeline script 154 associated with default target-generation pipeline 520), one or more default application engines maintained within component data store 138 (e.g. retrieval engine 156, preprocessing engine 158, indexing engine 160, a target-generation engine 162, splitting engine 164, feature-generation engine 166, training engine 168, inferencing engine 170, and reporting engine 172 executed sequentially within one, or more, of training pipeline script 150, inferencing pipeline script 152, and target-generation pipeline script 154).

The requested elements of pipeline-specific data may also include one or more elements of engine-specific configuration data maintained within configuration data store 140, such as, but not limited to, the elements of retrieval configuration data 157, preprocessing configuration data 159, indexing configuration data 161, target-generation configuration data 163, feature-generation configuration data 167, training configuration data 169, inferencing configuration data 171, and reporting configuration data 173. Further, the received access request may also include an alphanumeric identifier of a corresponding one of the default training pipeline, the inferencing pipeline, or target-generation pipeline associated with the access request, along with one or more identifiers of computing system 102 (e.g., an IP address, a MAC address, etc.) and/or identifiers of executed web browser 108 (e.g., an application cryptogram, a digital token, etc.).

Referring back to FIG. 8, the one or more processors of FI computing system 130 may perform any of the exemplary processes described herein to determine whether a source of the access request is permitted to access the elements of pipeline-specific data (e.g., in step 806 of FIG. 8). For example, in step 806, the one or more processors of FI computing system 130 may obtain, from the access request, the one or more identifiers of computing system 102 or executed web browser 108, and may perform operations that determine, based on the one or more identifiers of computing system 102 or executed web browser 108, whether FI computing system 130 grants computing system 102 or executed web browser 108 permission to access the elements of pipeline-specific data (e.g., based on a comparison of the one or more identifiers against a compiled list of blocked computing devices, computing systems, or application programs).

If the one or more processors of FI computing system 130 were to determine that computing system 102, or executed web browser 108, is not permitted to access the elements of pipeline-specific data (e.g., step 406; NO), the one or more distributed computing components of FI computing system 130 may discard the access request and may perform operations that transmit an error message to computing system 102 (e.g., in step 808 of FIG. 8). Exemplary process 800 is then complete in step 810.

Alternatively, if the one or more processors of FI computing system 130 were to establish that computing system 102 and executed web browser 108 are permitted to access the requested elements of pipeline-specific data (e.g., step 806; YES), the one or more processors of FI computing system 130 may perform any of the exemplary processes described herein to obtain the pipeline identifier from the received access request, which identifies the corresponding one of the default training pipeline, the inferencing pipeline, or the target-generation pipeline associated with the access request, and based on the pipeline identifier, obtain the requested elements of pipeline-specific data associated with the corresponding one of the default training pipeline, the inferencing pipeline, or the target-generation pipeline (e.g., in step 812 of FIG. 8). The one or more processors of FI computing system 130 may also perform operations that generate a response to the access request that includes at least a portion of the requested elements of module-specific configuration data (e.g., also in step 812 of FIG. 4). The one or more processors of FI computing system 130 may also perform operations, in step 814 of FIG. 4, that transmit the generated response to the access request across communications network 120 to computing system 102, e.g., across the established, secure programmatic channel of communications.

In some instances, computing system 102 may receive the response to the access request from the one or more distributed computing components of FI computing system 130, and one or more application programs executed by computing system 102, such as executed web browser 108, may access the received response and perform operations that obtain, from the received response, at least the portion of the requested elements of pipeline-specific data (e.g., the elements of engine-specific configuration data associated with the corresponding one of the default training pipeline, the inferencing pipeline, or the target-generation pipeline, the executable pipeline script associated with the corresponding one of the default training pipeline, the inferencing pipeline, or the target-generation pipeline, etc.). As described herein, executed web browser 108 may perform any of the exemplary processes described herein to process the obtained portion of the requested elements of pipeline-specific data, generate corresponding interface elements that provide a graphical or textual representation of the requested elements of pipeline-specific data, and render the generate interface elements for presentation within one or more display screens of a digital interface.

As described herein, developer 103 may elect to update, modify, or customize one or more of the requested elements of pipeline-specific data, such as, but not limited to, the default pipeline scripts, one or more of the default application engines, and/or one or more of the elements of engine-specific configuration data associated with the corresponding one of the default training pipeline, the inferencing pipeline, or the target-generation pipeline, to reflect a particular use-case of interest to developer 103. In some instances, and based on the displayed interface elements, developer 103 may provision input to computing system 102 (e.g., via input device 112 of FIG. 1) that updates, modifies, or customizes one or more of the requested elements of pipeline-specific data, and based on the received input, executed web browser 108 may perform any of the exemplary processes described herein to update, modify, or customize the elements of pipeline-specific data and generate corresponding elements of customized, pipeline-specific data.

Executed web browser 108 may also perform operations, described herein, that package each of the elements of customized, pipeline-specific data into corresponding portions of a customization request, along with the pipeline identifier of the corresponding one of the default training, inferencing, or target-generation pipelines and the one or more identifiers of computing system 102 or executed web browser 108.

Executed web browser 108 may transmit the customization request across communications network 120 to the one or more distributed computing components of FI computing system 130, e.g., via the established, secure, programmatic channel of communications.

By way of example, to reflect the particular use-case, developer 103 may elect to modify an operation of one or more of the default application engines executed sequentially within the corresponding one of the default training pipeline, the default inferencing pipeline or the default target-generation pipeline (e.g., default training pipeline 302, default inferencing pipeline 420, or default target-generation pipeline 520, etc.), without any modification to the execution flow of that default pipeline or to the executable code of the one or more default application engines. As described herein, developer 103 may provision input to computing system 102 that updates, modifies, or customizes the elements of engine-specific configuration data associated with the one or more default application engines, and based on the provisioned input, executed web browser 108 may perform operations, described herein, that generate elements of customized, engine-specific configuration data that reflect the particular use-case of interest to developer 103 (e.g., the elements of customized, pipeline-specific data), and that package each of the elements of customized, engine-specific configuration data into corresponding portions of the customization request, along with the pipeline identifier and the one or more identifiers of computing system 102 or executed web browser 108.

Further, in some examples, developer 103 may elect replace one or more of the default application engines executed sequentially within the corresponding one of the default training pipeline, the default inferencing pipeline or the default target-generation pipeline (e.g., default splitting engine 164 within default training pipeline 302) with a customized application engine (e.g., customized splitting engine 602 of FIGS. 6A and 6B) that performs operations appropriate to the particular use-case, and consistent with the imposed engine- and pipeline-specific constraints, within the execution flow of that default pipeline. As described herein, and based on input provisioned to computing system 102, computing system 102 may perform any of the exemplary processes described herein to generate the customized application engine and corresponding elements of engine-specific configuration data (e.g., the elements of customized splitting configuration data 604 of FIGS. 6A and 6B), and to package, into corresponding portions of the customization request, the customized application engine, a component identifier, and the elements of customized, engine-specific configuration data (e.g., as the elements of customized, pipeline-specific data), along with the pipeline identifier and the one or more identifiers of computing system 102 or executed web browser 108.

Additionally, and as described herein, developer 103 may elect to modify an execution flow of the sequentially executed default application engines within the corresponding one of the default training pipeline, the default inferencing pipeline, or the default target-generation pipeline to reflect the particular use-case. By way of example, and as described herein, developer 103 may elect to replace, within the default inferencing pipeline (e.g., default inferencing pipeline 420), a single inferencing operation associated with the sequential execution of inferencing engine 170 with two successive inferencing operations associated with successive executions of inferencing engine 170 within a customized inferencing pipeline established by a developer-specified, customized inferencing script (e.g., customized inferencing pipeline 714 and customized inferencing pipeline script 706 of FIGS. 7A and 7B). As described herein, and based on input provisioned to computing system 102, computing system 102 may perform any of the exemplary processes described herein to generate a customized pipeline script (e.g., a customized inferencing pipeline script) and corresponding elements of engine-specified configuration data that support the execution flow of the customized pipeline script (e.g., as the elements of modified inferencing configuration data 412 and customized inferencing configuration data 708 of FIGS. 7A and 7B), and to package, into corresponding portions of the customization request, the customized pipeline script and corresponding elements of engine-specified configuration data (e.g., as the elements of customized, pipeline-specific data), along with the pipeline identifier and the one or more identifiers of computing system 102 or executed web browser 108.

Referring back to FIG. 8, the one or more processors of FI computing system 130 may receive the customization request across communications network 120 from computing system 102 (e.g., in step 816 of FIG. 8). In some instances, the one or more distributed computing components of FI computing system 130 may receive the customization request from computing system 102 across communications network 120 via the established, secure, programmatic channel of communications using one or more appropriate communications protocols.

As described herein, the customization request may include, among other things, one or more identifiers of computing system 102 or executed web browser 108, such as, but not limited to, the IP or MAC address of computing system 102 and/or the digital token or application cryptogram identifying executed web browser 108. The received customization request may also include the pipeline identifier of the corresponding one of the default training pipeline, the inferencing pipeline, or the target-generation pipeline associated with the access request and the elements of customized, pipeline-specific data the particular application or use-case of interest to developer 103, such as, but not limited to, the exemplary elements of customized, pipeline-specific data described herein.

In some instances, the one or more processors of FI computing system 130 may perform any of the exemplary processes described herein to determine whether a source of the customization request is permitted to update, modify, or customize the elements of pipeline-specific data maintained within script data store 136, component data store 138, and/or configuration data store 140 (e.g., in step 818 of FIG. 4). For example, in step 818, the one or more processors of FI computing system 130 may obtain, from the customization request, the one or more identifiers of computing system 102 or executed web browser 108, and may also perform operations that determine, based on the one or more identifiers of computing system 102 or executed web browser 108, whether FI computing system 130 grants computing system 102 or executed web browser 108 permission to update, modify, or customize the elements of module-specific configuration data (e.g., based on a comparison of the one or more identifiers against a compiled list of blocked computing devices, computing systems, or application programs).

If the one or more processors of FI computing system 130 were to determine that computing system 102, or executed web browser 108, is not permitted to update, modify, or customize the elements of pipeline-specific data (e.g., step 818; NO), the one or more processors of FI computing system 130 may discard the received customization request and may perform operations that transmit an error message to computing system 102 (e.g., in step 820 of FIG. 8). Exemplary process 800 is then complete in step 810.

Alternatively, if the one or more processors of FI computing system 130 to establish that computing system 102 and executed web browser 108 are permitted to update, modify, or customize the elements of pipeline-specific data (e.g., step 818; YES), the one or more processors of FI computing system 130 may obtain the elements of customized, pipeline-specific data from the customization request, and may perform any of the exemplary processes described herein to determine whether the requested customization, and the elements of customized, pipeline-specific data, are consistent with one or more engine-specific and pipeline-specific constraints associated with the corresponding one of the default training pipeline, the inferencing pipeline, or the target-generation pipeline (e.g., in step 822 of FIG. 8). If, for example, the one or more processors of FI computing system 130 were to determine an inconsistency between the elements of customized, pipeline-specific data and at least one or more of the imposed constraints, the one or more processors of FI computing system 130 may decline to implement the requested customization (e.g., step 822; NO). Exemplary process 800 may pass back to step 820, and the one or more processors of FI computing system 130 may discard the received customization request and may perform operations that transmit an error message to computing system 102. Exemplary process 800 is then complete in step 810.

In some instances, if the one or more processors of FI computing system 130 executed customization application 204 were to determine a consistency between each of the imposed constraints and the elements of customized, pipeline-specific data, the one or more processors of FI computing system 130 may approve customization request and perform any of the exemplary processes described herein to implement the requested customization to the elements of pipeline-specific data maintained within script data store 136, component data store 138, and/or configuration data store 140 (e.g., in step 824 of FIG. 8). By way of example, in step 824, the one or more processors of FI computing system 130 may perform operations, described herein, that obtain the elements of customized, engine-specific configuration data from the customization request, and that store the elements of customized, engine-specific configuration data within configuration data store 140, e.g., to replace correspondence elements of pipeline-specific configuration data.

Further, he one or more processors of FI computing system 130 may also obtain the customized application engine and corresponding elements of engine-specific configuration data from the customization request, and may perform operations, described herein, to access a corresponding one of the executable pipeline scripts (e.g., maintained within script data store 236) associated with the pipeline identifier, and to modify a portion of accessed one of the executable pipeline scripts to reference the customized application engine within the execution flow of the corresponding one of the default training, inferencing, and target-generation pipelines. Additionally, or alternatively, also in step 824, the one or more processors of FI computing system 130 may store the accessed, and now-modified one, of the executable pipeline scripts within script data store 136, may store the customized application engine within a portion of component data store 138, and store the corresponding elements of engine-specific configuration data within configuration data store 140.

In some instances, also in step 824, the one or more processors of FI computing system 130 may obtain, from the customization request, the customized pipeline script and the corresponding elements of engine-specified configuration data, and may perform operations that store the customized pipeline script within a portion of script data store 136, and that store the corresponding elements of engine-specified configuration data within portions of configuration data store. Upon implementation of the requested customization by the one or more processors of FI computing system 130 in step 824, exemplary process 800 is complete in step 810.

Figure 9:
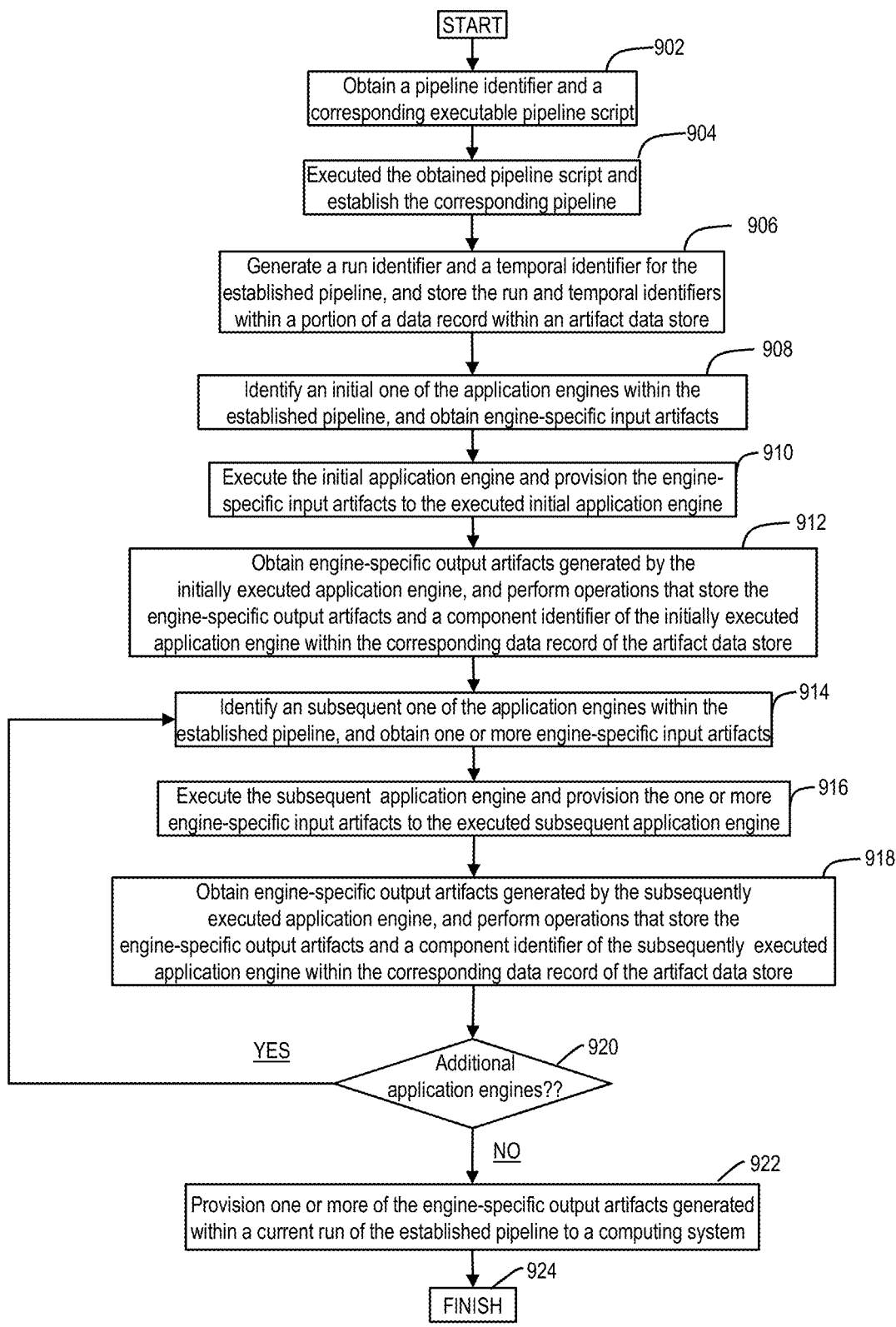
FIG. 9 is a flowchart of an exemplary process for executing sequentially application engines within a training, inferencing, or target-generation pipeline associated with a machine-learning or artificial-intelligence process, in accordance with some embodiments.

FIG. 9 is a flowchart of an exemplary process 900 for executing sequentially application engines within training, inferencing, or target-generation pipeline associated with a machine-learning or artificial-intelligence process. As described herein, within a corresponding one of the training, inferencing, or target-generation pipelines, one or more of the sequentially executed application engines may include a default application that perform operations in accordance with one or more elements of engine-specific configuration data, which may be customized by computing system 130 to reflect a particular use-case of interest to developer 103 using any of the exemplary processes described herein. In some instances, and within a corresponding one of the training, inferencing, or target-generation pipelines, one or more of the sequentially executed application engines may include a customized or "bespoke" application engine generated by developer 103 reflect the particular use-case of interest. The customized or "bespoke" application engine may, for example, confirm to the engine- and pipeline-specific constraints imposed on the corresponding one of the training, inferencing, or target-generation pipelines, and when sequentially executed within the corresponding one of the training, inferencing, or target-generation pipelines, the executed customized or bespoke application engine may perform operations in accordance with one or more elements of engine-specific, customized configuration data.

Further, and as described herein, one or more of the training, inferencing, or target-generation pipelines may represent a default pipeline characterized by a corresponding, default execution flow (e.g., a sequential order in which the corresponding default pipeline executed the application engines) established by corresponding, default pipeline script (e.g., a corresponding one of default training pipeline script 150, default inferencing pipeline script 152, or default target-generation pipeline script 154). In other instances, also described herein, one or more training, inferencing, or target-generation pipelines may represent a customized pipeline characterized by a customized, or "bespoke" execution flow established by a corresponding pipeline script, which may be customized by computing system 130 to reflect the potential use-case of interest to developer 103 using any of the exemplary processes described herein. In some examples, one or more computing systems associated with a financial institution, such as one or more of the distributed computing components of FI computing system 130, may perform one or more of the steps of exemplary process 900, as described herein.

Referring to FIG. 9, the one or more processors of FI computing system 130 may perform any of the exemplary processes described herein to obtain a pipeline identifier associated with a corresponding one of the training, inferencing, and target-generation pipelines described herein, and to obtain an executable pipeline script associated with the pipeline identifier (e.g., in step 902 of FIG. 9). By way of example, the one or more processors of FI computing system 130 may obtain the pipeline identifier from a customization request generated by, and received from, the computing system 130, which requests an update to, modification of, or customization of, one or more elements of engine-specific configuration data (e.g., as maintained within configuration data store 140), one or more executable application engines (e.g., as maintained within component data store 138), and additionally, or alternatively, one or more executable pipeline scripts (e.g., as maintained within script data store 136), and in some instances, the one or more processors of FI computing system 130 may obtain the pipeline identifier upon approval and implementation of the requested customization using any of the exemplary processes described herein.

Further, in some instances, the one or more processors of FI computing system 130 may perform operations, in step 902, that access script data store 136 and obtain the executable pipeline script associated with the pipeline identifier from script data store 136. The executable pipeline script may, for example, include one of training pipeline script 150 associated with default training pipeline 302, inferencing pipeline script 152 associated with default inferencing pipeline 420, and target-generation pipeline script 154 associated with default target-generation pipeline 520. Additionally, in some examples, the executable pipeline script may include a customized pipeline script associated with a corresponding one of the customized pipelines characterized by the customized, or "bespoke" execution flows (e.g., customized inferencing pipeline script 706 associated with customized inferencing pipeline 714, etc.).

The one or more processors of FI computing system 130 may also perform operations that execute the obtained pipeline script, and establish and initiate the corresponding pipeline based on the execution of the obtained pipeline script (e.g., in step 904 of FIG. 9). In some instances, the established pipeline may correspond to one of the default pipelines described herein (e.g., one of default training pipeline 302, default inferencing pipeline 420, and default target-generation pipeline 520, etc.) or one or the customized or bespoke pipelines described herein (e.g., customized inferencing pipeline 714, etc.). Further, the one or more processors may generate a unique, alphanumeric run identifier for the established pipeline and a temporal identifier characterizing an initiation date of the established pipeline, and may perform any of the exemplary processes described herein to store the run identifier and the temporal identifier within a corresponding, data record of a data repository, such as artifact data store 142 (e.g., in step 906 of FIG. 9). In some instances, the storage of the run identifier and the temporal identifier may associate the corresponding data record with the current implementation or "run" of the established pipeline.

Based on the executed pipeline script, the one or more processors of FI computing system 130 may identify an initial one of the application engines executed sequentially within the established pipeline (e.g., one of the default application engines, or the customized applications, maintained within component data store 138), and obtain, as an input artifact, one or more elements of engine-specific configuration data associated with the identified application engine, such as, but not limited to, one or more of the elements of default, modified, or customized engine-specific configuration data maintained within configuration data store 140 (e.g., in step 908 of FIG. 9). The one or more processors of FI computing system 130 may also perform operations, described herein, that execute the identified application engine and provision the one or more input artifacts, including the elements of engine-specific configuration data, to the initially executed application engine (e.g., in step 910 of FIG. 9).

In some instances, upon executed within the established pipeline, the initially executed application engine may ingest the one or more input artifacts (e.g., the corresponding elements of engine-specific configuration data), and a programmatic interface of the initially executed application engine may perform any of the exemplary processes described herein to establish a consistency of the corresponding input artifacts with the engine- and pipeline-specific operational constraints imposed on executed splitting engine 164 (e.g., also in step 910 of FIG. 9). Based on an established consistency of the input artifacts with the imposed engine- and pipeline-specific operational constraints, the initially executed application engine may perform operations, described herein, that are consistent with the one or more elements of engine-specific configuration data (e.g., which may be customized to reflect the particular use-case of interest to developer 103 using any of the exemplary processes described herein), and that generate one or more engine-specific output artifacts based on the performance of the operations (e.g., also in step 910 of FIG. 9).

In some instances, the one or more processors of FI computing system 130 may obtain each of the engine-specific output artifacts generated by the initially executed application engine (and in some instances, the one or more engine-specific input artifacts), and perform any of the exemplary processes described herein to store each of the engine-specific input and/or output artifacts and the component identifier of initially executed application engine within the corresponding data record of artifact data store 142 (e.g., in step 912 of FIG. 9). As described herein, the storage of the engine-specific input and/or output artifacts in association with the component identifier of the initially executed application, and with the run and temporal identifiers, may associate the engine-specific output artifacts with the current run of the established pipeline, and may facilitate an auditing and tracking of these output artifacts using any of the exemplary processes described herein.

Referring back to FIG. 9, the one or more processors of FI computing system 130 may identify a subsequent one of the application engines executed sequentially within the established pipeline based on the executed pipeline script, and may perform any of the exemplary processes described herein to obtain one or more engine-specific input artifacts for the identified, subsequently executed application engine (e.g., in step 914 of FIG. 9). The engine-specific input artifacts for the subsequently executed application engine may include additional elements of the engine-specific configuration data maintained within configuration data store 140 and in some instances, one or more of the output artifacts generated by previously executed application engine(s) within the established pipeline and maintained with the corresponding row of artifact data store 142. The one or more processors of FI computing system 130 may also perform operations, described herein, that execute the identified application engine and provision the one or more engine-specific input artifacts, including the additional elements of engine-specific configuration data, to the subsequently executed application engine (e.g., in step 916 of FIG. 9).

In some instances, subsequently executed application engine may perform any of the exemplary processes described herein, in step 916, to establish a consistency of the one or more engine-specific input artifacts with one or more operational constraints imposed on the subsequently executed application engine. Based on the established consistency, the subsequently executed application engine may perform operations, described herein, that are consistent with the additional elements of engine-specific configuration data (e.g., which may be customized to reflect the particular use-case of interest to developer 103 using any of the exemplary processes described herein), and that generate one or more engine-specific output artifacts based on the performance of the operations (e.g., also in step 916). The one or more processors of FI computing system 130 may obtain each of the engine-specific artifacts generated by the subsequently executed application engine (and in some instances, one or more of the engine-specific input artifacts), and perform any of the exemplary processes described herein to store each of the engine-specific input and/or output artifacts and a component identifier of subsequently executed application engine within the corresponding data record of artifact data store 142 (e.g., in step 918 of FIG. 9). By way of example, the storage of the engine-specific input and/or output artifacts in association with the component identifier of the subsequently executed application, and with the run and temporal identifiers, may associate the engine-specific input and/or output artifacts with the current run of the established pipeline, and may facilitate an auditing and tracking of the input and/or output artifacts using any of the exemplary processes described herein.

Further, and based on the executed pipeline script, the one or more processors of FI computing system 130 may determine whether additional application engines (e.g., the default or customized application engines described herein) await sequential execution within the established pipeline (e.g., in step 920 of FIG. 9). If the one or more processors of FI computing system 130 were to establish that additional application engines await execution within the established pipeline (e.g., step 920; YES), exemplary process 900 may pass back to step 914, and the one or more processors of FI computing system 130 may perform any of the exemplary processes described herein to identify a subsequent one of the application engines awaiting execution within the established pipeline based on the executed pipeline script, and to obtain one or more engine-specific input artifacts for the identified, subsequently executed application engine.

Alternatively, if the one or more processors of FI computing system 130 were to establish that no additional application engines await execution within the established pipeline (e.g., step 920; NO), the one or more processes of FI computing system 130 may deem complete the current run of the established pipeline, and may perform any of the exemplary processes described herein to transmit one or more of the engine-specific output artifacts generated through the sequential execution of the application engines within the current run of the established pipeline across network 120 to a computing system or device associated with a developer or a computer scientists, such as, but not limited to, developer computing system 102 of FIG. 1 (e.g., in step 922 of FIG. 9). By way of example, the one or more processors of FI computing system 130 may transmit the one or more output artifacts to developer computing system 102 via a secure, programmatic channel of communications across communications network 120 established between web browser 108 executed at developer computing system 102 and programmatic web service 148 executed by the one or more processors of FI computing system 130. Exemplary process 900 is then complete in step 924.

C. Exemplary Computing Architectures

Embodiments of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Exemplary embodiments of the subject matter described in this specification, including, but not limited to, web browser 108, orchestration engine 144, artifact management engine 146, programmatic web service 148, training pipeline script 150, inferencing pipeline script 152, target-generation pipeline script 154, retrieval engine 156, preprocessing engine 158, indexing engine 160, target-generation engine 162, splitting engine 164, feature-generation engine 166, training engine 168, inferencing engine 170, reporting engine 172, customization application 204, application programming interface (API) 206, preprocessing module 332, pipeline fitting module 340, featurizer module 346, additional application 398, decisioning application 482, customized splitting engine 602, initial inferencing script element 702, subsequent inferencing script element 704, and customized inferencing pipeline script 706, may be implemented as one or more computer programs, i.e., one or more modules of computer program instructions encoded on a tangible non transitory program carrier for execution by, or to control the operation of, a data processing apparatus (or a computer system).

Additionally, or alternatively, the program instructions can be encoded on an artificially generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including, by way of example, a programmable processor such as a graphical processing unit (GPU) or central processing unit (CPU), a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array), an ASIC (application-specific integrated circuit), one or more processors, or any other suitable logic.

Computers suitable for the execution of a computer program include, by way of example, general or special purpose microprocessors or both, or any other kind of central processing unit. Generally, a CPU will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a computer having a graphical user interface or a web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:
a memory storing instructions;
a communications interface; and
at least one processor coupled to the memory and the communications interface, the at least one processor being configured to execute the instructions to:
obtain, from the memory, elements of configuration data associated with a plurality of application engines and pipelining data characterizing a sequential execution of at least a subset of the application engines, at least one of the elements of configuration data being generated by a computing system;
based on the pipelining data, execute sequentially each of the subset of the application engines in accordance with corresponding ones of the elements of configuration data, the executed subset of the application engines causing the at least one processor to perform operations that at least one of (i) train a machine-learning or artificial-intelligence process or (ii) apply the trained machine-learning or artificial-intelligence process to an input dataset;
perform operations that obtain artifact data generated by the executed subset of the application engines and that store the artifact data within a portion of the memory; and
transmit at least a portion of the artifact data to the computing system via the communications interface.

2. The apparatus of claim 1, wherein the artifact data comprises elements of explainability data that characterize at least one of the training of the machine-learning or artificial-intelligence process or the application of the trained machine-learning or artificial-intelligence process to the input dataset.

3. The apparatus of claim 1, wherein the at least one processor is further configured to execute the instructions to:
perform operations that initiate the sequential execution of the subset of the application engines on a corresponding initiation date;
generate an identifier associated with the initiation of the sequential execution of the subset of the application engines on the corresponding initiation date; and
store the generated identifier and temporal data comprising the corresponding initiation date within the portion of the memory.

4. The apparatus of claim 3, wherein:
the artifact data comprises a plurality of output artifacts generated by corresponding ones of the application engines; and
the at least one processor is further configured to execute the instructions to store each of the output artifacts and a component identifier of the corresponding one of the application engines within the portion of the memory.

5. The apparatus of claim 1, wherein:
each of the elements of configuration data is associated with a corresponding one of the application engines; and
the at least one processor is configured to execute the instructions to execute sequentially each of the subset of the application engines in accordance with the corresponding element of configuration data.

6. The apparatus of claim 1, wherein:
the pipeline data comprises a default pipeline script that establishes a default execution flow for the sequential execution of the subset of the application engines; and
the subset of the application engines comprises a default application engine, the default application engine being associated with a corresponding one of the elements of configuration data, and the default application engine being executed sequentially by the at least one processor at a corresponding position within the default execution flow.

7. The apparatus of claim 6, wherein the at least one processor is further configured to:
receive a customization request from a computing system via the communications interface, the customization request comprising a requested modification to the corresponding element of configuration data, and the customization request being generated by an application program executed at the computing system;
perform operations that modify a portion of the corresponding element of configuration data, generate an element of modified configuration data that includes the modified portion, and store the element of modified configuration data within the memory; and
obtain the default pipeline from the memory and execute the default pipeline script, the executed default pipeline script causing the at least one processor to execute the default application engine at the corresponding position within the default execution flow and in accordance with the element of modified configuration data.

8. The apparatus of claim 7, wherein:
the customization request comprises the element of modified configuration data; and
the at least one processor is further configured to replace the second element of configuration data with the element of modified configuration data within the memory.

9. The apparatus of claim 6, wherein the at least one processor is further configured to execute the instructions to:
receive a customization request from a computing system via the communications interface, the customization request comprising a customized application engine and an element of customized configuration data, the customization request being generated by an application program executed at the computing system;

based on an established consistency between at least the element of customized configuration data and an operational constraint associated with the default application engine, perform operations that replace, within the memory, the default application program with the customized application program, and the corresponding element of configuration data with the element of customized configuration data; and obtain the default pipeline script from the memory and execute the default pipeline script, the executed default pipeline script causing the at least one processor to execute the customized application engine at the corresponding position within the default execution flow and in accordance with the element of customized configuration data.

10. The apparatus of claim 6, wherein the at least one processor is further configured to execute the instructions to:

receive a customization request from a computing system via the communications interface, the customization request comprising a customized pipeline script that establishes a customized execution flow, and the customization request being generated by an application program executed at the computing system;

based on an established consistency between at least a portion of the customized pipeline script and an operational constraint associated with the default pipeline script, perform operations that replace the default pipeline script with the customized pipeline script within the memory; and obtain the customized pipeline script from the memory and execute the customized pipeline script, the executed customized pipeline script causing the at least one processor to execute sequentially the subset of the application engines in accordance with the customized execution flow.

11. The apparatus of claim 1, wherein:

the pipeline data comprises a training pipeline script;

the at least one processor is further configured to execute the instructions to obtain the training pipeline script from the memory and execute the training pipeline script, the executed training pipeline script causing the at least one processor to:

obtain an indexed dataframe and at least a portion of a source data table, each of the elements of the indexed dataframe comprising a corresponding value of a primary key index of the source data table and a corresponding ground-truth label;

obtain a corresponding one of the elements of configuration data that specifies one or more preprocessing operations, and one or more feature-generation operations associated with a plurality of features;

based on the corresponding element of configuration data, perform operations that generate a preprocessed source data table based on an application of the one or more preprocessing operations to the source data table, and that generate a featurizer pipeline script of sequential transformation and estimation operations representative of the feature-generation operations; and execute the featurizer pipeline script, the executed featurizer pipeline script causing the at least one processor to apply sequentially the transformation and estimation operations to the preprocessed source data table and generate a feature vector for each element of the indexed dataframe, the feature vector comprising a value of each of the plurality of features.

12. The apparatus of claim 1, wherein:

the pipeline data comprises an inferencing pipeline script;

the at least one processor is further configured to execute the instructions to obtain the inferencing pipeline script from the memory and execute the inferencing pipeline script, the executed inferencing pipeline script causing the at least one processor to:

obtain an indexed dataframe and at least a portion of a source data table, the partition comprising elements that include a corresponding value of a primary key index of the source data table;

obtain a corresponding one of the elements of configuration data and a featurizer pipeline script associated with the trained machine-learning or artificial-intelligence process, the corresponding element of configuration data specifying one or more preprocessing operations, and the featurizer pipeline script specifying sequential transformation and estimation operations representative of one or more feature-generation operations associated with a plurality of features;

based on the corresponding element of configuration data, perform operations that generate a preprocessed source data table based on an application of the one or more preprocessing operations to the source data table and; and execute the featurizer pipeline script, the executed featurizer pipeline script causing the at least one processor to apply sequentially the transformation and estimation operations to the preprocessed source data table and generate a feature vector for each element of the indexed dataframe, the feature vector comprising a value of each of the plurality of features.

13. A computer-implemented method, comprising:

obtaining, using at least one processor, elements of configuration data associated with a plurality of application engines and pipelining data characterizing a sequential execution of at least a subset of the application engines, at least one of the elements of configuration data being generated by a computing system;

based on the pipelining data, and using the at least one processor, executing sequentially each of the subset of the application engines in accordance with corresponding ones of the elements of configuration data, the executed subset of the application engines causing the at least one processor to perform operations that at least one of (i) train a machine-learning or artificial-intelligence process or (ii) apply the trained machine-learning or artificial-intelligence process to an input dataset;

performing operations, using the at least one processor, that obtain artifact data generated by the executed subset of the application engines and that store the artifact data within a portion of a data repository; and transmitting at least a portion of the artifact data to the computing system using the at least one processor.

14. The computer-implemented method of claim 13, wherein the artifact data comprises elements of explainability data that characterize at least one of the training of the machine-learning or artificial-intelligence process, or the application of the trained machine-learning or artificial-intelligence process to the input dataset.

15. The computer-implemented method of claim 13, wherein:
the artifact data comprises a plurality of output artifacts generated by corresponding ones of the executed application engines; and
the computer-implemented method further comprises:
performing operations, using the at least one processor, that initiate the sequential execution of the subset of the application engines on a corresponding initiation date;
generating, using the at least one processor, an identifier associated with the initiation of the sequential execution of the subset of the application engines on the corresponding initiation date;
storing, using the at least one processor, the generated identifier and temporal data comprising the corresponding initiation date within the portion of the data repository; and
storing, using the at least one processor, each of the output artifacts and a component identifier of the corresponding one of the application engines within the portion of the data repository.

16. The computer-implemented method of claim 13, wherein:
the pipeline data comprises a default pipeline script that establishes a default execution flow for the sequential execution of the subset of the application engines; and
the subset of the application engines comprises a default application engine, the default application engine being associated with a corresponding one of the elements of configuration data, and the default application engine being executed sequentially by the at least one processor at a corresponding position within the default execution flow.

17. The computer-implemented method of claim 16, further comprising:
receive a customization request from a computing system using the at least one processor, the customization request comprising a requested modification to the corresponding element of configuration data, and the customization request being generated by an application program executed at the computing system;
performing operations, using the at least one processor, that modify a portion of the corresponding element of configuration data, generate an element of modified configuration data that includes the modified portion, and store the element of modified configuration data within the data repository; and
using the at least one processor, obtaining the default pipeline script from the memory and executing the default pipeline script, the executed default pipeline script causing the at least one processor to execute the default application engine at the corresponding position within the default execution flow and in accordance with the element of modified configuration data.

18. The computer-implemented method of claim 16, further comprising:
receive a customization request from a computing system using the at least one processor, the customization request comprising a customized application engine and an element of customized configuration data, the customization request being generated by an application program executed at the computing system;
based on an established consistency between at least the element of customized configuration data and an operational constraint associated with the default application engine, performing operations, using the at least one processor, that replace, within the data repository, the default application program with the customized application program, and the corresponding element of configuration data with the element of customized configuration data; and
obtain the default pipeline script from the memory and execute the default pipeline script, the executed default pipeline script causing the at least one processor to execute the customized application engine at the corresponding position within the default execution flow and in accordance with the element of customized configuration data.

19. The computer-implemented method of claim 16, further comprising:
receive a customization request from a computing system using the at least one processor, the customization request comprising a customized pipeline script that establishes a customized execution flow, and the customization request being generated by an application program executed at the computing system;
based on an established consistency between at least a portion of the customized pipeline script and an operational constraint associated with the default pipeline script, performing operations, using the at least one processor, that replace the default pipeline script with the customized pipeline script within the data repository; and
obtaining, using the at least one processor, the customized pipeline script from the memory and execute the customized pipeline script, the executed pipeline script causing the at least one processor to execute sequentially the subset of the application engines in accordance with the customized execution flow.

20. A tangible, non-transitory computer-readable medium storing instructions that, when executed by at least one processor, cause the at least one processor to perform a method, comprising:
obtaining elements of configuration data associated with a plurality of application engines and pipelining data characterizing a sequential execution of at least a subset of the application engines, at least one of the elements of configuration data being generated by a computing system;
based on the pipelining data, executing sequentially each of the subset of the application engines in accordance with corresponding one of the elements of configuration data, the executed subset of the application engines causing the at least one processor to perform operations that at least one of (i) train a machine-learning or artificial-intelligence process or (ii) apply the trained machine-learning or artificial-intelligence process to an input dataset;
performing operations obtain that artifact data generated by the executed subset of the application engines and that store the artifact data within a portion of a data repository; and
transmitting at least a portion of the artifact data to the computing system.

* * * * *